(12) United States Patent
Nakagaki et al.

(10) Patent No.: US 9,248,485 B2
(45) Date of Patent: Feb. 2, 2016

(54) METHOD FOR PRODUCING SPIRAL PIPE

(71) Applicant: SEKISUI CHEMICAL CO., LTD., Osaka-shi, Osaka (JP)

(72) Inventors: Masashi Nakagaki, Shiga (JP); Tomonori Yamaji, Shiga (JP); Toshio Yamane, Tokyo (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 341 days.

(21) Appl. No.: 13/871,980

(22) Filed: Apr. 26, 2013

(65) Prior Publication Data

US 2013/0247632 A1 Sep. 26, 2013

Related U.S. Application Data

(62) Division of application No. 12/668,493, filed as application No. PCT/JP2008/062587 on Jul. 11, 2008, now Pat. No. 8,448,486.

(30) Foreign Application Priority Data

Jul. 12, 2007 (JP) ................. 2007-183576
Nov. 28, 2007 (JP) ................. 2007-307385

(51) Int. Cl.
*B21C 37/06* (2006.01)
*B29C 53/78* (2006.01)
(Continued)

(52) U.S. Cl.
CPC ............. *B21C 37/06* (2013.01); *B29C 53/785* (2013.01); *B29C 63/32* (2013.01); *B29C 65/58* (2013.01);
(Continued)

(58) Field of Classification Search
CPC ...... B21C 37/06; B29C 53/785; B29C 63/32; B29C 66/83411; B29C 83/413; B29C 83/415; F16L 9/165; F16L 55/1655; F16L 11/16

USPC ....................................... 72/49, 50
See application file for complete search history.

(56) References Cited

U.S. PATENT DOCUMENTS 3,287,536 A 11/1966 Fay
3,300,812 A 1/1967 Pasquetti
(Continued)

FOREIGN PATENT DOCUMENTS

JP 63-69620 A * 3/1988 ............. B29C 53/72
JP 2-235721 A 9/1990
(Continued)

OTHER PUBLICATIONS

International Search Report for the Application No. PCT/JP2008/062587 mailed Aug. 19, 2008.
(Continued)

*Primary Examiner* — Edward Tolan
(74) *Attorney, Agent, or Firm* — Cheng Law Group, PLLC

(57) ABSTRACT

In an embodiment, a long reinforcing material-attached profile strip (100) in which joint portions are formed at both side edge portions and to which a reinforcing material continuously formed in the longitudinal direction is attached is supplied, and mutually adjacent joint portions are joined to each other, thereby producing a spiral pipe (S). A curl-forming apparatus (3) includes a sending roller for the reinforcing material-attached profile strip (100) and a curl guide. Using the curl-forming apparatus (3), adjacent parts of the reinforcing material-attached profile strip (100) are subjected to plastic deformation to form spirals by being provided with arc-like curls having a radius of curvature substantially similar to or not greater than the radius of curvature of the spiral pipe (S). Accordingly, the spiral pipe (S) can be produced while suppressing the action of a restoring force that restores the reinforcing material-attached profile strip (100) to its original radius of curvature.

7 Claims, 39 Drawing Sheets

(51) Int. Cl.
   *B29C 63/32*    (2006.01)
   *B29C 65/58*    (2006.01)
   *B29D 23/00*    (2006.01)
   *F16L 9/16*     (2006.01)
   *F16L 11/16*    (2006.01)
   *F16L 55/165*   (2006.01)
   *B29C 65/00*    (2006.01)
   *B29L 23/18*    (2006.01)
   *B29L 23/00*    (2006.01)
   *B29L 24/00*    (2006.01)

(52) U.S. Cl.
   CPC ..... *B29C 66/83413* (2013.01); *B29C 66/83415* (2013.01); *B29C 66/83417* (2013.01); *B29D 23/001* (2013.01); *F16L 9/165* (2013.01); *F16L 11/16* (2013.01); *F16L 55/1655* (2013.01); *B29C 66/4329* (2013.01); *B29C 66/725* (2013.01); *B29L 2023/186* (2013.01); *B29L 2023/22* (2013.01); *B29L 2024/00* (2013.01)

(56) References Cited

U.S. PATENT DOCUMENTS

| | | | |
|---|---|---|---|
| 3,890,820 A * | 6/1975  | Hoggan et al. | 72/169 |
| 3,916,663 A   | 11/1975 | Takeshita et al. | |
| 4,161,811 A   | 7/1979  | Nyssen | |
| 4,294,098 A * | 10/1981 | Egorov et al. | 72/128 |
| 4,704,885 A   | 11/1987 | Nakajima | |
| 4,724,596 A * | 2/1988  | Pavlyak | 29/429 |
| 4,987,759 A   | 1/1991  | Malkki | |
| 5,592,844 A * | 1/1997  | Baumgartner | 72/133 |
| 6,199,595 B1* | 3/2001  | Baker | 138/149 |
| 6,295,853 B1  | 10/2001 | Castricum | |
| 6,339,945 B2  | 1/2002  | Miller et al. | |
| 6,637,092 B1* | 10/2003 | Menzel et al. | 29/451 |
| 7,137,281 B1  | 11/2006 | McCorvey | |

FOREIGN PATENT DOCUMENTS

| | | | |
|---|---|---|---|
| JP | 6-190922 A    | 7/1994  | |
| JP | 8-200547 A    | 8/1996  | |
| JP | 11-34166 A    | 2/1999  | |
| JP | 11-235757 A * | 8/1999  | B29C 63/32 |
| JP | 2005-342915 A | 12/2005 | |

OTHER PUBLICATIONS

Notification of Reasons for Refusal for the Application No. 2008-181396 from Japan Patent Office mailed Jul. 24, 2012.

* cited by examiner

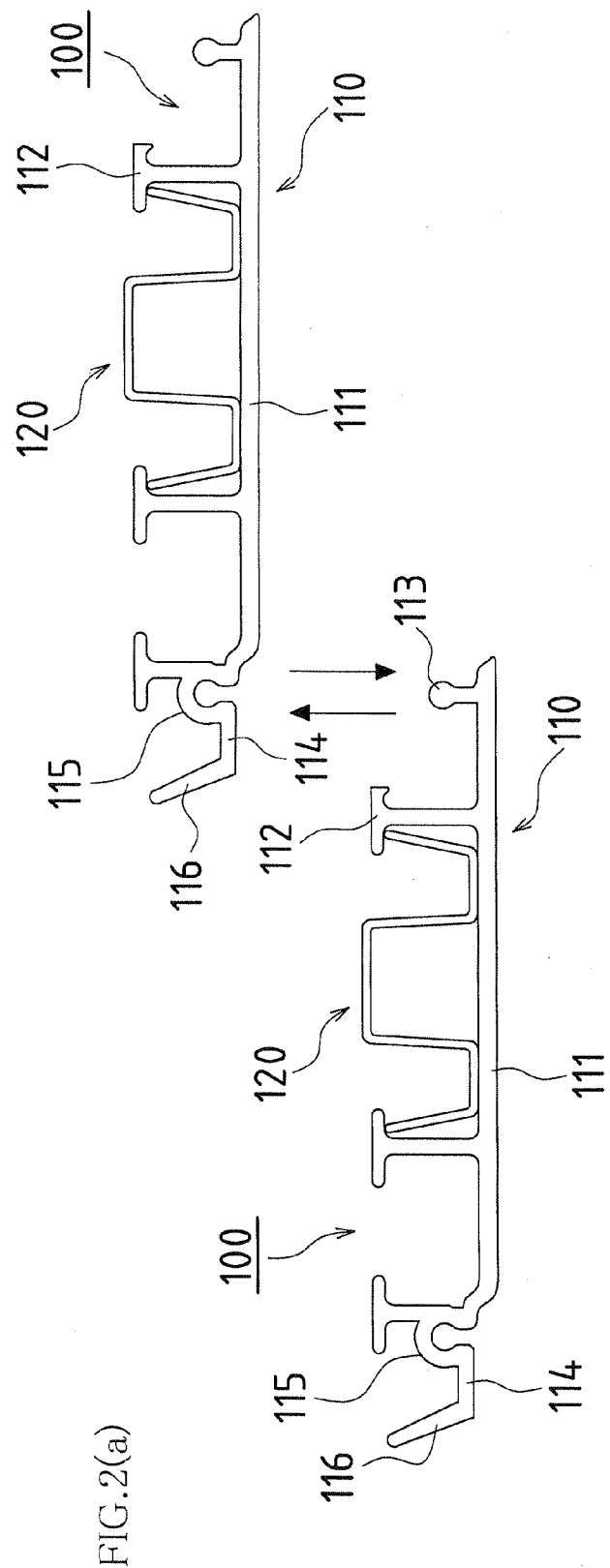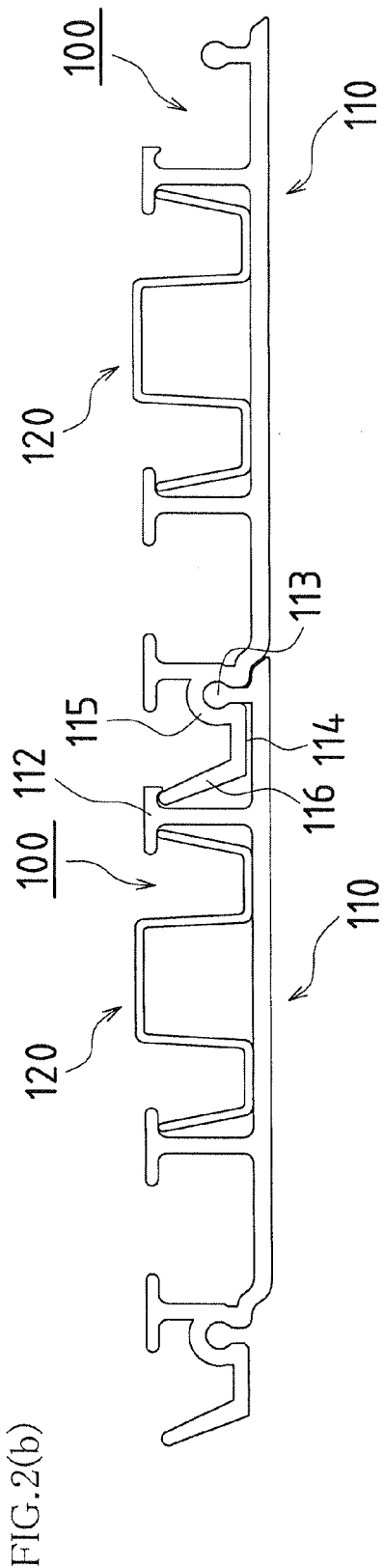

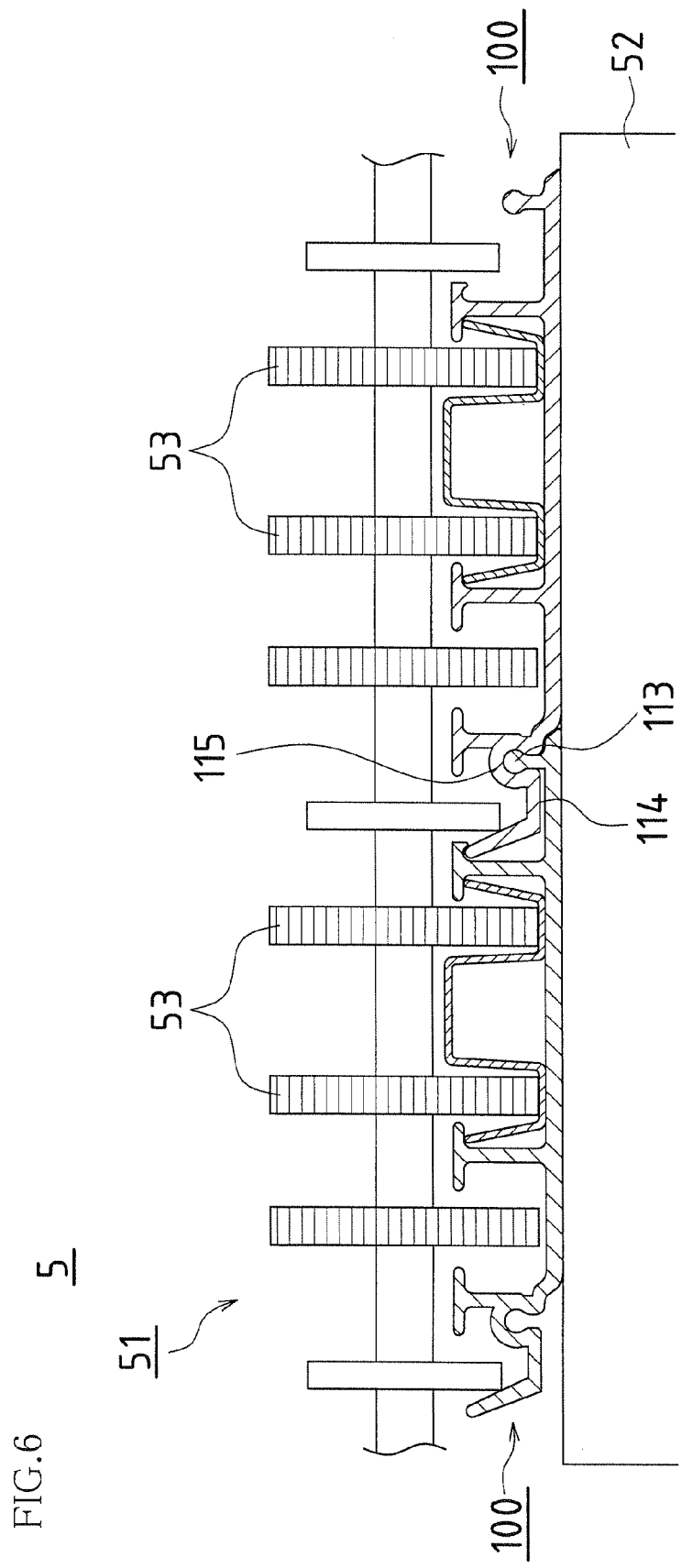

METHOD FOR PRODUCING SPIRAL PIPE

CROSS REFERENCE TO RELATED APPLICATIONS

This application is a Divisional application of patent application Ser. No. 12/668,493, filed on Jan. 11, 2010 which is a 371 application of Application No. PCT/JP2008/062587, filed Jul. 11, 2008 which is based on Japanese Patent Application Nos. JP2007-183576 and JP2007-307385 filed on Jul. 12, 2007 and Nov. 28, 2007, respectively, the entire contents of which are hereby incorporated by reference.

TECHNICAL FIELD

The present invention relates to an apparatus for forming curls in a reinforcing material-attached profile strip, a method for producing a spiral pipe, and an apparatus for producing a spiral pipe.

BACKGROUND ART

Conventionally it is proposed that in an existing pipe, a profile strip in which joint portions are formed at both side edge portions and a reinforcing material continuously formed in the longitudinal direction are individually supplied, the reinforcing material is sequentially attached to predetermined positions of the profile strip immediately before a spiral pipe is produced, mutually adjacent joint portions of the profile strip to which the reinforcing material is attached are joined to each other, and, thus, a spiral pipe is produced for refurbishing the existing pipe.

In this sort of method for refurbishing an existing pipe, it is known that a reinforcing material is attached in advance to a profile strip to form a reinforcing material-attached profile strip, and the reinforcing material-attached profile strip is wound about a drum and transported to a site (see Patent Document 1, for example).

Furthermore, conventionally, a method for refurbishing an existing pipe is also proposed in which a profile strip in which joint portions are formed at both side edge portions is supplied to a pipe-producing machine disposed in a manhole, the supplied profile strip is spirally wound by the pipe-producing machine, mutually adjacent joint portions are joined to each other to produce a spiral pipe, and the produced spiral pipe is inserted into the existing pipe while being rotated (see Patent Document 2, for example).

In the pipe-producing machine used in this refurbishment method, a pipe-producing roller that joins an already formed spiral pipe and a newly supplied profile strip to each other is disposed at a fixed position, and the produced spiral pipe is inserted into the existing pipe while being rotated.

Furthermore, a method for refurbishing an existing pipe also known in which, using a pipe-producing machine in which a joining mechanism having an outer roller and an inner roller is disposed at an attachment frame, the pipe-producing machine moves in the existing pipe in the axial direction while being revolved, and, thus, the joining mechanism pinches a profile strip to form a spiral pipe, and the produced spiral pipe is left behind in the existing pipe (see Patent Document 3, for example).

1. Patent Document 1: JP H11-34166A
2. Patent Document 2: JP H6-190922A
3. Patent Document 3: JP H8-200547A

DISCLOSURE OF INVENTION

Problem to be Solved by the Invention

When a spiral pipe is produced from said reinforcing material-attached profile strip, in the case where a reinforcing material-attached profile strip to which a rigid reinforcing material is attached is used in order to secure the self-supporting strength of the spiral pipe, a large restoring force that restores the reinforcing material-attached profile strip to its original radius of curvature acts during production of the spiral pipe, and, thus, the diameter of the spiral pipe gradually increases. Accordingly, there is a problem in that it is difficult to produce a spiral pipe having a constant pipe diameter over a long distance, moreover, a spiral pipe having a target pipe diameter.

For example, the reinforcing material-attached profile strip wound about a drum has a certain radius of curvature. When the reinforcing material-attached profile strip is released from the outer circumferential side of the drum and a spiral pipe is produced, in the case where the pipe diameter of the spiral pipe is smaller than the curls (radius of curvature) of the reinforcing material-attached profile strip wound about the drum, the difference from the radius of curvature of the reinforcing material-attached profile strip is largest when starting to release the reinforcing material-attached profile strip. Accordingly when the reinforcing material-attached profile strip wound about the drum at a certain radius of curvature is used to produce a spiral pipe having a radius of curvature smaller than the radius of curvature of the drum, a restoring force that restores the reinforcing material-attached profile strip to its original radius of curvature acts during production of the spiral pipe, the diameter of the reinforcing material-attached profile strip tends to gradually increase, and, thus, it is difficult to produce a spiral pipe having a target pipe diameter. Furthermore, since the pipe diameter of the spiral pipe increases, the outer circumferential face thereof is brought into contact with the inner circumferential face of the existing pipe at a larger area, frictional resistance increases, and, thus, it is difficult to produce a pipe continued thereafter. Thus, there is a problem in that a spiral pipe having a target length cannot be produced.

Furthermore, according to the pipe-producing method of Patent Document 2 described above, the produced spiral pipe is inserted into the existing pipe while being rotated, and, thus, in the case where the spiral pipe arrives at a curved portion of the existing pipe or in the case where the spiral pipe is inserted into a certain level of depth, friction occurs with the inner face of the existing pipe due to the spiral pipe's own weight, the rotation causes adjacent profile strips forming joint portions in the spiral pipe to slip on each other, and, thus, the diameter of the spiral pipe increases, and the spiral pipe is pressed against the inner circumferential face of the existing pipe and may not be able to be inserted any further.

Furthermore, according to the pipe-producing method of Patent Document 3 described above, the pipe-producing machine itself proceeds into the existing pipe while being revolved, but, in the case where the pipe diameter of the existing pipe is smaller than 800 mm, it is dangerous and difficult for an operator to enter the pipe, and, thus, repair is very difficult in the case where the pipe-producing machine malfunctions at a position in the existing pipe. Furthermore, since the outer roller projects in the outer radial direction of the produced spiral pipe, a gap for the operation of the outer roller is necessary between the spiral pipe and the inner circumferential face of the existing pipe, and the pipe diameter of the spiral pipe that can be produced inevitably becomes smaller than that of the existing pipe.

The present invention has been achieved in view of these problems, and it is an object thereof to provide a curl-forming apparatus that can continuously form curls having a radius of curvature substantially similar or not greater than the radius of curvature of the spiral pipe in a reinforcing material-attached profile strip such that a spiral pipe having a target pipe diameter and a target length can be reliably produced, when a spiral pipe is produced using a reinforcing material-attached profile strip in which a rigid reinforcing material is attached to a profile strip.

Furthermore, it is another object of the present invention to provide an apparatus for producing a spiral pipe that can reliably produce a spiral pipe having a target pipe diameter and a target length by continuously providing a reinforcing material-attached profile strip with curls having a radius of curvature substantially similar or not greater than the radius of curvature of the spiral pipe, when a spiral pipe is produced using a reinforcing material-attached profile strip in which a rigid reinforcing material is attached to a profile strip.

Furthermore, it is another object of the present invention to provide a method for producing a spiral pipe with which a spiral pipe having almost no gap with an existing pipe can be smoothly produced even in the case where the existing pipe has a curved portion or an uneven portion or in the case where an application distance in the existing pipe is long. Moreover, it is another object of the present invention to provide a method for producing a spiral pipe with which there is no need to enter an existing pipe for repair even in the case where a pipe-producing machine malfunctions, and application can be completed with ease even for an existing pipe having a small opening diameter.

Means for Solving the Problems

The present invention is directed to a curl-forming apparatus that receives a supplied reinforcing material-attached profile strip in which joint portions are formed at both side edge portions and to which a reinforcing material continuously formed in a longitudinal direction is attached, and that forms curls in the reinforcing material-attached profile strip before mutually adjacent joint portions are joined to each other to produce a spiral pipe, comprising: a curl guide that has a radius of curvature substantially similar to or not greater than a radius of curvature of the spiral pipe; and at least either one sending roller of a sending roller that is disposed on an upstream side of the curl guide and that pushes the reinforcing material-attached profile strip into the curl guide, and a sending roller that is disposed on a downstream side of the curl guide and that takes the reinforcing material-attached profile strip from the curl guide; wherein the reinforcing material-attached profile strip is pushed into the curl guide or taken from the curl guide, and subjected to plastic deformation to form a spiral by being continuously provided with arc-like curls having a radius of curvature substantially similar to or not greater than the radius of curvature of the spiral pipe.

According to the present invention, before a spiral pipe is produced, the reinforcing material-attached profile strip is pushed via the sending roller into the curl guide, or the reinforcing material-attached profile strip is taken from the curl guide via the sending roller, and the reinforcing material-attached profile strip moving along the curl guide can be continuously provided with arc-like curls having a radius of curvature substantially similar to or not greater than the radius of curvature of the spiral pipe. Accordingly, the reinforcing material-attached profile strip can be subjected to plastic deformation to form spirals having a radius of curvature substantially similar to or not greater than the radius of curvature of the spiral pipe.

As a result, when a spiral pipe is produced using the reinforcing material-attached profile strip, a spiral pipe having a target pipe diameter and a target length can be reliably produced.

Here, the radius of curvature of the arc-like curls formed in the reinforcing material-attached profile strip may be the same as, slightly larger than, slightly smaller than, or not greater then the radius of curvature of the spiral pipe.

The present invention is directed to a curl-forming apparatus that receives a supplied reinforcing material-attached profile strip in which joint portions are formed at both side edge portions and to which a reinforcing material continuously formed in a longitudinal direction is attached, and that forms curls in the reinforcing material-attached profile strip before mutually adjacent joint portions are joined to each other to produce a spiral pipe, comprising: a curl guide that has a radius of curvature substantially similar to or not greater than a radius of curvature of the spiral pipe; a first pinch roller that is disposed on an upstream side of the curl guide; a second pinch roller that is disposed on a downstream side of the curl guide; and a motor that rotationally drives at least one of the first pinch roller and the second pinch roller; wherein the reinforcing material-attached profile strip is pushed into the curl guide or taken from the curl guide, and subjected to plastic deformation to form a spiral by being continuously provided with arc-like curls having a radius of curvature substantially similar to or not greater than the radius of curvature of the spiral pipe.

According to the present invention, before a spiral pipe is produced, the reinforcing material-attached profile strip is pushed via the first pinch roller into the curl guide, or the reinforcing material-attached profile strip is taken from the curl guide via the second pinch roller, and the reinforcing material-attached profile strip moving along the curl guide can be continuously provided with arc-like curls having a radius of curvature substantially similar to or not greater than the radius of curvature of the spiral pipe. Accordingly, the reinforcing material-attached profile strip can be subjected to plastic deformation to form spirals having a radius of curvature substantially similar to or not greater than the radius of curvature of the spiral pipe.

As a result, when a spiral pipe is produced using the reinforcing material-attached profile strip, a spiral pipe having a target pipe diameter and a target length can be reliably produced.

Here, the radius of curvature of the arc-like curls formed in the reinforcing material-attached profile strip may be the same as, slightly larger than, slightly smaller than, or not greater then the radius of curvature of the spiral pipe.

Furthermore, depending on the supply direction of the reinforcing material-attached profile strip, the side on which the reinforcing material-attached profile strip is supplied is an entrance, and the pinch roller that is disposed on the entrance side is the first pinch roller.

The present invention is directed to a curl-forming apparatus that receives a supplied reinforcing material-attached profile strip in which joint portions are formed at both side edge portions and to which a reinforcing material continuously formed in a longitudinal direction is attached, and that forms curls in the reinforcing material-attached profile strip before mutually adjacent joint portions are joined to each other to produce a spiral pipe, comprising: a rotating frame that is supported in a freely rotatable manner via a guide roller by a support frame; a motor that rotates the rotating frame; a curl guide that is disposed on the rotating frame and that has a radius of curvature substantially similar to or not greater than a radius of curvature of the spiral pipe; a first pinch roller that is disposed on an upstream side of the curl guide; a second pinch roller that is disposed on a downstream side of the curl guide; and a motor that rotationally drives at least one of the first pinch roller and the pinch roller and the second pinch roller; wherein, while the rotating frame is rotated in an opposite direction to a supply direction to a supply direction of the reinforcing material-attached profile strip, the reinforcing material-attached profile strip is pushed into the curl guide or taken from the curl guide, and subjected to plastic deformation to form a spiral by being continuously provided with arc-like curls having a radius of curvature substantially similar to or not greater than the radius of curvature of the spiral pipe.

According to the present invention, before a spiral pipe is produced, while the rotating frame is rotated in an opposite direction to a supply direction of the reinforcing material-attached profile strip, the reinforcing material-attached profile strip is pushed via the first pinch roller into the curl guide, or the reinforcing material-attached profile strip is taken from the curl guide via the second pinch roller, the reinforcing material-attached profile strip relatively moving along the curl guide can be continuously provided with arc-like curls having a radius of curvature substantially similar to or not greater than the radius of curvature of the spiral pipe. Accordingly the reinforcing material-attached profile strip can be subjected to plastic deformation to form spirals having a radius of curvature substantially similar to or not greater than the radius of curvature of the spiral pipe.

Furthermore, in the case where the rotating frame is rotated in the opposite direction to the supply direction of the reinforcing material-attached profile strip and at the same speed as the supply speed, when the reinforcing material-attached profile strip is sent out from the curl-forming apparatus, a relative excess or deficiency in the sending out of the spiral reinforcing material-attached profile strip does not occur with respect to the spiral pipe that is left behind and produced by the revolving pipe-producing machine, and the reinforcing material-attached profile strip can be prevented from being twisted. That is to say, this configuration can prevent the following problems: when a spiral pipe is produced by the pipe-producing machine, if the rotating frame does not rotate or rotates too slowly the spiral reinforcing material-attached profile strip is excessively sent out with respect to the spiral pipe that is left behind and produced, and the reinforcing material-attached profile strip is twisted and curls are reversed, or, on the other hand, if the rotating frame rotates too fast, the amount of spiral reinforcing material-attached profile strip sent out is reduced with respect to a spiral pipe that is left behind and produced, the curl diameter of the spiral reinforcing material-attached profile strip is gradually reduced, and the reinforcing material-attached profile strip is deformed.

As a result, when a spiral pipe is produced using the reinforcing material-attached profile strip, a spiral pipe having a target pipe diameter and a target length can be reliably and smoothly produced.

Here, the radius of curvature of the arc-like curls formed in the reinforcing material-attached profile strip may be the same as, slightly larger than, slightly smaller than, or not greater then the radius of curvature of the spiral pipe.

Furthermore, depending on the supply direction of the reinforcing material-attached profile strip, the side on which the reinforcing material-attached profile strip is supplied is an entrance, and the pinch roller that is disposed on the entrance side is the first pinch roller.

In the present invention, it is preferable that the curl guide includes a plurality of rotating rollers that are circumscribed about an arc-like spiral plate or cylindrical plate having a radius of curvature substantially similar to or not greater than the radius of curvature of the spiral pipe or an arc-like spiral face or cylindrical face having a radius of curvature substantially similar to or not greater than the radius of curvature of the spiral pipe.

Accordingly when the reinforcing material-attached profile strip moves along the spiral plate, the cylindrical plate, or the plurality of rotating rollers, the reinforcing material-attached profile strip can be subjected to plastic deformation to form spirals by being continuously provided with arc-like curls having a radius of curvature substantially similar to or not greater than the radius of curvature of the spiral pipe.

The present invention is directed to a method for producing a spiral pipe, comprising: supplying a reinforcing material-attached profile strip in which joint portions are formed at both side edge portions and to which a reinforcing material continuously formed in a longitudinal direction is attached; and joining mutually adjacent joint portions, thereby forming a spiral pipe; wherein, before the joint portions of adjacent parts of the reinforcing material-attached profile strip are joined to each other, the reinforcing material-attached profile strip is subjected to plastic deformation to form a spiral by being continuously provided with arc-like curls having a radius of curvature substantially similar to or not greater than a radius of curvature of the spiral pipe.

According to the present invention, when the reinforcing material-attached profile strip is supplied, and mutually adjacent joint portions are joined to each other to produce a spiral pipe; before the joint portions of adjacent parts of the reinforcing material-attached profile strip are joined to each other, the reinforcing material-attached profile strip can be subjected to plastic deformation to form spirals by being continuously provided with arc-like curls having a radius of curvature substantially similar to or not greater than the radius of curvature of the spiral pipe. Accordingly, adjacent joint portions of the spiral reinforcing material-attached profile strip subjected in advance to plastic deformation so as to have a radius of curvature substantially similar to or not greater than the radius of curvature of the spiral pipe can be joined to each other.

As a result, a restoring force that restores the reinforcing material-attached profile strip to its original radius of curvature when wound about the drum does not act during production of the pipe, and, thus, a spiral pipe having a target pipe diameter and a target length can be reliably produced.

The present invention is directed to a method, for producing a spiral pipe, comprising: supplying a reinforcing material-attached profile strip in which joint portions are formed at both side edge portions and to which a reinforcing material continuously formed in a longitudinal direction is attached; joining mutually adjacent joint portions, thereby forming a spiral pipe; rotating and sending forward the produced spiral pipe and newly supplying a reinforcing material-attached profile strip after the produced spiral pipe, thereby producing a pipe while adding a spiral pipe; wherein, before the joint portions of adjacent parts of the reinforcing material-attached profile strip are joined to each other, the reinforcing material-attached profile strip is subjected to plastic deformation to form a spiral by being continuously provided with arc-like curls having a radius of curvature substantially similar to or not greater than a radius of curvature of the spiral pipe.

According to the present invention, when the reinforcing material-attached profile strip is supplied, mutually adjacent joint portions are joined to each other to produce a spiral pipe, the produced spiral pipe is sent forward while being rotated, and a reinforcing material-attached profile strip is newly supplied after the produced spiral pipe, thereby producing a pipe while adding a spiral pipe; before the joint portions of adjacent parts of the reinforcing material-attached profile strip are joined to each other, the reinforcing material-attached profile strip can be subjected to plastic deformation to form spirals by being continuously provided with arc-like curls having a radius of curvature substantially similar to or not greater than the radius of curvature of the spiral pipe. Accordingly, adjacent joint portions of the spiral reinforcing material-attached profile strip subjected in advance to plastic deformation so as to have a radius of curvature substantially similar to or not greater than the radius of curvature of the spiral pipe can be joined to each other.

As a result, a restoring force that restores the reinforcing material-attached profile strip to its original radius of curvature when wound about the drum does not act during production of the pipe, and, thus, a spiral pipe having a target pipe diameter and a target length can be reliably produced.

The present invention is directed to a method for producing a spiral pipe, comprising: supplying a reinforcing material-attached profile strip in which joint portions are formed at both side edge portions and to which a reinforcing material continuously formed in a longitudinal direction is attached; joining mutually adjacent joint portions, thereby forming a spiral pipe; leaving the produced spiral pipe behind; and newly supplying a reinforcing material-attached profile strip in front of the produced spiral pipe, thereby producing a pipe while adding a spiral pipe; wherein, before the joint portions of adjacent parts of the reinforcing material-attached profile strip are joined to each other, the reinforcing material-attached profile strip is subjected to plastic deformation to form a spiral by being continuously provided with arc-like curls having a radius of curvature substantially similar to or not greater than a radius of curvature of the spiral pipe.

According to the present invention, when the reinforcing material-attached profile strip is supplied, mutually adjacent joint portions are joined to each other to produce a spiral pipe, the produced spiral pipe is left behind, and a reinforcing material-attached profile strip is newly supplied in front of the produced spiral pipe, thereby producing a pipe while adding a spiral pipe; before the joint portions of adjacent parts of the reinforcing material-attached profile strip are joined to each other, the reinforcing material-attached profile strip can be subjected to plastic deformation to form spirals by being continuously provided with arc-like curls having a radius of curvature substantially similar to or not greater than the radius of curvature of the spiral pipe. Accordingly, adjacent joint portions of the spiral reinforcing material-attached profile strip subjected in advance to plastic deformation so as to have a radius of curvature substantially similar to or not greater than the radius of curvature of the spiral pipe can be joined to each other.

As a result, a restoring force that restores the reinforcing material-attached profile strip to its original radius of curvature when wound about the drum does not act during production of the pipe, and, thus, a spiral pipe having a target pipe diameter and a target length can be reliably produced.

Furthermore, the present invention is directed to a method for producing a spiral pipe, comprising: pulling a reinforcing material-attached profile strip in which joint portions are formed at both side edge portions and to which a reinforcing material continuously formed in a longitudinal direction is attached, into a manhole from an aboveground side; and joining the joint portions using a pipe-producing machine having a joining mechanism that joins mutually adjacent joint portions, thereby producing a spiral pipe; wherein the pipe-producing machine is revolved about an axis of the spiral pipe in the manhole, thereby producing the spiral pipe, and the pipe-producing machine or the spiral pipe is drawn or pressed, so that the spiral pipe is inserted into an existing pipe without being wound.

According to the present invention, the reinforcing material-attached profile strip is guided to the pipe-producing machine in the manhole, the pipe-producing machine is revolved about the axis of the existing pipe in the manhole to produce a spiral pipe, and the pipe-producing machine or the spiral pipe is drawn or pressed, so that the spiral pipe is inserted into the existing pipe without being wound.

Accordingly, a rotational force in the circumferential direction does not act even when the spiral pipe is brought into contact with the inner circumferential face of the existing pipe, and, thus, the diameter of the spiral pipe can be prevented from increasing, and the spiral pipe can be smoothly produced and inserted into the existing pipe even in the case where the existing pipe has a curved portion or an uneven portion or in the case where an application distance in the existing pipe is long. Furthermore, since the pipe-producing machine produces a pipe in the manhole, a repair operation can be easily performed in the manhole even in the case where the pipe-producing machine malfunctions during the operation.

The present invention is directed to a method for producing a spiral pipe, comprising: pulling a reinforcing material-attached profile strip in which joint portions are formed at both side edge portions and to which a reinforcing material continuously formed in a longitudinal direction is attached, into a manhole from an aboveground side; and joining the joint portions using a pipe-producing machine having a joining mechanism that joins mutually adjacent joint portions, thereby producing a spiral pipe; wherein the pipe-producing machine is revolved about an axis of the spiral pipe in the manhole, thereby producing the spiral pipe, and the pipe-producing machine or the spiral pipe is drawn or pressed in a state where the spiral pipe is not removed from the pipe-producing machine, so that the spiral pipe is inserted into an existing pipe without being wound.

According to the present invention, the reinforcing material-attached profile strip is guided to the pipe-producing machine in the manhole, the pipe-producing machine is revolved about the axis of the existing pipe in the manhole to produce a spiral pipe, and the pipe-producing machine or the spiral pipe is drawn or pressed in a state where the spiral pipe is not removed from the pipe-producing machine, so that the spiral pipe is inserted into the existing pipe without being wound.

Accordingly, a rotational force in the circumferential direction does not act even when the spiral pipe is brought into contact with the inner circumferential face of the existing pipe, and, thus, the diameter of the spiral pipe can be prevented from increasing, and the spiral pipe can be smoothly produced and inserted into the existing pipe even in the case where the existing pipe has a curved portion or an uneven portion or in the case where an application distance in the existing pipe is long. Furthermore, since the pipe-producing machine produces a pipe in the manhole, a repair operation can be easily performed in the manhole even in the case where the pipe-producing machine malfunctions during the operation. Furthermore, since the spiral pipe is continuously produced, watertightness between the joint portions can be secured.

In the method for producing a spiral pipe of the present invention, it is preferable that a head portion of the produced spiral pipe is coupled to a cord-like member and drawn into the existing pipe.

Accordingly, in the manhole, the spiral pipe can be produced and inserted into the existing pipe while the spiral pipe is reliably prevented from dropping off the pipe-producing machine. Furthermore, when the head portion of the spiral pipe is drawn, this configuration can be easily used at a bent portion or the like of the existing pipe.

Furthermore, in the method for producing a spiral pipe of the present invention, it is preferable that the reinforcing material-attached profile strip is supplied to the manhole while being provided with arc-like curls by subjecting a metal reinforcing material attached thereto to plastic deformation.

Accordingly, even a rigid reinforcing material-attached profile strip can be easily pulled into a manhole having a small opening diameter, and smoothly guided to the joining mechanism according to the orbit of the revolving pipe-producing machine to produce a spiral pipe.

In the method for producing a spiral pipe of the present invention, it is preferable that the reinforcing material-attached profile strip is supplied to the manhole while being provided with arc-like curls by thermal deformation.

Accordingly, the reinforcing material-attached profile strip can be easily pulled into a manhole having a small opening diameter, and smoothly guided to the joining mechanism according to the orbit of the revolving pipe-producing machine to produce a spiral pipe.

The present invention is directed to an apparatus for producing a spiral pipe that supplies a reinforcing material-attached profile strip in which joint portions are formed at both side edge portions and to which a reinforcing material continuously formed in a longitudinal direction is attached, and that joins mutually adjacent joint portions, thereby forming a spiral pipe, comprising: a spiral-pipe-producing machine that rotates and sends forward the produced spiral pipe, and that newly supplies a reinforcing material-attached profile strip after the produced spiral pipe, thereby producing a pipe while adding a spiral pipe; wherein the curl-forming apparatus according to claim 1 is disposed integrally with the pipe-producing machine on an upstream side of a joining mechanism that joins the joint portions of adjacent parts of the reinforcing material-attached profile strip, and the reinforcing material-attached profile strip is pushed into the curl guide or taken from the curl guide, and subjected to plastic deformation to form a spiral by being continuously provided with arc-like curls having a radius of curvature substantially similar to or not greater than a radius of curvature of the spiral pipe, and then supplied to the joining mechanism.

According to the present invention, in a spiral-pipe-producing machine that supplies a reinforcing material-attached profile strip, that joins mutually adjacent joint portions to each other to produce a spiral pipe, that rotates and sends forward the produced spiral pipe, and that newly supplies a reinforcing material-attached, profile strip after the produced spiral pipe, thereby producing a pipe while adding a spiral pipe, a curl-forming apparatus including a curl guide and a sending roller is integrally attached on the upstream side of a joining mechanism that joins the joint portions of adjacent parts of the reinforcing material-attached profile strip. Accordingly, the reinforcing material-attached profile strip is pushed via the sending roller into the curl guide, or the reinforcing material-attached profile strip is taken from the curl guide via the sending roller, and the reinforcing material-attached profile strip moving along the curl guide can be subjected to plastic deformation to form spirals by being continuously provided with arc-like curls having a radius of curvature substantially similar to or not greater than the radius of curvature of the spiral pipe, and then supplied to the joining mechanism. Accordingly in the joining mechanism, adjacent joint portions of the spiral reinforcing material-attached profile strip subjected in advance to plastic deformation so as to have a radius of curvature substantially similar to or not greater than the radius of curvature of the spiral pipe can be joined to each other.

As a result, a restoring force that restores the reinforcing material-attached profile strip to its original radius of curvature when wound about the drum does not act during production of the pipe, and, thus, a spiral pipe having a target pipe diameter and a target length can be reliably produced.

The present invention is directed to an apparatus for producing a spiral pipe that supplies a reinforcing material-attached profile strip in which joint portions are formed at both side edge portions and to which a reinforcing material continuously formed in a longitudinal direction is attached, and that joins mutually adjacent joint portions, thereby forming a spiral pipe, comprising: a spiral-pipe producing machine that rotates and sends forward the produced spiral pipe, and that newly supplies a reinforcing material-attached profile strip after the produced spiral pipe, thereby producing a pipe while adding a spiral pipe; wherein the curl-forming apparatus according to claim 2 is separately disposed on an upstream side of the pipe-producing machine, and the reinforcing material-attached profile strip is pushed into the curl-forming apparatus or taken from the curl-forming apparatus, and subjected to plastic deformation to form a spiral by being continuously provided with arc-like curls having a radius of curvature substantially similar to or not greater than a radius of curvature of the spiral pipe, and then supplied to the pipe-producing machine.

According to the present invention, in a spiral-pipe-producing machine that supplies a reinforcing material-attached profile strip, that joins mutually adjacent joint portions to each other to produce a spiral pipe, that rotates and sends forward the produced spiral pipe, and that newly supplies a reinforcing material-attached profile strip after the produced spiral pipe, thereby producing a pipe while adding a spiral pipe, a curl-forming apparatus including a curl guide, pinch rollers arranged respectively on an upstream side and on a downstream side of the curl guide, and a motor that rotationally drives one of the pinch rollers are attached separately on an upstream side of the pipe-producing machine. Accordingly, at a position away from the pipe producing machine, the reinforcing material-attached profile strip is pushed via the first pinch roller into the curl guide, or the reinforcing material-attached profile strip is taken from the curl guide via the second pinch roller, and the reinforcing material-attached profile strip moving along the curl guide can be subjected to plastic deformation to form spirals by being continuously provided with arc-like curls having a radius of curvature substantially similar to or not greater than the radius of curvature of the spiral pipe, and supplied to the joining mechanism of the pipe-producing machine. Accordingly, in the joining mechanism of the pipe-producing machine, adjacent joint portions of the spiral reinforcing material-attached profile strip subjected in advance to plastic deformation so as to have a radius of curvature substantially similar to or not greater than the radius of curvature of the spiral pipe can be joined to each other.

As a result, a restoring force that restores the reinforcing material-attached profile strip to its original radius of curvature when wound about the drum does not act during production of the pipe, and, thus, a spiral pipe having a target pipe diameter and a target length can be reliably and smoothly produced.

In the apparatus for producing a spiral pipe of the present invention, it is preferable that the curl-forming apparatus is disposed on a ground near a departure side manhole.

Accordingly, the radius of curvature of the reinforcing material-attached profile strip can be made smaller than the radius of curvature when wound about the drum, and, thus, even in the case where the opening diameter of the departure side manhole is small, the spiral reinforcing material-attached profile strip can be smoothly supplied via the manhole to the joining mechanism of the pipe-producing machine.

The present invention is directed to an apparatus for producing a spiral pipe that supplies a reinforcing material-attached profile strip in which joint portions are formed at both side edge portions and to which a reinforcing material continuously formed in a longitudinal direction is attached, and that joins mutually adjacent joint portions, thereby forming a spiral pipe, comprising: a spiral-pipe-producing machine that leaves the produced spiral pipe behind, and that newly supplies a reinforcing material-attached profile strip in front of the produced spiral pipe, thereby producing a pipe while adding a spiral pipe; wherein the curl-forming apparatus according to claim 3 is separately disposed on an upstream side of the pipe-producing machine, and while the rotating frame is rotated in an opposite direction to a supply direction of the reinforcing material-attached profile strip, the reinforcing material-attached profile strip is pushed into the curl-forming apparatus or taken from the curl-forming apparatus, and subjected to plastic deformation to form a spiral by being continuously provided with arc-like curls having a radius of curvature substantially similar to or not greater than a radius of curvature of the spiral pipe, and then supplied to the pipe-producing machine.

According to the present invention, in a spiral-pipe-producing machine that supplies a reinforcing material-attached profile strip, that joins mutually adjacent joint portions to each other to produce a spiral pipe, that leaves the produced spiral pipe behind, and that newly supplies a reinforcing material-attached profile strip in front of the produced spiral pipe, thereby producing a pipe while adding a spiral pipe, a curl-forming apparatus, in which a curl guide, pinch rollers arranged respectively on an upstream side and on a downstream side of the curl guide, and a motor that rotationally drives one of the pinch rollers are arranged on the rotating frame, is attached separately on an upstream side of the pipe-producing machine. Accordingly, at a position away from the pipe-producing machine, while the rotating frame is rotated, the reinforcing material-attached profile strip is pushed via the first pinch roller into the curl guide, or the reinforcing material-attached profile strip is taken from the curl guide via the second pinch roller, and the reinforcing material-attached profile strip relatively moving along the curl guide can be subjected to plastic deformation to form spirals by being continuously provided with arc-like curls having a radius of curvature substantially similar to or not greater than the radius of curvature of the spiral pipe, and supplied to the joining mechanism of the pipe-producing machine. Accordingly in the joining mechanism of the pipe-producing machine, adjacent joint portions of the spiral reinforcing material-attached profile strip subjected in advance to plastic deformation so as to have a radius of curvature substantially similar to or not greater than the radius of curvature of the spiral pipe can be joined to each other.

Furthermore, in the case where the rotating frame is rotated in the opposite direction to the supply direction of the reinforcing material-attached profile strip and at the same speed as the supply speed, when the reinforcing material-attached profile strip is sent out from the curl-forming apparatus, a relative excess or deficiency in the sending out of the spiral reinforcing material-attached profile strip does not occur with respect to the spiral pipe that is left behind and produced by the revolving pipe-producing machine, and the reinforcing material-attached profile strip can be prevented from being twisted. That is to say, this configuration can prevent the following problems: when a spiral pipe is produced by the pipe-producing machine, if the rotating frame does not rotate or rotates too slowly, the spiral reinforcing material-attached profile strip is excessively sent out with respect to the spiral pipe that is left behind and produced, and the reinforcing material-attached profile strip is twisted and curls are reversed, or, on the other hand, if the rotating frame rotates too fast, the amount of spiral reinforcing material-attached profile strip sent out is reduced with respect to a spiral pipe that is left behind and produced, the curl diameter of the spiral reinforcing material-attached profile strip is gradually reduced, and the reinforcing material-attached profile strip is deformed.

As a result, a restoring force that restores the reinforcing material-attached profile strip to its original radius of curvature when wound about the drum does not act during production of the pipe, and, thus, a spiral pipe having a target pipe diameter and a target length can be reliably and smoothly produced.

In the present invention, it is preferable that the curl-forming apparatus is disposed on a ground near a departure side manhole or in the departure side manhole.

Accordingly, the radius of curvature of the reinforcing material-attached profile strip can be made smaller than the radius of curvature when wound about the drum, and, thus, even in the case where the opening diameter of the departure side manhole is small, the spiral reinforcing material-attached profile strip can be smoothly supplied via the manhole to the joining mechanism of the pipe-producing machine. Furthermore, even in the case where the pipe diameter of the spiral pipe is small, the spiral reinforcing material-attached profile strip can be smoothly supplied via the spiral pipe to the joining mechanism of the pipe-producing machine.

The present invention is directed to an apparatus for producing a spiral pipe that supplies a reinforcing material-attached profile strip in which joint portions are formed at both side edge portions and to which a reinforcing material continuously formed in a longitudinal direction is attached, and that joins mutually adjacent joint portions, thereby forming a spiral pipe, comprising: a spiral-pipe-producing machine that leaves the produced spiral pipe behind without winding the spiral pipe, and that newly supplies a reinforcing material-attached profile strip after the produced spiral pipe, thereby producing a pipe while adding a spiral pipe; wherein the curl-forming apparatus according to claim 3 is separately disposed on an upstream side of the pipe-producing machine, and while the rotating frame is rotated in an opposite direction to a supply direction of the reinforcing material-attached profile strip, the reinforcing material-attached profile strip is pushed into the curl-forming apparatus or taken from the curl-forming apparatus, and subjected to plastic deformation to form spirals by being continuously provided with arc-like curls having a radius of curvature substantially similar to or not greater than a radius of curvature of the spiral pipe, and then supplied to the pipe-producing machine, and the produced spiral pipe is drawn via a cord-like member in an opposite direction to a pipe-producing direction.

According to the present invention, before a spiral pipe is produced, while the rotating frame is rotated in an opposite direction to a supply direction of the reinforcing material-attached profile strip, the reinforcing material-attached profile strip can be continuously provided with arc-like curls having a radius of curvature substantially similar to or not greater than the radius of curvature of the spiral pipe. Accordingly, the reinforcing material-attached profile strip can be subjected to plastic deformation to form spirals having a radius of curvature substantially similar to or not greater than the radius of curvature of the spiral pipe. Furthermore, since the rotating frame is rotated in the opposite direction to the supply direction of the reinforcing material-attached profile strip and at the same speed as the supply speed, when the reinforcing material-attached profile strip is sent out from the curl-forming apparatus, a relative excess or deficiency in the sending out of the spiral reinforcing material-attached profile strip does not occur with respect to the spiral pipe that is left behind and produced by the revolving pipe-producing machine, and the reinforcing material-attached profile strip can be prevented from being twisted.

That is to say, this configuration can prevent the following problems: when a spiral pipe is produced by the pipe-producing machine, if the rotating frame does not rotate or rotates too slowly, the spiral reinforcing material-attached profile strip is excessively sent out with respect to the spiral pipe that is left behind and produced, and the reinforcing material-attached profile strip is twisted and curls are reversed, or, on the other hand, if the rotating frame rotates too fast, the amount of spiral reinforcing material-attached, profile strip sent out is reduced with respect to a spiral pipe that is left behind and produced, the curl diameter of the spiral reinforcing material-attached profile strip is gradually reduced, and the reinforcing material-attached profile strip is deformed.

Furthermore, in the manhole, the spiral pipe can be produced and inserted into the existing pipe while the spiral pipe is reliably prevented from dropping off the pipe-producing machine. Furthermore, when the head portion of the spiral pipe is drawn, this configuration can be easily used at a bent portion or the like of the existing pipe.

As a result, when a spiral pipe is produced using the reinforcing material-attached profile strip, a spiral pipe having a target pipe diameter and a target length can be reliably and smoothly produced.

Here, the radius of curvature of the arc-like curls formed in the reinforcing material-attached profile strip may be the same as, slightly larger than, slightly smaller than, or not greater then the radius of curvature of the spiral pipe.

Effects of the Invention

According to the apparatus for forming curls in a reinforcing material-attached profile strip of the present invention, when a spiral pipe is produced using a reinforcing material-attached profile strip in which a rigid reinforcing material is attached to a profile strip, the reinforcing material-attached profile strip can be continuously provided with curls having a radius of curvature substantially similar or not greater than the radius of curvature of the spiral pipe such that a spiral pipe having a target pipe diameter and a target length can be reliably produced.

Furthermore, according to the method for producing a spiral pipe and the apparatus for producing a spiral pipe of the present invention, when a spiral pipe is produced using a reinforcing material-attached profile strip in which a rigid reinforcing material is attached to a profile strip, the reinforcing material-attached profile strip can be continuously provided with curls having a radius of curvature substantially similar or not greater than the radius of curvature of the spiral pipe, and a spiral pipe having a target pipe diameter and a target length can be reliably produced.

Furthermore, according to the present invention, the spiral pipe produced by the pipe-producing machine is inserted into the existing pipe without being wound. Thus, unlike the case in which the spiral pipe is inserted into the existing pipe while being rotated, a rotational force in the circumferential direction does not act even when the spiral pipe is brought into contact with the inner face of the existing pipe. That is to say, since adjacent profile strips do not slip in the circumferential direction at the joint portions, the diameter of the spiral pipe can be prevented from increasing, and the spiral pipe can be smoothly inserted and built in the existing pipe even in the case where the existing pipe has a curved portion or an uneven portion or in the case where an application distance in the existing pipe is long.

Furthermore, the pipe-producing machine produces a pipe in the manhole without proceeding into the existing pipe. Thus, a repair operation can be easily performed in the manhole even in the case where the pipe-producing machine malfunctions during the operation. Conversely, in a method in which the pipe-producing machine leaves the spiral pipe behind while proceeding into the existing pipe, a repair operation is very difficult when the pipe-producing machine malfunctions at a position in the existing pipe having a small opening diameter that does not allow a person to enter, but, according to the method for producing a spiral pipe of the present invention, repair is easy, and the operation can be performed with ease.

BRIEF DESCRIPTION OF DRAWINGS

FIGS. 2(a) and 2(b) are cross-sectional views illustrating a step of joining parts of the reinforcing material-attached profile strip, wherein FIG. 2(a) shows a state in which one part of the reinforcing material-attached profile strip is fitted to another part of the reinforcing material-attached profile strip, and FIG. 2(b) shows a state in which these parts are joined to each other.

FIG. 6 is a side view showing a joining mechanism forming the pipe-producing apparatus of FIG. 3.

FIGS. 7(a) and 7(b) show a link member of a guide frame forming the pipe-producing apparatus of FIG. 3, wherein FIG. 7(a) is a front view, and FIG. 7(b) is a partial cutaway plan view.

FIGS. 9(a) and 9(b) schematically show a step of producing a pipe using the pipe-producing apparatus of FIG. 3, wherein FIG. 9(a) is a front explanatory view, and FIG. 9(b) is a side explanatory view.

FIGS. 11(a) and 11(b) schematically show a step of forming curls using a curl-forming apparatus in the pipe-producing apparatus of FIG. 10, wherein FIG. 11(a) is a front explanatory view, and FIG. 11(b) is a side explanatory view.

FIGS. 14(a) and 14(b) show a link member of a molding frame forming the pipe-producing apparatus of FIG. 12, wherein FIG. 14(a) is a front view, and FIG. 14(b) is a partial cutaway plan view.

FIGS. 22(a) and 22(b) are cross-sectional views illustrating a step of joining parts of the reinforcing material-attached profile strip of FIG. 21, wherein FIG. 22(a) shows a state in which one part of the reinforcing material-attached profile strip is fitted to another part of the reinforcing material-attached profile strip, and FIG. 22(b) shows a state in which these parts are joined to each other.

FIGS. 23(a) and 23(b) show another modified example of the reinforcing material-attached profile strip, wherein FIG. 23(a) is a cross-sectional view, and FIG. 23(b) is an exploded perspective view showing a partially omitted joining state.

FIGS. 38(a) and 38(b) show an enlarged guide roller of FIG. 36, wherein FIG. 38(a) is a front view, and FIG. 38(b) is a plan view.

FIGS. 39(a) and 39(b) show a partially omitted curl-forming apparatus having an entrance guide, wherein FIG. 39(a) is a plan view, and FIG. 39(b) is a front view.

FIGS. 40(a) and 40(b) show a partially omitted curl-forming apparatus having a curl-adjusting mechanism, wherein FIG. 40(a) is a plan view, and FIG. 40(b) is a front view.

DESCRIPTION OF REFERENCE NUMERALS

Figure 1:
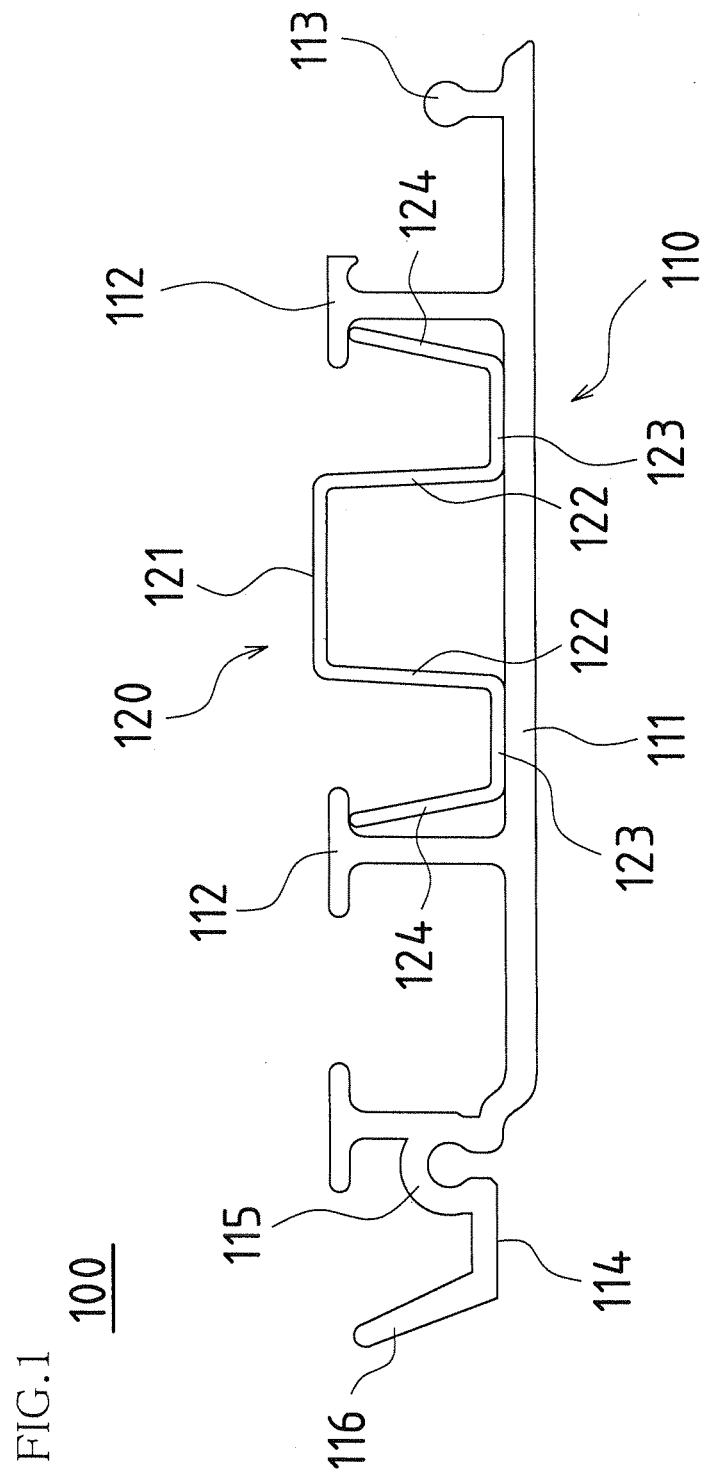
FIG. 1 is a cross-sectional view showing an example of a reinforcing material-attached profile strip used in the present invention.

1 Pipe-producing apparatus
3 Curl-forming apparatus
31 Curl guide
32 and 33 Sending roller
36 Rotating frame
4 and 7 Pipe-producing machine
5 and 9 Joining mechanism
51 and 91 Pinch roller
6 Guide frame
65 Guide roller
8 Molding frame
85 Guide roller
100, 100A, 100B, 100C, and 100D Reinforcing material-attached profile strip
K Existing pipe
M1 and M2 Manhole
S Spiral pipe

BEST MODE FOR CARRYING OUT THE INVENTION

Hereinafter, a best mode for carrying out the present invention will be described with reference to the drawings.

First, an embodiment of a reinforcing material-attached profile strip 100 used in the present invention will be described.

As shown in FIG. 1, the reinforcing material-attached profile strip 100 includes a profile strip 110, and a reinforcing material 120 attached to the profile strip 110.

The profile strip 110 is formed by subjecting a flexible synthetic resin, such as hard vinyl chloride, polyethylene, polypropylene, or the like to extrusion molding, and a plurality of (two, in this embodiment) reinforcing ribs 112 having a T-shaped cross-section are arranged on the back face of a strip plate-like board 111 such that the front ends thereof are parallel to the board 111. A joint projection portion 113 is disposed upright on the back face of one side edge portion of the board 111. The other side edge portion of the board 111 has a lowered portion 114 that is lowered to the back face side by the thickness of the board 111 such that the side edge portion of the board 111, having the joint projection portion 113 is disposed therein. The lowered portion 114 has a joint recess portion 115 to which the joint projection portion 113 can be fitted. The joint recess portion 115 has an inclined rib 116 that is inclined so as to be positioned closer to the projecting side of the joint recess portion 115 away from the board 111, and the front end of the inclined rib 116 forms one side edge portion of the profile strip 110.

The reinforcing material 120 is formed by shaping a strip plate-like steel sheet continuously formed in the longitudinal direction such that a cross-section thereof is substantially in the shape of a W, and is attached over the plurality of reinforcing ribs 112 of the profile strip 110. More specifically, the reinforcing material 120 has a central flat portion 121, trailing portions 122 that are bent downward from left and right end edges of the central flat portion 121, left and right flat portions 123 that are bent outward in horizontal directions from lower end edges of the left and right trailing portions 122, and inclined portions 124 that are bent outward in oblique upper directions from the outer ends of the left and right flat portions 123. The left and right flat portions 123 are placed on the board 111 between the left and right reinforcing ribs 112 of the profile strip 110, the front ends of the left and right inclined portions 124 are respectively caught by the left and right reinforcing ribs 112, and, thus, the reinforcing material 120 is attached to the profile strip 110.

The profile strip 110 subjected to extrusion molding so as to have a predetermined cross-sectional shape and taken up by a take-up drum is released from the take-up drum, the reinforcing material 120 is attached to a predetermined position of the profile strip 110 with a reinforcing material attachment apparatus (not shown), and, then, the profile strip 110 to which the reinforcing material 120 has been attached, that is, the reinforcing material-attached profile strip 100 is wound about a drum D (see FIG. 8) and transported to a site.

This sort of reinforcing material-attached profile strip 100 is supplied to a pipe-producing machine 4 (described later) such that the back face side of the board 111, that is, the side on which the reinforcing ribs 112 and the like are arranged is on the outer circumferential side, that is, the back face side of the board 111 on which the reinforcing ribs 112 and the like are arranged upright is on the outer circumferential side. During the joining step, as shown in FIG. 2(a), the joint recess portion 115 of one part of the reinforcing material-attached profile strip 100 of two mutually adjacent parts of the reinforcing material-attached profile strip 100 is fitted to the joint projection portion 113 of the other part of the reinforcing material-attached profile strip 100 from the outside (the outer circumferential side of the proceeding part of the reinforcing material-attached profile strip 100). Accordingly, as shown in FIG. 2(b), the mutually adjacent parts of the reinforcing material-attached profile strip 100 are joined to each other, and, thus, a spiral pipe S (see FIG. 8) having a predetermined pipe diameter can be produced.

At that time, the lowered portion 114 of the subsequent part of the reinforcing material-attached profile strip 100 is disposed at the side edge portion of the board 111 having the joint projection portion 113 of the proceeding part of the reinforcing material-attached profile strip 100, and the inclined rib 116 of the subsequent part of the reinforcing material-attached profile strip 100 is caught by the reinforcing rib 112 on the side of the proceeding part of the reinforcing material-attached profile strip 100 having the joint projection portion 113.

Example 1

Next, Example 1 according to the present invention will be described.

Figure 3:
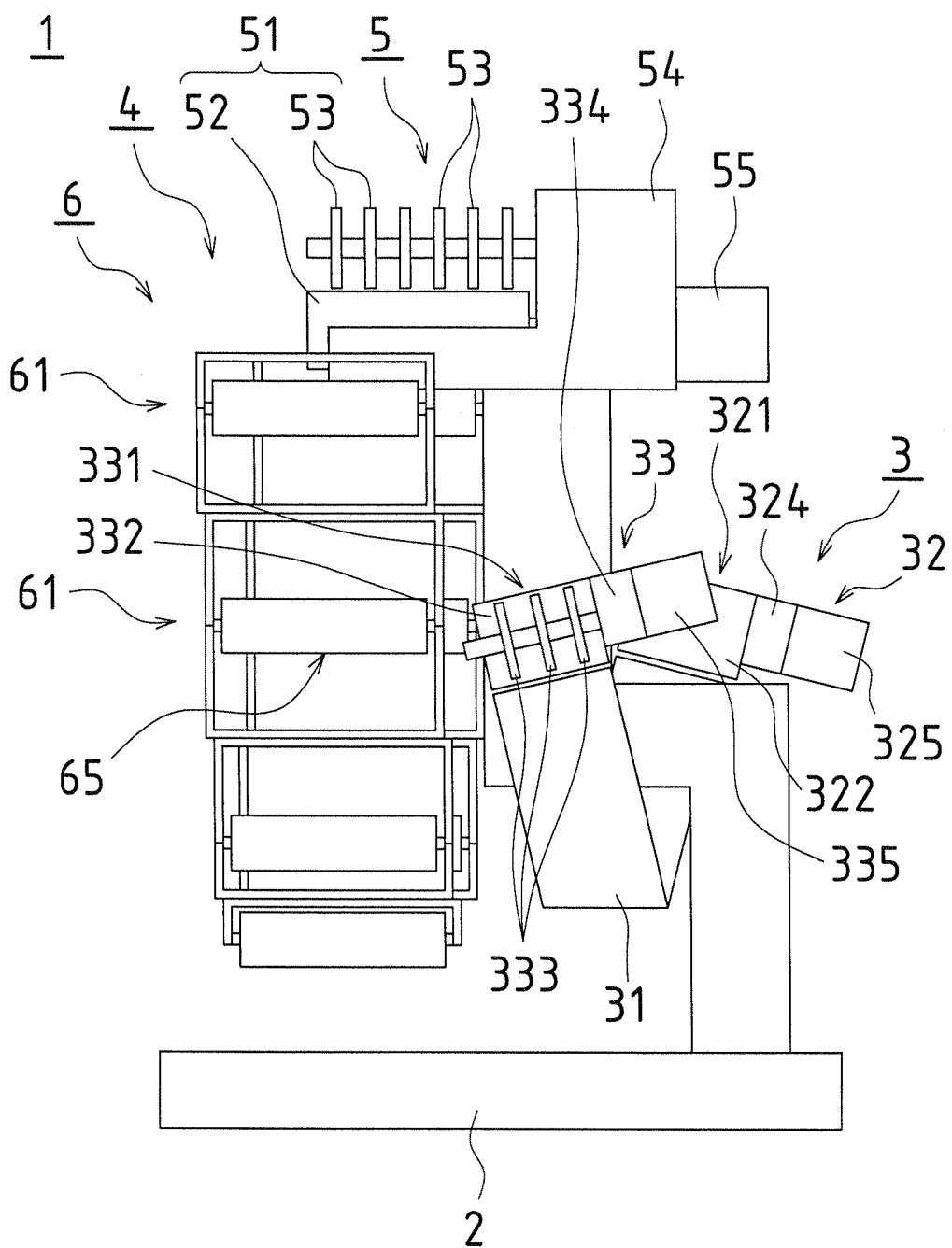
FIG. 3 is a side view showing an embodiment of the apparatus for producing a spiral pipe of the present invention.
Figure 4:
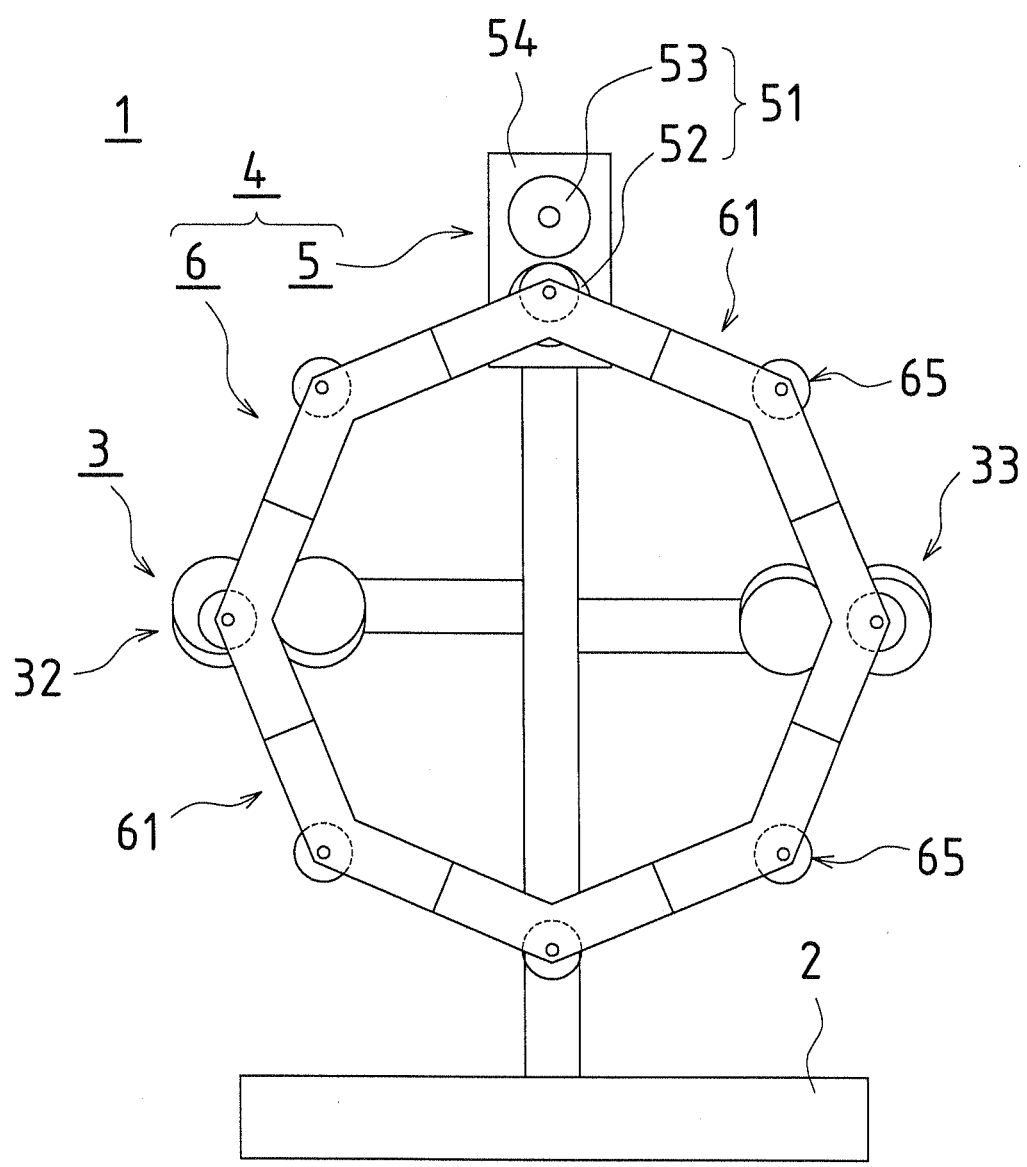
FIG. 4 is a front view of the pipe-producing apparatus of FIG. 3.

As shown in FIGS. 3 and 4, a pipe-producing apparatus 1 of this example continuously produces the spiral pipe S, by continuously and spirally supplying the reinforcing material-attached profile strip 100 such that the axis thereof is substantially horizontal, and joining the side edge portions in the width direction of the mutually adjacent parts of the reinforcing material-attached profile strip 100 to each other. The produced spiral pipe S is extruded from the pipe-producing apparatus 1 in a rotational manner.

In the pipe-producing apparatus 1, a curl-forming apparatus 3 and a pipe-producing machine 4 are integrally arranged on a support base 2.

The curl-forming apparatus 3 includes a spirally formed curl guide 31 made of steel sheet, a first sending roller 32 that is disposed on the upstream side of the curl guide 31, and a second sending roller 33 that is disposed on the downstream side of the curl guide 31.

The curl guide 31 is a spiral plate having a substantially semicircular cross-section in which the radius of curvature thereof is substantially similar to that of the outer diameter of the spiral pipe S produced from the reinforcing material-attached profile strip 100, and, when the continuously supplied reinforcing material-attached profile strip 100 is placed along the inner circumferential face of the spiral plate over the substantially semicircular shape, the reinforcing material-attached profile strip 100 is subjected to plastic deformation to form spirals by being provided with curls having a radius of curvature corresponding to the radius of curvature of the curl guide 31. That is to say, the reinforcing material 120 of the reinforcing material-attached profile strip 100 is subjected to plastic deformation so as to have a radius of curvature substantially corresponding to the radius of curvature of the spiral pipe S that is being produced.

In this case, the radius of curvature of the curl guide 31 may be a radius of curvature not greater than that of the external shape of the spiral pipe S that is being produced.

Figure 5:
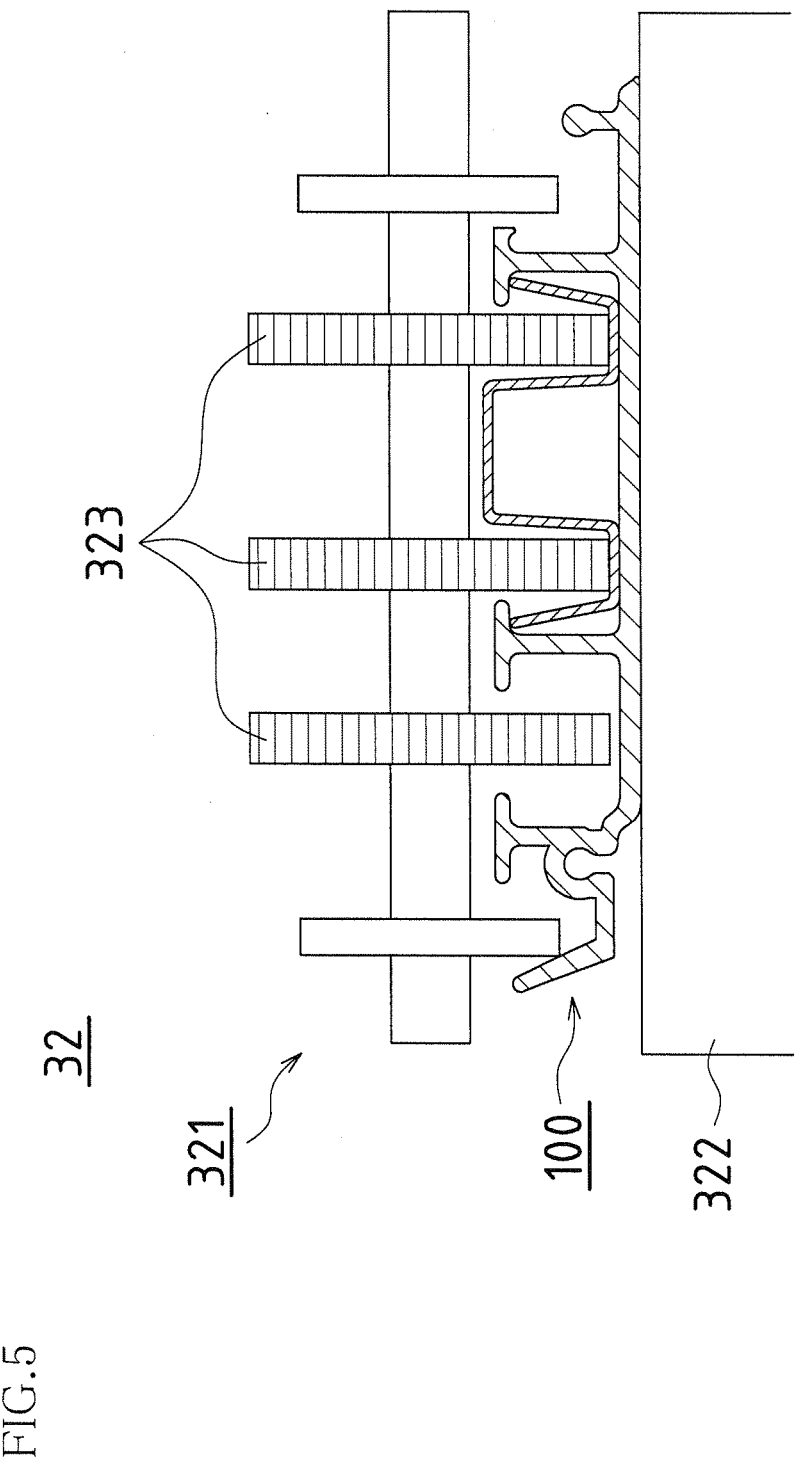
FIG. 5 is an explanatory view showing a first sending roller of a curl-forming apparatus forming the pipe-producing apparatus of FIG. 3.

As shown in FIG. 5, the first sending roller 32 includes a first pinch roller 321 consisting of a set of a first inner roller 322 and first outer rollers 323, and a first oil hydraulic motor 325 that rotates the first pinch roller 321 via gears (not shown) of a gearbox 324 fixed to the support base 2. The rotational shaft of the first inner roller 322 and the rotational shaft of the first outer rollers 323 are arranged orthogonal to a lead angle in which the reinforcing material-attached profile strip 100 is to be supplied, in order to spirally supply the reinforcing material-attached profile strip 100, and are axially supported together with the output shaft of the first oil hydraulic motor 325 in a freely rotatable manner in the gearbox 324. When the first oil hydraulic motor 325 is rotationally driven, the first inner roller 322 and the first outer rollers 323 are rotated in mutually opposite directions via gears that are fixed respectively to the output shaft of the first oil hydraulic motor 325, the rotational shaft of the first inner roller 322, and the rotational shaft of the first outer rollers 323 and that are engaged with each other, and the reinforcing material-attached profile strip 100 is pinched between the first inner roller 322 and the first outer rollers 323 and sent out so as to be pushed toward the curl guide 31.

Here, the first inner roller 322 has a width substantially corresponding to the width of the reinforcing material-attached profile strip 100, is a cylindrical portion made of a comparatively hard material, such as iron or plastic resin, and has an outer diameter set such that the outer circumferential face thereof rotates in contact with the flat inner face of the reinforcing material-attached profile strip 100, that is, a face on the side that is to be the inner circumferential face of the spiral pipe S.

Furthermore, the plurality of first outer rollers 323 having a width that allows insertion into a space between adjacent reinforcing ribs 112 of the reinforcing material-attached profile strip 100 are arranged so as to be positioned between the reinforcing ribs 112 of the reinforcing material-attached profile strip 100, and have an outer diameter set so as to have a spacing corresponding to the thickness of the board 111 of the profile strip 110 in the reinforcing material-attached profile strip 100 between the outer circumferential faces thereof and the outer circumferential face of the first inner roller 322. Accordingly, the outer circumferential faces of the first outer rollers 323 rotate in contact with the back face of the reinforcing material-attached profile strip 100, that is, a face on the side that is to be the outer circumferential face of the spiral pipe S, between the adjacent reinforcing ribs 112 of the reinforcing material-attached profile strip 100.

Here, the outer circumferential faces of the first outer rollers 323 are knurled, and send out the reinforcing material-attached profile strip 100 without slipping.

The second sending roller 33 has the same structure as that of the first sending roller 32, and is disposed on the downstream side of the curl guide 31. That is to say, the second sending roller 33 includes a second pinch roller 331 consisting of a set of a second inner roller 332 and second outer rollers 333, and a second oil hydraulic motor 335 that rotates the second pinch roller 331 via gears (not shown) of a gearbox 334 fixed to the support base 2. The rotational shaft of the second inner roller 332 and the rotational shaft of the second outer rollers 333 are arranged orthogonal to a lead angle in which the reinforcing material-attached profile strip 100 is to be supplied, in order to spirally supply the reinforcing material-attached profile strip 100, and are axially supported together with the output shaft of the second oil hydraulic motor 335 in a freely rotatable manner in the gearbox 334. When the second oil hydraulic motor 335 is rotationally driven, the second inner roller 332 and the second outer rollers 333 are rotated in mutually opposite directions via gears that are fixed respectively to the output shaft of the second oil hydraulic motor 335, the rotational shaft of the second inner roller 332, and the rotational shaft of the second outer rollers 333 and that are engaged with each other, and the reinforcing material-attached profile strip 100 is pinched between the second inner roller 332 and the second outer rollers 333 and sent so as to be taken from the curl guide 31.

Here, the second inner roller 332 has a width substantially corresponding to the width of the reinforcing material-attached profile strip 100, is a cylindrical portion made of iron or the like, and has an outer diameter set such that the outer circumferential face thereof rotates in contact with the flat inner face of the reinforcing material-attached profile strip 100, that is, a face on the side that is to be the inner circumferential face of the spiral pipe S.

Furthermore, the plurality of second outer rollers 333 having a width that allows insertion into a space between adjacent reinforcing ribs 112 of the reinforcing material-attached profile strip 100 are arranged so as to be positioned between the reinforcing ribs 112 of the reinforcing material-attached profile strip 100, and have an outer diameter set so as to have a spacing corresponding to the thickness of the board 111 of the profile strip 110 in the reinforcing material-attached profile strip 100 between the outer circumferential faces thereof and the outer circumferential face of the second inner roller 332. Accordingly, the outer circumferential faces of the second outer rollers 333 rotate in contact with the back face of the reinforcing material-attached profile strip 100, that is, a face on the side that is to be the outer circumferential face of the spiral pipe S, between the adjacent reinforcing ribs 112 of the reinforcing material-attached profile strip 100.

Here, the outer circumferential faces of the second outer rollers 333 are knurled, and send out the reinforcing material-attached profile strip 100 without slipping.

The pipe-producing machine 4 includes a joining mechanism 5 that joins adjacent spiral parts of the reinforcing material-attached profile strip 100 to each other, and a guide frame 6 that guides the spiral pipe S produced by the joining mechanism 5 joining adjacent spiral parts of the reinforcing material-attached profile strip 100 to each other, and is disposed on the downstream side of the curl-forming apparatus 3.

As shown in FIG. 6, the joining mechanism 5 includes a pinch roller 51 consisting of a set of a pipe-producing roller 52 and drive rollers 53, and an oil hydraulic motor 55 that rotates the pinch roller 51 via gears (not shown) of a gearbox 54 fixed to the support base 2. The rotational shaft of the pipe-producing roller 52 and the rotational shaft of the drive rollers 53 are arranged orthogonal to the lead angle of the spiral pipe S, and axially supported together with the output shaft of the oil hydraulic motor 55 in a freely rotatable manner in the gearbox 54. When the oil hydraulic motor 55 is rotationally driven, the pipe-producing roller 52 and the drive rollers 53 are rotated in mutually opposite directions via gears that are fixed respectively to the output shaft of the oil hydraulic motor 55, the rotational shaft of the pipe-producing roller 52, and the rotational shaft of the drive rollers 53 and that are engaged with each other, and the reinforcing material-attached profile strip 100 is pinched between the pipe-producing roller 52 and the drive rollers 53 and sent out toward the guide frame 6.

Here, the pipe-producing roller 52 has a length approximately twice the width of the reinforcing material-attached profile strip 100, is a cylindrical portion made of iron or the like, and has an outer diameter set such that the outer circumferential face thereof rotates in contact with the smooth inner circumferential face of the spiral pipe S produced from the mutually adjacent parts of the reinforcing material-attached profile strip 100 in which the proceeding spiral part of the reinforcing material-attached profile strip 100 and the subsequent spiral part of the reinforcing material-attached profile strip 100 are joined to each other.

Furthermore, as described above, a plurality of the drive rollers 53 having a width that allows insertion into a space between adjacent reinforcing ribs 112 of the reinforcing material-attached profile strip 100 are arranged so as to be positioned between the reinforcing ribs 112 of each part of the reinforcing material-attached profile strip 100, in the mutually adjacent parts of the reinforcing material-attached profile strip 100 in which the proceeding spiral part of the reinforcing material-attached profile strip 100 and the subsequent spiral part of the reinforcing material-attached profile strip 100 are joined to each other, and have an outer diameter set so as to have a spacing corresponding to the thickness of the board 111 of the profile strip 110 in the reinforcing material-attached profile strip 100 between the outer circumferential faces thereof and the outer circumferential face of the pipe-producing roller 52. Accordingly, the outer circumferential faces of the drive rollers 53 rotate in contact with the back face of the reinforcing material-attached profile strip 100 on the side that is to be the outer circumferential face of the spiral pipe S produced from joined mutually adjacent parts of the reinforcing material-attached profile strip 100, between the adjacent reinforcing ribs 112 of each part of the reinforcing material-attached profile strip 100.

Here, the outer circumferential faces of the drive rollers 53 are knurled, and send out joined adjacent parts of the reinforcing material-attached profile strip 100 without slipping.

The guide frame 6 includes a plurality of link members 61 in which a pair of link members 62 and 63 are coupled in a freely rotatable manner via a coupling shaft 64, and guide rollers 65 that are arranged in a freely rotatable manner respectively in the coupling shafts 64 of the link members 61, and the plurality of link members 61 having the guide rollers 65 are coupled to each other substantially in the shape of a ring.

Figure 7A:
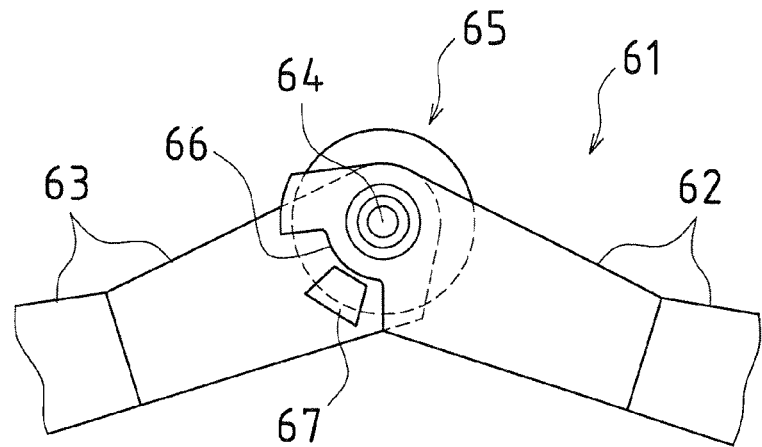
Figure 7B:
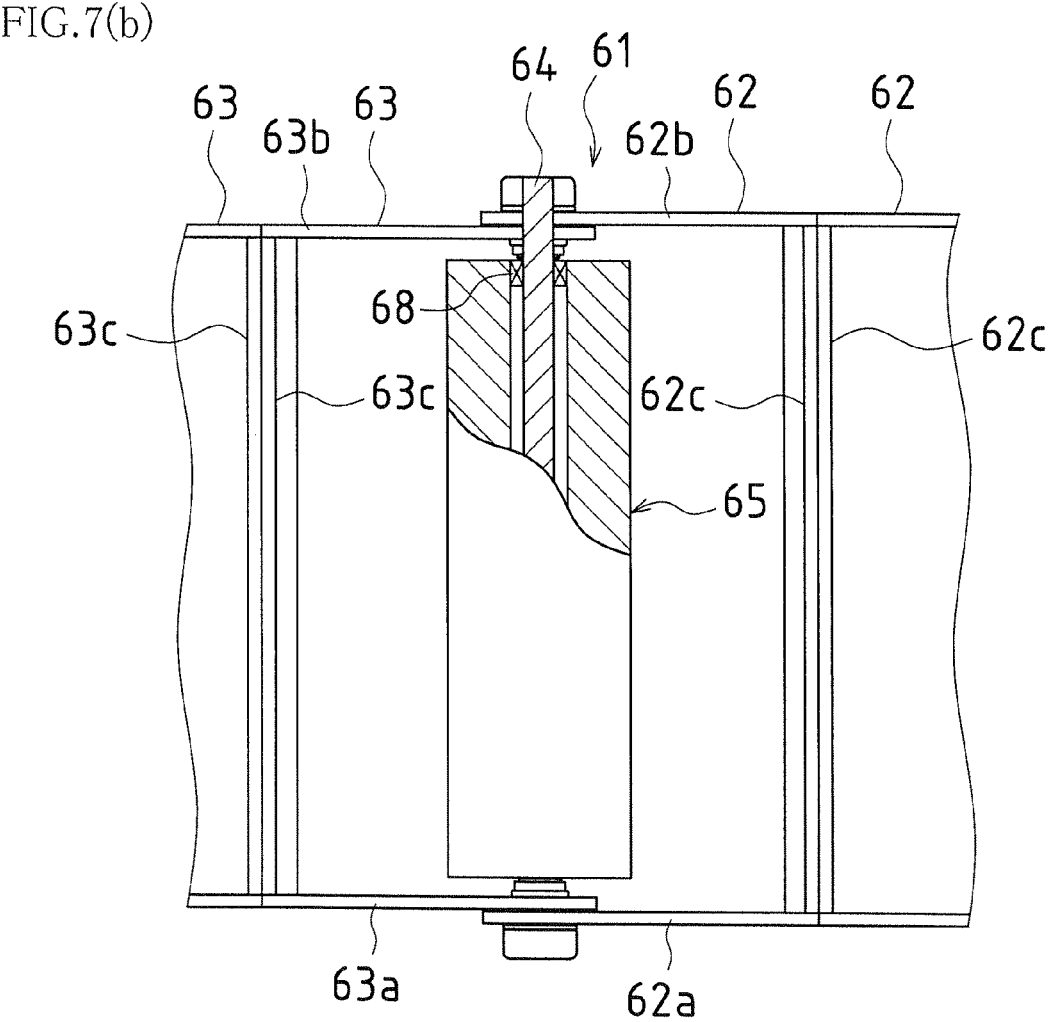

Here, as shown in FIGS. 7(*a*) and 7(*b*), the link members 62 and 63 forming each of the link members 61 are in the shape of sideway Us consisting of front side plates 62*a* and 63*a*, rear side plates 62*b* and 63*b*, and coupling plates 62*c* and 63*e* that extend between opposing end portions on one side of the front side plates 62*a* and 63*a* and the rear side plates 62*b* and 63*b*. Opposing end portions on the other side of the front side plate 63*a* and the rear side plate 63*b* in the link member 63 are overlaid onto opposing end portions on the other side of the front side plate 62*a* and the rear side plate 62*b* in the link member 62, and the overlaid portions are coupled in a freely rotatable manner via the coupling shaft 64 to form the link member 61.

Furthermore, adjacent link members 61 are coupled in a freely attachable and detachable manner via a bolt and a nut (not shown) in a state where the coupling plates 62*c* and 63*c* of the link members 62 and 63 forming a link member 61 and the coupling plates 62*c* and 63*c* of the link members 62 and 63 forming a link member 61 are appropriately combined.

Here, in the case where specific adjacent link members 61 in the guide frame 6 can be attached to and detached from each other, the guide frame 6 can be formed in the shape of a straight line by detaching the link members 61 from each other, and, thus, the other coupling plates 62*c* and 63*c* may be undetachably fixed by welding or the like.

Furthermore, the end portions on the other side of the front side plate 63*a* and the rear side plate 63*b* of the link member 63 have a rotation-restricting piece 67, the end portions on the other side of the front side plate 62*a* and the rear side plate 62*b* of the link member 62 have a notch portion 66 corresponding to the rotation-restricting piece 67 over a certain range on a set radius about the center of rotation of the coupling shaft 64, and the rotational range of the link member 63 with respect to the link member 62 is restricted by the rotation-restricting piece 67 brought into contact with the notch portion 66. Accordingly, inward bending of the link member 61 is restricted.

The guide rollers 65 are made of synthetic resin or metal, axially supported in a freely rotatable manner about the coupling shaft 64 via a shaft bearing 68, and brought into contact with the flat inner face of the reinforcing material-attached profile strip 100, that is, the inner circumferential face of the spiral pipe S.

Furthermore, the guide rollers 65 are arranged so as to be perpendicular to the reinforcing material-attached profile strip 100 in an existing pipe K in order to supply, to the downstream side, the spiral pipe S produced from adjacent parts of the reinforcing material-attached profile strip 100 joined to each other by the joining mechanism 5. In order to dispose the guide rollers 65 so as to be perpendicular to the reinforcing material-attached profile strip 100 forming the spiral pipe S, for example, in the guide frame 6, one link member 61 of a pair of adjacent link members 61 forming coupling portions need only be moved in the axial direction of the pipe with respect to the other link members 61 and fixed after the movement.

<Method for Producing Spiral Pipe>

Next, production of a spiral pipe that refurbishes the existing pipe K using the pipe-producing apparatus 1 will be described.

Preparation Before Application, Etc.

Figure 8:
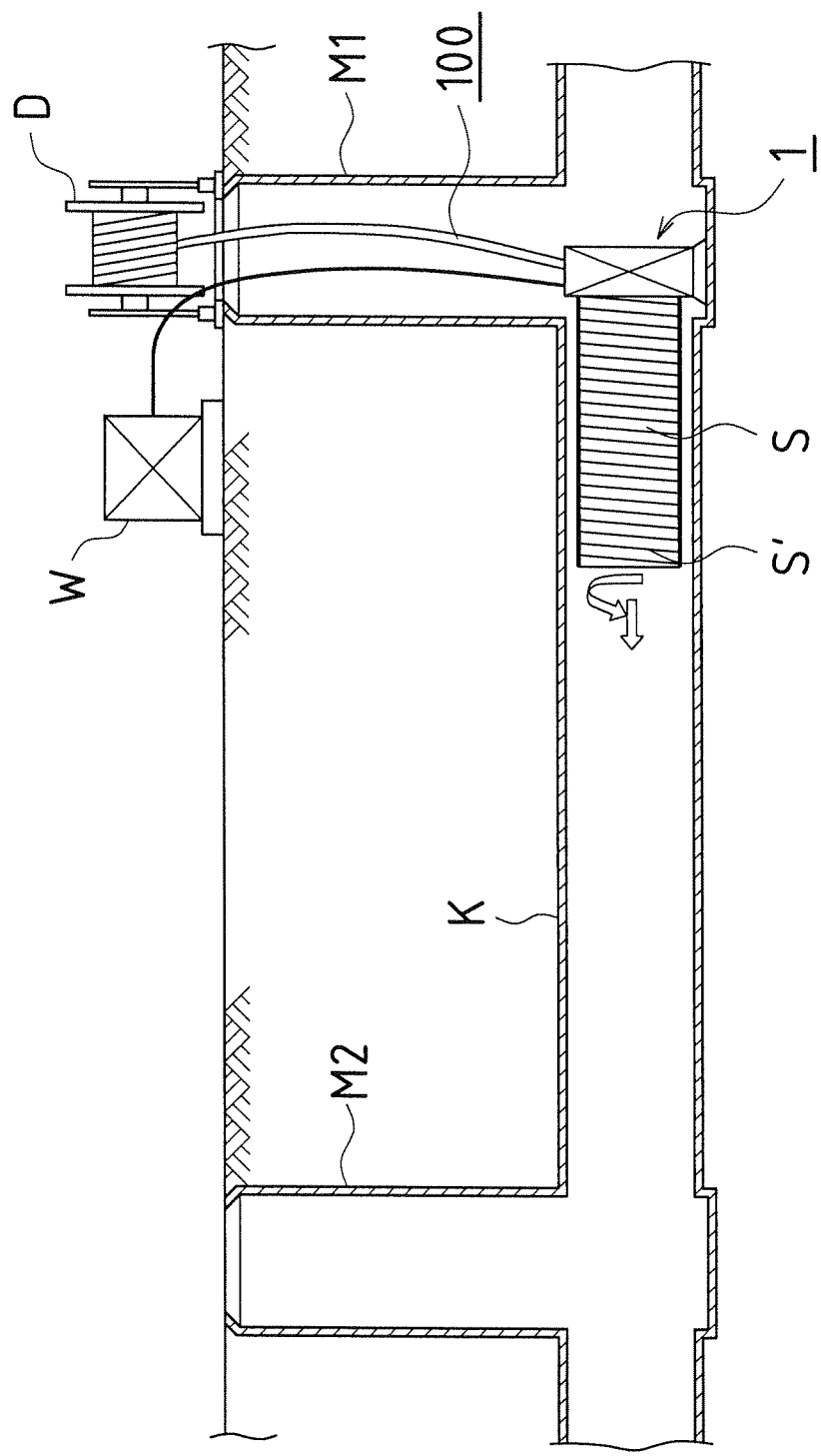
FIG. 8 is an explanatory view of a pipe-producing method using the pipe-producing apparatus of FIG. 3.

As shown in FIG. 8, the existing pipe K has manholes M1 and M2 at every predetermined span. In this example, a manhole on the upstream side of an application target region (refurbishment region) is taken as a departure side manhole M1, and a manhole on the downstream side is taken as an arrival side manhole M2. The manholes M1 and M2 are used to produce the spiral pipe S in the existing pipe K. Production of the spiral pipe S is performed from the departure side manhole M1 to the arrival side manhole M2 of the existing pipe K.

In the production of the spiral pipe S, the drum D (with a rotatable base) about which the reinforcing material-attached profile strip 100 shown in FIG. 1 is wound and the pipe-producing apparatus 1, together with a motive power unit W including an oil hydraulic unit and an electric generator (not shown) and the like, are used. Of these constituent elements, the drum D and the motive power unit W are arranged on the ground on the side of the departure side manhole M1. Furthermore, the pipe-producing apparatus 1 is disposed at an invert in the departure side manhole M1.

At that time, the pipe-producing apparatus 1 is delivered after the pipe-producing apparatus 1 is disassembled into the support base 2, the curl-forming apparatus 3, and the pipe-producing machine 4, and the pipe-producing machine 4 is further disassembled into the joining mechanism 5 and the guide frame 6, and these constituent elements are assembled in the departure side manhole M1. Subsequently, oil hydraulic pipelines from the motive power unit W are respectively connected to the oil hydraulic motors 325 and 335 of the curl-forming apparatus 3 and the oil hydraulic motor 55 of the joining mechanism 5 in the pipe-producing machine 4.

Here, regarding the guide frame 6, coupling of a pair of adjacent link members 61 forming coupling portions is canceled, the plurality of link members 61 are formed into one line and delivered, and the pair of adjacent link members 61 forming coupling portions are again coupled substantially in the shape of a ring, and attached to the support base 2.

Furthermore, regarding the pipe-producing apparatus 1, the curl guide 31 having a corresponding radius of curvature according to the pipe diameter of the spiral pipe S that is to be produced is prepared, and the circumferential length (the number of link members 61) of the guide frame 6 is adjusted.

Furthermore, the pipe-producing apparatus 1 may be adjusted so as to have a spiral pitch corresponding to the inner diameter of the existing pipe K that is to be refurbished and the width of the reinforcing material-attached profile strip 100 that is to be used.

Figure 9A:
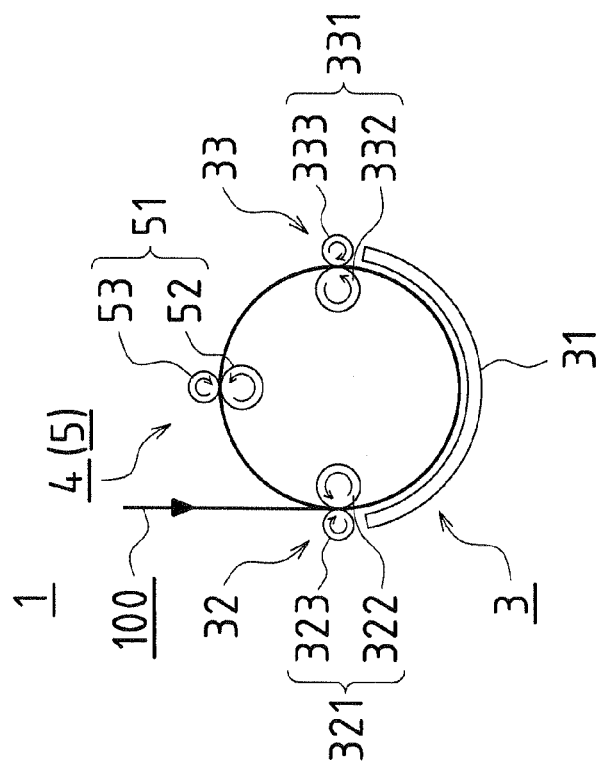
Figure 9B:
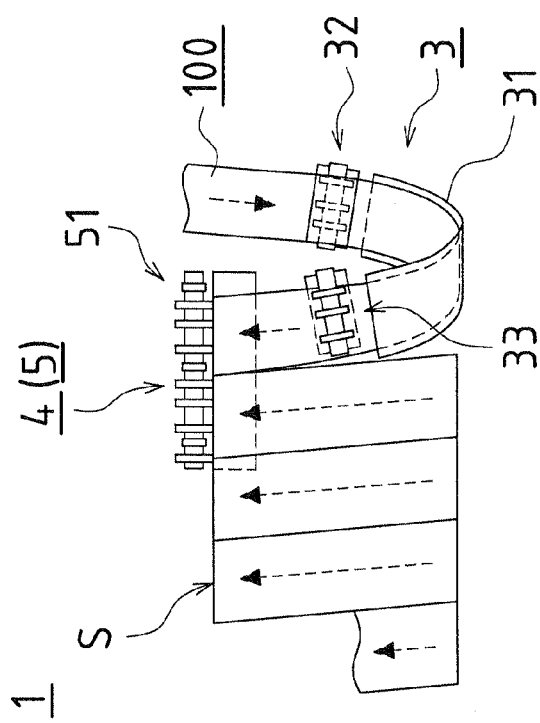

When the preparation operation is completed, the reinforcing material-attached profile strip 100 is pulled out from the outer circumferential side of the drum D disposed on the ground, and pulled into the departure side manhole M1. Then, as shown in FIGS. 9(*a*) and 9(*b*), the front end portion of the reinforcing material-attached profile strip 100 is inserted through the pinch roller 321 of the first sending roller 32 in the curl-forming apparatus 3, and then placed along the inner circumferential face of the curl guide 31, to form arc-like curls having a radius of curvature corresponding to the radius of curvature of the curl guide 31. Next, the front end is inserted through the pinch roller 331 of the second sending roller 33 and subjected to plastic deformation to form spirals, and then inserted through the pinch roller 51 of the joining mechanism 5 in the pipe-producing machine 4 and sent out to the outer circumferential side of the guide frame 6.

In the case where the reinforcing material-attached profile strip 100 is pulled out from the outer circumferential side of the drum D and sequentially supplied via the curl-forming apparatus 3 to the pipe-producing machine 4, when the front end portion of the reinforcing material-attached profile strip 100 is transported along the outer circumferential side of the guide frame 6 and inserted again into the pinch roller 51 of the joining mechanism 5, the subsequent part of the reinforcing material-attached profile strip 100 is inserted into the pinch roller 51 of the joining mechanism 5.

Accordingly, as shown in FIG. 2, the joint recess portion 115 of the subsequent spiral part of the reinforcing material-attached profile strip 100 is fitted from the outer circumferential side to the joint projection portion 113 of the proceeding spiral part of the reinforcing material-attached profile strip 100, the lowered portion 114 of the subsequent part of the reinforcing material-attached profile strip 100 is disposed at the side edge portion of the board 111 having the joint projection portion 113 of the proceeding part of the reinforcing material-attached profile strip 100, and the inclined rib 116 of the subsequent part of the reinforcing material-attached profile strip 100 is caught by the reinforcing rib 112 on the side having the joint projection portion 113 of the proceeding part of the reinforcing material-attached profile strip 100. Accordingly, the adjacent parts of the reinforcing material-attached profile strip 100 are joined to each other, and production of a starting spiral pipe S' is started.

Hereinafter, in a similar manner, the reinforcing material-attached profile strip 100 is sent into the curl-forming apparatus 3, subjected to plastic deformation to form spirals by being provided with arc-like curls having a radius of curvature corresponding to the radius of curvature of the curl guide 31, and inserted through the joining mechanism 5 several times (approximately 1 to 3 times), and, thus, the starting spiral pipe S' is produced.

Production of the Spiral Pipe S Using the Pipe-Producing Apparatus 1

After the production of the starting spiral pipe S' is completed, the first sending roller 32 and the second sending roller 33 of the curl-forming apparatus 3 forming the pipe-producing apparatus 1 are driven, and the joining mechanism 5 of the pipe-producing machine 4 is driven. Accordingly, the first oil hydraulic motor 325 of the first sending roller 32 is rotationally driven to rotate the first pinch roller 321, and the reinforcing material-attached profile strip 100 is pinched between the first inner roller 322 and the first outer rollers 323 and pulled out from the drum D, and pushed toward the curl guide 31. Accordingly, the reinforcing material-attached, profile strip 100 moves along the curl guide 31, is subjected to plastic deformation to form spirals by being continuously provided with arc-like curls having a radius of curvature corresponding to the radius of curvature of the curl guide 31.

Furthermore, the second oil hydraulic motor 335 of the second sending roller 33 is rotationally driven to rotate the second pinch roller 331, and the reinforcing material-attached profile strip 100 is pinched between the second inner roller 332 and the second outer rollers 333 and taken from the curl guide 31, and sent out toward the joining mechanism 5 of the pipe-producing machine 4. Accordingly, the reinforcing material-attached profile strip 100 is subjected to plastic deformation to form spirals by being continuously provided with arc-like curls having a radius of curvature corresponding to the radius of curvature of the curl guide 31, and supplied to the joining mechanism 5 of the pipe-producing machine 4.

Furthermore, the oil hydraulic motor 55 of the joining mechanism 5 is rotationally driven to rotate the pinch roller 51, and the reinforcing material-attached profile strip 100 is pinched between the pipe-producing roller 52 and the drive rollers 53 and taken from the curl-forming apparatus 3, and sent out to the outer circumferential side of the guide frame 6.

At that time, the joint recess portion 115 of the subsequent spiral part of the reinforcing material-attached profile strip 100 is fitted from the outer circumferential side to the joint projection portion 113 of the proceeding spiral part of the reinforcing material-attached profile strip 100, the lowered portion 114 of the subsequent part of the reinforcing material-attached profile strip 100 is disposed at the side edge portion on the rear end side of the board 111 in the proceeding part of the reinforcing material-attached profile strip 100, and the inclined rib 116 of the subsequent part of the reinforcing material-attached profile strip 100 is caught by the reinforcing rib 112 on the rear end side of the proceeding part of the reinforcing material-attached profile strip 100. Accordingly, the adjacent spiral parts of the reinforcing material-attached profile strip 100 are joined to each other, and, thus, the spiral pipe S is produced (see FIG. 2(b)).

Accordingly, adjacent spiral parts of the reinforcing material-attached profile strip 100 positioned after the starting spiral pipe S' are joined to each other, and, thus, the spiral pipe S is continuously produced, and the spiral pipe S together with the starting spiral pipe S' is sent out toward the arrival side manhole M2 while being rotated At that time, the rotational drive of the pinch roller 51 of the joining mechanism 5 in the pipe-producing machine 4, the rotational drive of the first pinch roller 321 of the first sending roller 32 in the curl-forming apparatus 3, and the rotational drive of the second pinch roller 331 of the second sending roller 33 are controlled so as to obtain synchronous drive.

In this manner, the reinforcing material-attached profile strip 100 is sent out from the first pinch roller 321 of the first sending roller 32 and moves along the curl guide 31, and, thus, the reinforcing material-attached profile strip 100 subjected to plastic deformation to form spirals by being provided with arc-like curls having a radius of curvature corresponding to the radius of curvature of the curl guide 31 is sent out from the second pinch roller 331 of the second sending roller 33. Furthermore, the adjacent parts of the reinforcing material-attached profile strip 100 are joined to each other by the pinch roller 51 of the joining mechanism 5 of the pipe-producing machine 4, and, thus, the spiral pipe S is produced, and sent out along the guide frame 6 toward the arrival side manhole M2 while being rotated.

As a result, the reinforcing material-attached profile strip 100 is transported via the curl-forming apparatus 3 and subjected to plastic deformation to form spirals by being continuously provided with arc-like curls having a radius of curvature substantially similar to a target radius of curvature of the spiral pipe S, and then supplied to the joining mechanism 5, and, thus, the spiral pipe S is produced. Thus, a restoring force that restores the reinforcing material-attached profile strip 100 to its original radius of curvature when wound about the drum D does not act during production of the pipe. Accordingly, when the reinforcing material-attached profile strip 100 is spirally supplied and the spiral pipe S is produced, even in the case where the rigidity of the reinforcing material 120 is large, a spiral pipe S having a target pipe diameter and a target length can be reliably produced.

Completion of Pipe Production and Removal of the Pipe-Producing Apparatus 1, Etc.

When production of the spiral pipe S ends over the entire length of the application target region (refurbishment region) of the existing pipe K, the reinforcing material-attached profile strip 100 is cut at the pipe end portion of the spiral pipe 8, and then the pipe-producing apparatus 1 is disassembled and removed from the departure side manhole M.

That is to say, since the guide frame 6 includes the plurality of link members 61 coupled to each other, when coupling of a pair of adjacent link members 61 forming coupling portions is canceled, the guide frame 6 can be formed into one line of the link members 61. Furthermore, the joining mechanism 5 and the curl-forming apparatus 3 are separated from the support base 2, and these constituent elements are removed from the departure side manhole M1.

In the foregoing embodiment, the curl-forming apparatus 3 in which the first sending roller 32 and the second sending roller 33 are respectively arranged on the upstream side and on the downstream side of the curl guide 31 is exemplified, but either one of the first sending roller 32 that pushes the reinforcing material-attached profile strip 100 toward the curl guide 31 and the second sending roller 33 that takes the reinforcing material-attached profile strip 100 from the curl guide 31 need only be provided.

Furthermore, the curl guide 31 may be formed so as to extend near the joining mechanism 5 of the pipe-producing machine 4, and the second sending roller 33 may be omitted.

Furthermore, the curl guide 31 is exemplified as an arc-like spiral plate, but there is no limitation to a spiral plate. For example, although a detailed description thereof is not given, a curl guide 31 may be formed in which a plurality of rotating rollers that are circumscribed about an arc-like spiral face having a radius of curvature substantially similar to or not greater than the radius of curvature of the spiral pipe S are axially supported in a freely rotatable manner with a spacing interposed therebetween in the spiral direction, and arc-like curls having a radius of curvature substantially similar to or not greater than the radius of curvature of the spiral pipe S may be formed by placing the reinforcing material-attached profile strip 100 along the plurality of rotating rollers.

Figure 10:
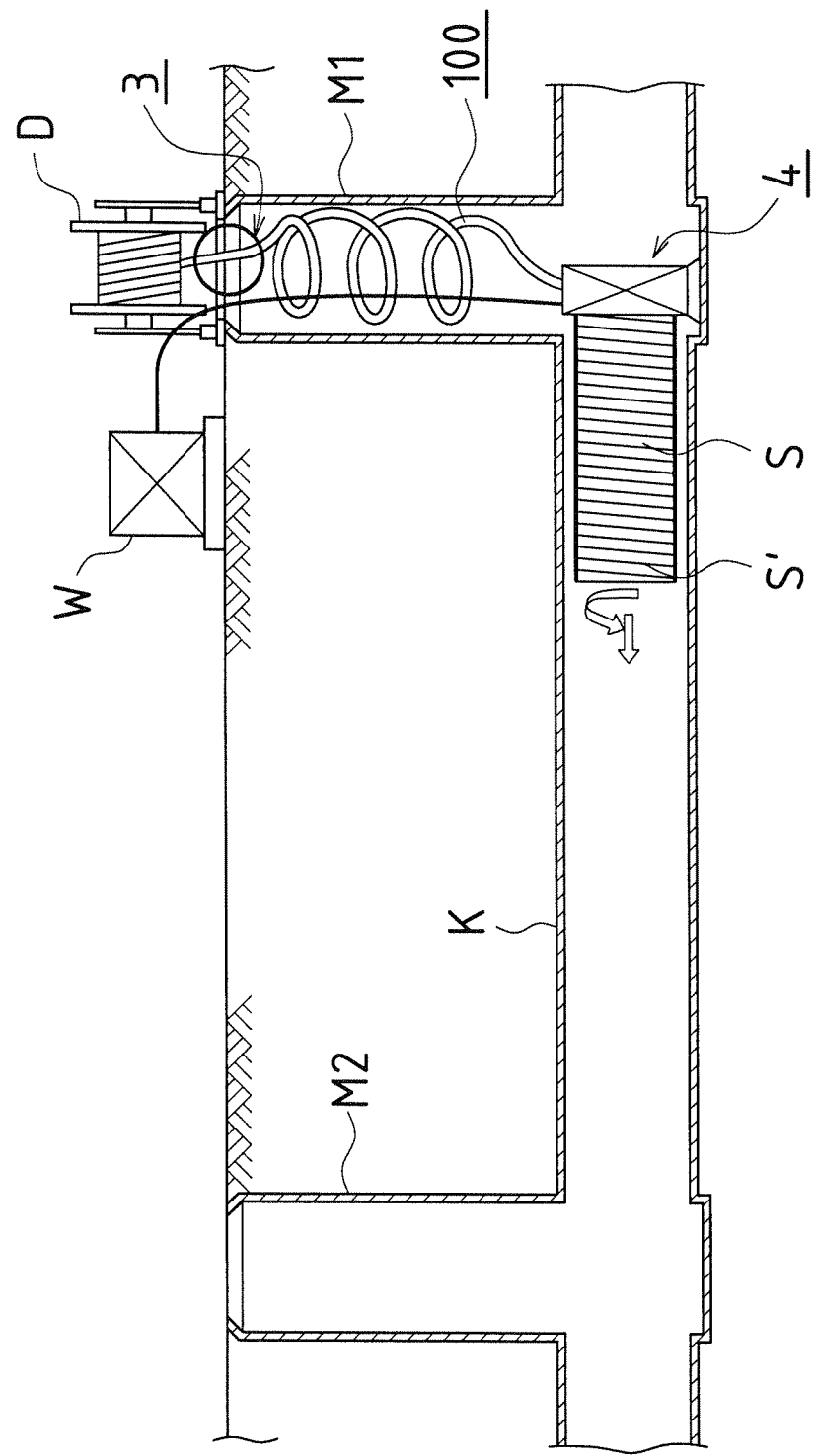
FIG. 10 is an explanatory view of a pipe-producing method according to a modified example using the pipe-producing apparatus of FIG. 3.

Furthermore, in the foregoing embodiment, the pipe-producing apparatus 1 is described in which the curl-forming apparatus 3 and the pipe-producing machine 4 are integrally arranged, but the curl-forming apparatus 3 may be disposed separately from the pipe-producing machine 4, for example, as shown in FIG. 10, on the ground near the departure side manhole M1, and form the pipe-producing apparatus 1 together with the pipe-producing machine 4 disposed in the departure side manhole M1.

Figure 11A:
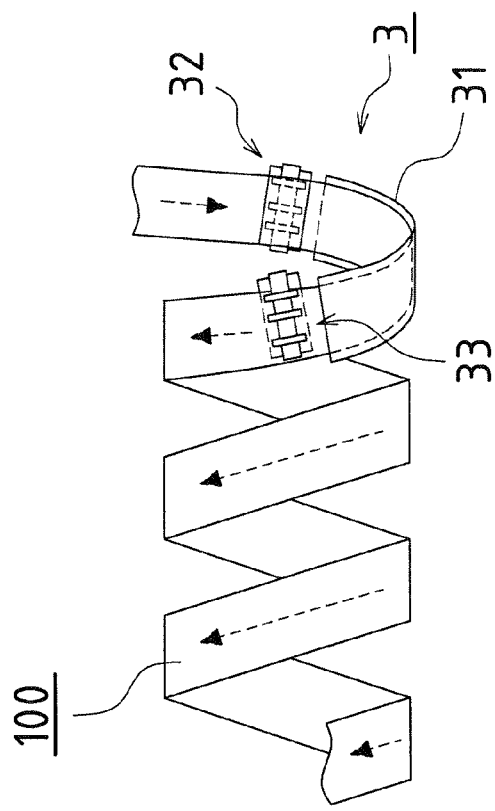
Figure 11B:
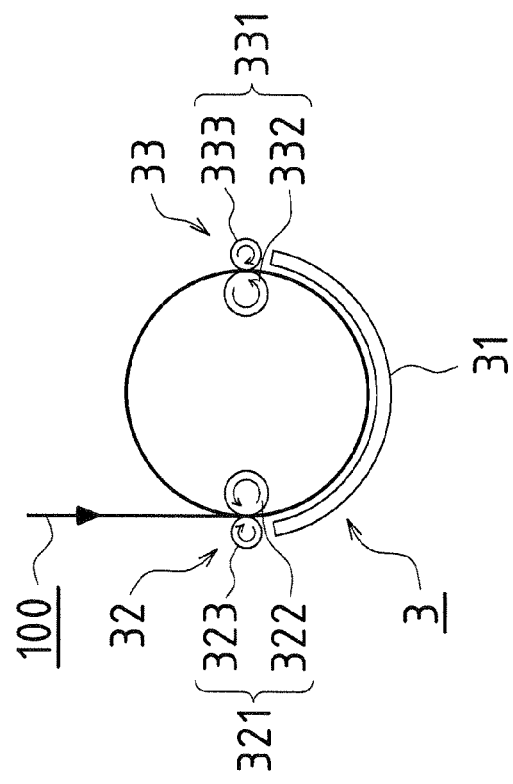

As shown in FIG. 11, this curl-forming apparatus 3 includes a curl guide 31 that is made of a spirally molded steel sheet, a first pinch roller 321 that is disposed on the upstream side of the curl guide 31, a second pinch roller 331 that is disposed on the downstream side of the curl guide 31, and an oil hydraulic motor (not shown) that rotationally drives either one pinch roller of the first pinch roller 321 and the second pinch roller 331 via gears.

Here, the curl guide 31, the first pinch roller 321, and the second pinch roller 331 have the same configuration as described above, and the same configurations are denoted by the same reference numerals and a detailed description thereof is omitted.

Also in this embodiment, when the continuously supplied reinforcing material-attached profile strip 100 is placed along the inner circumferential face of the curl guide 31 over the substantially semicircular shape, the reinforcing material attached profile strip 100 can be subjected to plastic deformation to form spirals by being provided with arc-like curls having a radius of curvature corresponding to the radius of curvature of the curl guide 31. Then, in the case where the first pinch roller 321 is rotated via the oil hydraulic motor and the gears, the first inner roller 322 and the first outer roller 323 forming the first pinch roller 321 are rotated in mutually opposite directions, and, thus, the reinforcing material-attached profile strip 100 can be pinched between the first inner roller 322 and the first outer roller 323 and pushed into the curl guide 31. Conversely, in the case where the second pinch roller 331 is rotated via the oil hydraulic motor and the gears, the second inner roller 332 and the second outer roller 333 forming the second pinch roller 331 are rotated in mutually opposite directions, and, thus, the reinforcing material-attached profile strip 100 can be pinched between the second inner roller 332 and the second outer roller 333 and taken from the curl guide 31.

In this manner, the reinforcing material-attached profile strip 100 that is pushed in by the first pinch roller 321 and then sent out via the curl guide 31 and the second pinch roller 331, or the reinforcing material-attached profile strip 100 that is transported via the first pinch roller 321 and the curl guide 31 and taken by the second pinch roller 331 is subjected to plastic deformation to form spirals by being continuously provided with arc-like curls having a radius of curvature corresponding to the radius of curvature of the curl guide 31, and guided via the departure side manhole M1 to the joining mechanism 5 of the pipe-producing machine 4.

Then, the reinforcing material-attached profile strip 100 subjected to plastic deformation to form spirals having a radius of curvature corresponding to the radius of curvature of the curl guide 31 is processed such that, at the joining mechanism 5 of the pipe-producing machine 4, the joint recess portion 115 of the subsequent spiral part of the reinforcing material-attached profile strip 100 is fitted from the outer circumferential side to the joint projection portion 113 of the proceeding spiral part of the reinforcing material-attached profile strip 100, the lowered portion 114 of the subsequent part of the reinforcing material-attached profile strip 100 is disposed at the side edge portion on the rear end side of the board 111 in the proceeding part of the reinforcing material-attached profile strip 100, and the inclined rib 116 of the subsequent part of the reinforcing material-attached profile strip 100 is caught by the reinforcing rib 112 on the rear end side of the proceeding part of the reinforcing material-attached profile strip 100. Accordingly the adjacent spiral parts of the reinforcing material-attached profile strip 100 are joined to each other, and, thus the spiral pipe S is continuously produced, and sent out toward the arrival side manhole M2 while being rotated.

Accordingly, also in this embodiment, the reinforcing material-attached profile strip 100 is transported via the curl-forming apparatus 3 and subjected to plastic deformation to form spirals by being continuously provided with arc-like curls having a radius of curvature substantially similar to a target radius of curvature of the spiral pipe S, and then supplied to the joining mechanism 5, and, thus, the spiral pipe S is produced. Thus, a restoring force that restores the reinforcing material-attached profile strip 100 to its original radius of curvature when wound about the drum D) does not act during production of the pipe.

Accordingly, when the reinforcing material-attached profile strip 100 is spirally supplied and the spiral pipe S is produced, even in the case where the rigidity of the reinforcing material 120 is large, a spiral pipe S having a target pipe diameter and a target length can be reliably produced.

In this embodiment, the curl guide 31 is exemplified as an arc-like spiral plate, but, since the curl-forming apparatus 3 is disposed separately from the pipe-producing machine 4, the reinforcing material-attached profile strip 100 does not have to be immediately supplied to the joining mechanism 5 of the pipe-producing machine 4. Accordingly, an arc-like cylindrical plate also may be used instead of a spiral plate.

Furthermore, the curl guide 31 may have a shape other than an arc-like spiral plate or an arc-like cylindrical plate. For example, although a detailed description thereof is not given, a curl guide may be used in which a plurality of rotating rollers that are circumscribed about an arc-like spiral face or cylindrical face having a radius of curvature substantially similar to or not greater than the radius of curvature of the spiral pipe S are axially supported in a freely rotatable manner with a spacing interposed therebetween in the spiral direction or the circumferential direction.

Here, in the foregoing embodiment, the pipe-producing apparatus 1 in which the curl-forming apparatus 3 is integrally disposed on the upstream side of the pipe-producing machine 4 that is disposed in the departure side manhole M1, that joins adjacent spiral parts of the reinforcing material-attached profile strip 100 to each other to produce the spiral pipe S, and that rotates and sends out the produced spiral pipe S toward the arrival side manhole M2, or the pipe-producing apparatus 1 in which the curl-forming apparatus 3 is separately disposed on the upstream side of the pipe-producing machine is described, but a pipe-producing apparatus may be used in which the curl-forming apparatus 3 is disposed at a pipe-producing machine that joins adjacent spiral parts of the reinforcing material-attached profile strip 100 to produce the spiral pipe S, that leaves the produced spiral pipe S behind, and that newly supplies the reinforcing material-attached profile strip 100 in front of the produced spiral pipe S, thereby producing a pipe produced while adding the spiral pipe S.

Example 2

Next, Example 2 according to the present invention will be described.

Figure 12:
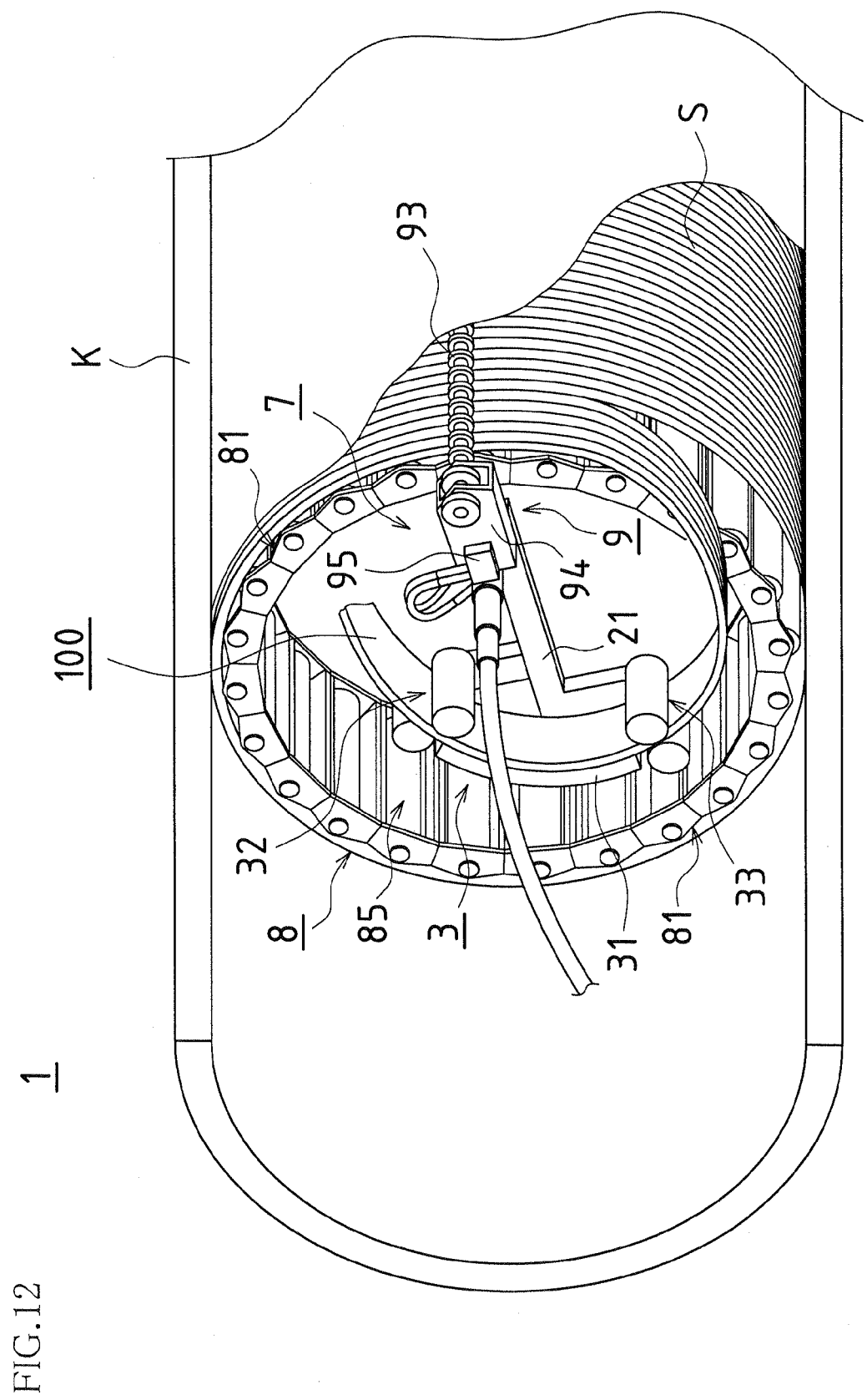
FIG. 12 is a partial cutaway perspective view of another embodiment of the apparatus for producing a spiral pipe of the present invention.
Figure 13:
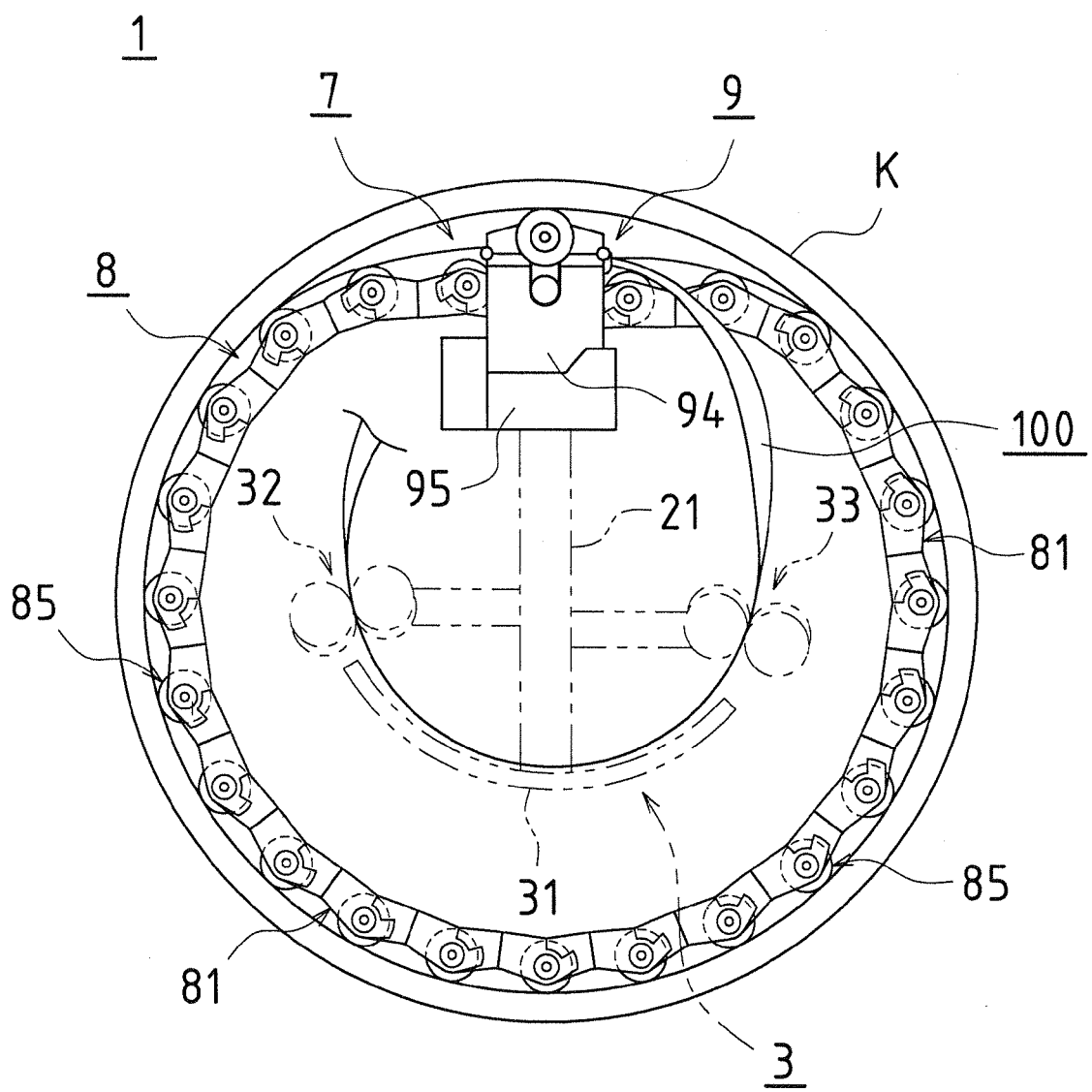
FIG. 13 is a front view of the pipe-producing apparatus of FIG. 12.

As shown in FIGS. 12 and 13, in the pipe-producing apparatus 1 in this example, the curl-forming apparatus 3 is integrally disposed in a pipe-producing machine 7.

Here, the curl-forming apparatus 3 is the same as in the foregoing embodiment. Thus, the same configurations are denoted by the same reference numerals and a detailed description thereof is omitted. Here, the pipe-producing machine 7 will be mainly described.

The pipe-producing machine 7 includes a molding frame 8 that receives a spirally supplied reinforcing material-attached profile strip 100 and produces a spiral pipe S, and a joining mechanism 9 that is attached to the molding frame 8 and joins adjacent spiral parts of the reinforcing material-attached profile strip 100 to each other. The curl-forming apparatus 3 is attached via a support frame 21 to a gearbox 94 of the joining mechanism 9 (described later).

Figure 14A:
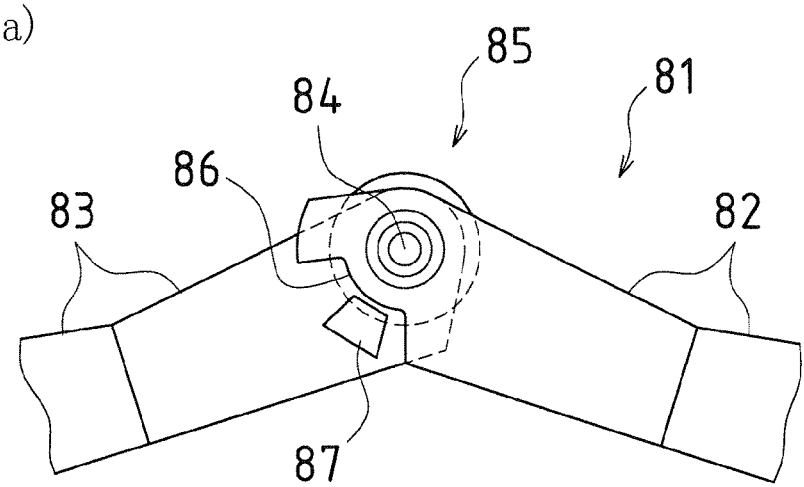

The molding frame 8 has a structure similar to that of the guide frame 6. That is to say, as shown in FIGS. 14(a) and 14(b), the molding frame 8 includes a plurality of link members 81 in which a pair of link members 82 and 83 are coupled in a freely rotatable manner via a coupling shaft 84, and guide rollers 85 that are arranged in a freely rotatable manner respectively in the coupling shafts 84 of the link members 81, and the plurality of link members 81 having the guide rollers 85 are coupled to each other substantially in the shape of a ring.

Figure 14B:
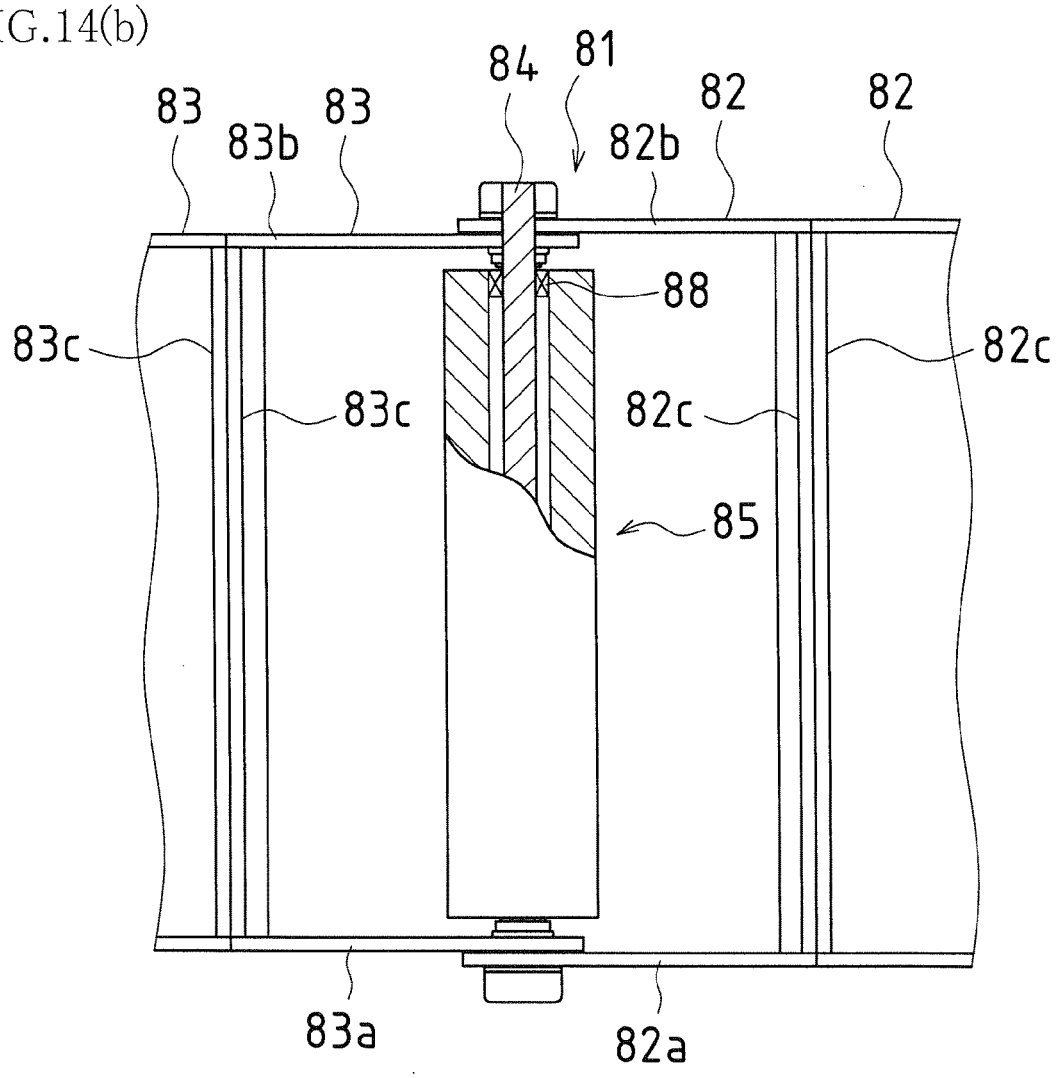

Here, as shown in FIG. 14(b), the link members 82 and 83 forming each of the link members 81 are in the shape of sideway Us consisting of front side plates 82a and 83a, rear side plates 82b and 83b, and coupling plates 82c and 83e that extend between opposing end portions on one side of the front side plates 82a and 83a and the rear side plates 82b and 83b. Opposing end portions on the other side of the front side plate 83a and the rear side plate 83b in the link member 83 are overlaid onto opposing end portions on the other side of the front side plate 82a and the rear side plate 82b in the link member 82, and the overlaid portions are coupled in a freely rotatable manner via the coupling shaft 84 to form the link member 81.

Furthermore, adjacent link members 81 are coupled in a freely attachable and detachable manner via a bolt and a nut (not shown) in a state where the coupling plates 82e and 83c of the link members 82 and 83 forming a link member 81 and the coupling plates 82c and 83c of the link members 82 and 83 forming a link member 81 are appropriately combined.

Here, in the case where a specific pair of adjacent link members 81 can be attached and detached such that the molding frame 8 can be formed in the shape of a straight line, the other coupling plates 82c and 83c may be undetachably fixed by welding or the like.

Furthermore, the end portions on the other side of the front side plate 83a and the rear side plate 83b of the link member 83 have a rotation-restricting piece 87, the end portions on the other side of the front side plate 82a and the rear side plate 82b of the link member 82 have a notch portion 86 corresponding to the rotation-restricting piece 87 over a certain range on a set radius about the center of rotation of the coupling shaft 84, and the rotational range of the link member 83 with respect to the link member 82 is restricted by the rotation-restricting piece 87 brought into contact with the notch portion 86. Accordingly, inward bending of the link member 81 is restricted.

The guide rollers 85 are arranged in a freely rotatable manner respectively in the coupling shafts 84 of the link members 81. Here, the guide rollers 85 are made of synthetic resin or metal, axially supported in a freely rotatable manner about the coupling shaft 84 via a shaft bearing 88, and brought into contact with the flat inner face of the reinforcing material-attached profile strip 100, that is, the inner circumferential face of the spiral pipe S.

Furthermore, the guide rollers 85 are arranged so as to be perpendicular to the reinforcing material-attached profile strip 100 forming the spiral pipe S in the existing pipe K in order to rotate and move the pipe-producing machine 7 forward in contact with the inner circumferential face of the spiral pipe S produced from adjacent parts of the reinforcing material-attached profile strip 100 joined to each other by the joining mechanism 9.

Figure 15:
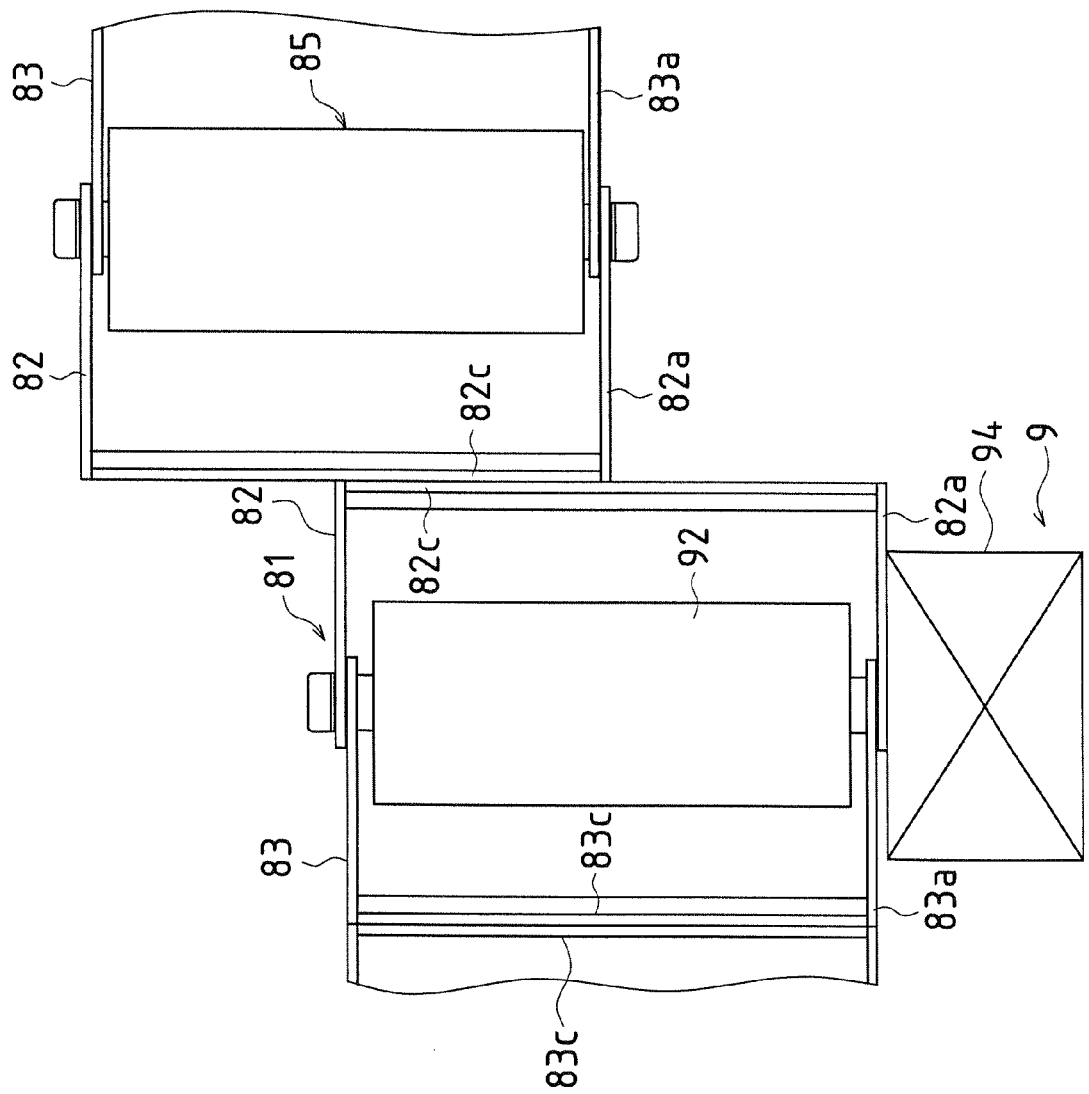
FIG. 15 is a plan view illustrating the link member of the molding frame to which a joining mechanism forming the pipe-producing apparatus of FIG. 12 is attached.

As shown in FIG. 15, a pipe-producing roller 92 (described later) is disposed instead of the guide roller 85, in a link member 81 to which the joining mechanism 9 is attached among the link members 81, and the link member 81 after the joining mechanism 9 is displaced in the opposite direction to the spiral pipe formation direction by the width of the reinforcing material-attached profile strip 100 from the link member 81 to which the joining mechanism 9 is attached so as not to interfere with the supply of the reinforcing material-attached profile strip 100.

Figure 16:
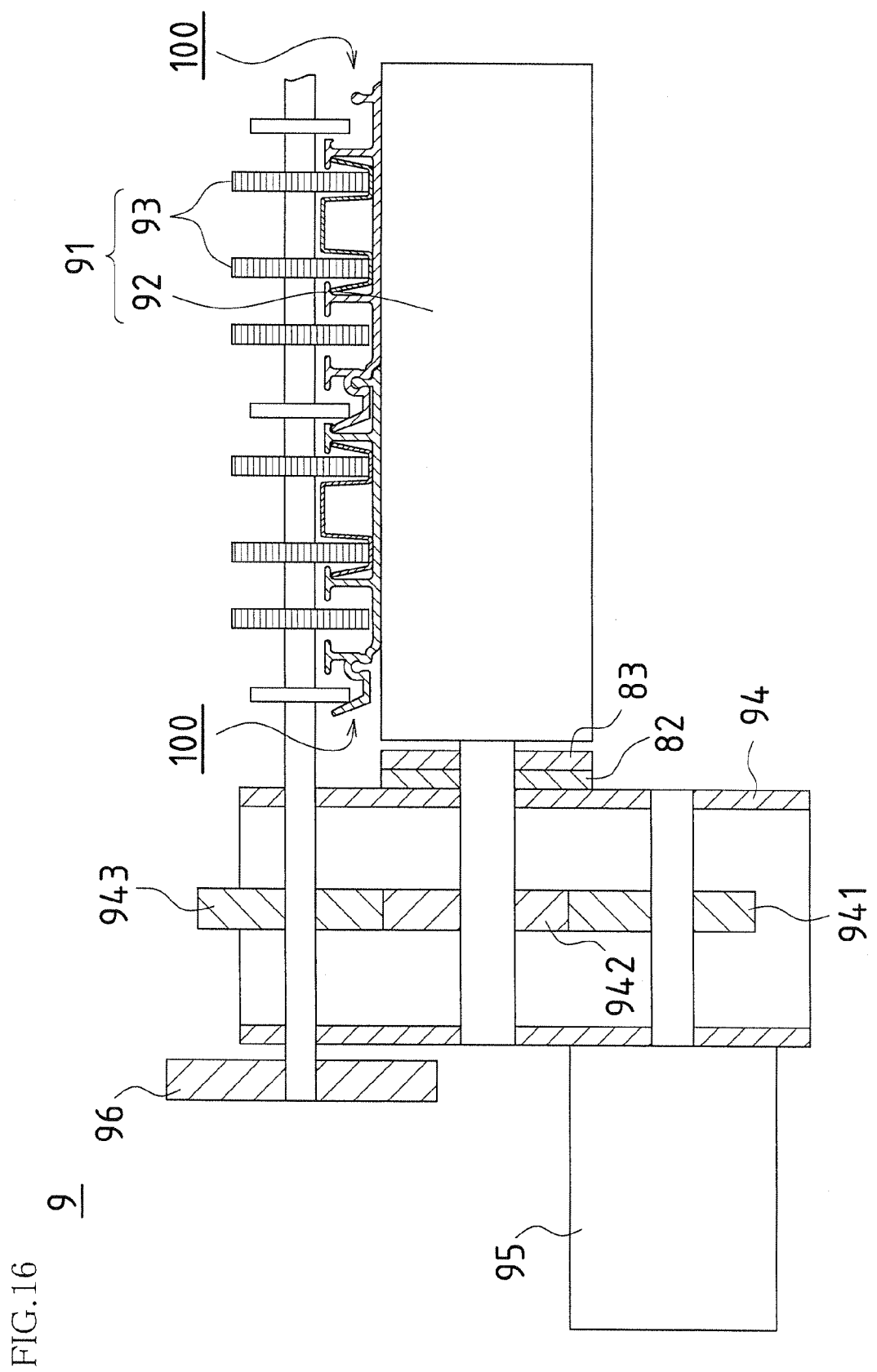
FIG. 16 is a side view showing the joining mechanism forming the pipe-producing apparatus of FIG. 12.

As shown in FIG. 16, the joining mechanism 9 includes a pinch roller 91 consisting of a set of a pipe-producing roller 92 and drive rollers 93, and an oil hydraulic motor 95 that rotates the pinch roller 91 via gears 941, 942, and 943 of the gearbox 94 fixed to the link member 82 of the link member 81 in the molding frame 8, and the rotational shaft of the pipe producing roller 92 and the rotational shaft of the drive rollers 93 are arranged orthogonal to the lead angle of the spiral pipe S, and axially supported together with the output shaft of the oil hydraulic motor 95 in a freely rotatable manner in the gearbox 94. The rotational direction is set such that, when the oil hydraulic motor 95 is rotationally driven, the pipe-producing roller 92 and the drive rollers 93 are rotated in mutually opposite directions via the gears 941, 942, and 943 that are fixed respectively to the output shaft of the oil hydraulic motor 95, the rotational shaft of the pipe-producing roller 92, and the rotational shaft of the drive rollers 93 and that are engaged with each other, and the reinforcing material-attached profile strip 100 is pinched between the pipe-producing roller 92 and the drive rollers 93 and sent out.

Here, the pipe-producing roller 92 has a length approximately twice the width of the reinforcing material-attached profile strip 100, is a cylindrical portion made of iron or the like, and has an outer diameter set such that the outer circumferential face thereof rotates in contact with the smooth inner circumferential face of the spiral pipe S produced from the mutually adjacent parts of the reinforcing material-attached profile strip 100 in which the proceeding spiral part of the reinforcing material-attached profile strip 100 and the subsequent spiral part of the reinforcing material-attached profile strip 100 are joined to each other.

Furthermore, the plurality of drive rollers 93 having a width that allows insertion into a space between adjacent reinforcing ribs 112 of the reinforcing material-attached profile strip 100 are arranged so as to be positioned between the reinforcing ribs 112 of each part of the reinforcing material-attached profile strip 100, in the mutually adjacent parts of the reinforcing material-attached profile strip 100 in which the proceeding spiral part of the reinforcing material-attached profile strip 100 and the subsequent spiral part of the reinforcing material-attached profile strip 100 are joined to each other, and have an outer diameter set so as to have a spacing corresponding to the thickness of the board 111 of the profile strip 110 in the reinforcing material-attached profile strip 100 between the outer circumferential faces thereof and the outer circumferential face of the pipe-producing roller 92. Accordingly, the outer circumferential faces of the drive rollers 93 rotate in contact with the back face of the reinforcing material-attached profile strip 100 on the side that is to be the outer circumferential face of the spiral pipe S produced from joined mutually adjacent parts of the reinforcing material-attached profile strip 100, between the adjacent reinforcing ribs 112 of each part of the reinforcing material-attached profile strip 100.

Furthermore, the outer circumferential faces of the drive rollers 93 are knurled, and revolve with respect to joined adjacent parts of the reinforcing material-attached profile strip 100 without slipping.

Here, a spacer roller 96 having an outer diameter slightly larger than the outer diameter of the drive rollers 93 is axially supported in a freely rotatable manner on the rotational shaft of the drive rollers 93 axially supported in the gearbox 94 of the joining mechanism 9, and when the outer circumferential face of the spacer roller 96 rotates in contact with the inner circumferential face of the existing pipe K, due to a reaction thereof, circumferential movement along the inner circumferential face of the existing pipe K is obtained. That is to say, when the joining mechanism 9 is driven, the pipe-producing apparatus 1 revolves about the axis of the spiral pipe S.

Figure 17:
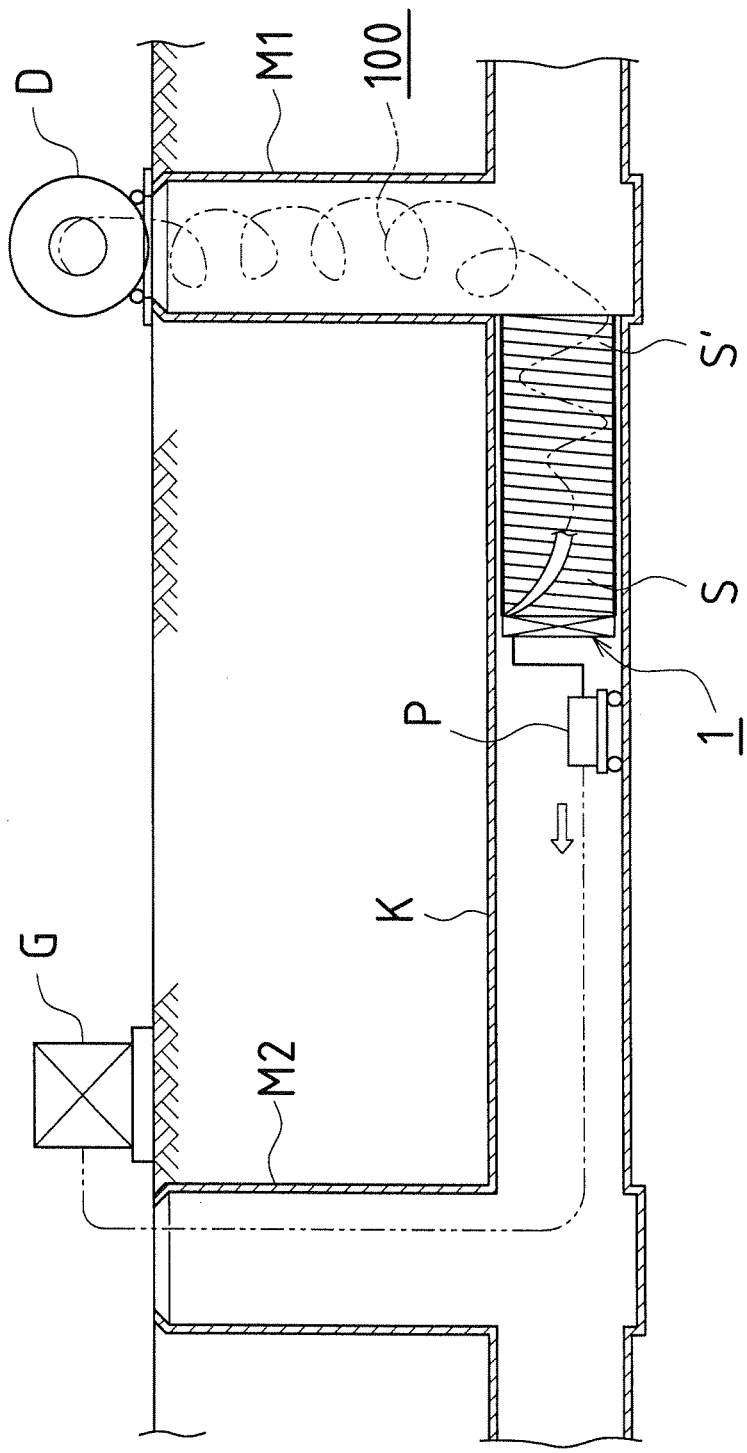
FIG. 17 is an explanatory view of a pipe-producing method using the pipe-producing apparatus of FIG. 12.

Furthermore, the oil hydraulic motor 95 is driven by pressure oil supplied from an oil hydraulic unit P via a pressure oil hose, and the oil hydraulic unit P is driven by electrical power supplied from an electric generator G (see FIG. 17). In this case, the pressure oil hose extending from the oil hydraulic unit P is connected via a rotation joint to the oil hydraulic motor 95, and can supply pressure oil without affecting circumferential movement (revolution) of the pipe-producing apparatus 1.

<Method for Producing Spiral Pipe>

Next, production of the spiral pipe S that refurbishes the existing pipe K from the departure side manhole M1 on the upstream side to the arrival side manhole M2 on the downstream side using the thus-configured pipe-producing apparatus 1 will be described.

As shown in FIG. 17, for production of the spiral pipe S as preparation before application, the drum D (with a rotatable base) about, which the reinforcing material-attached profile strip 100 (see FIG. 1) is wound, the pipe-producing apparatus 1, the oil hydraulic unit P, the electric generator G, and the like are prepared, the drum D is disposed on the ground on the side of the departure side manhole M1, and the electric generator G, is disposed on the ground on the side of the arrival side manhole M2. Furthermore, the pipe producing apparatus 1 and the oil hydraulic unit P are delivered via the departure side manhole M1 and arranged at an upstream end portion in the existing pipe K functioning as a refurbishment target. At that time, the pipe-producing apparatus 1 is delivered after the pipe-producing apparatus 1 is disassembled into the curl-forming apparatus 3 and the pipe producing machine 7, and the pipe-producing machine 7 is further disassembled into the molding frame 8 and the joining mechanism 9, and these constituent elements are then assembled. Next, the pressure oil hoses from the oil hydraulic unit P are respectively connected via rotation joints to the oil hydraulic motors 325 and 335 of the curl-forming apparatus 3 and the oil hydraulic motor 95 of the joining mechanism 9 in the pipe-producing machine 7.

Here, regarding the molding frame 8, coupling of a pair of adjacent link members 81 forming coupling portions is canceled, the plurality of link members 81 are formed into one line and delivered, and the pair of adjacent link members 81 forming coupling portions are again coupled substantially in the shape of a ring.

Furthermore, regarding the pipe-producing apparatus 1, the curl guide 31 having a corresponding radius of curvature according to the pipe diameter of the spiral pipe S that is to be produced is prepared, and the circumferential length (the number of link members 81) of the molding frame 8 is adjusted. In this example, the curl guide 31 corresponds to a radius of curvature smaller than the pipe diameter of the spiral pipe S.

Furthermore, the pipe-producing apparatus 1 is adjusted so as to have a spiral pitch corresponding to the inner diameter of the existing pipe K that is to be refurbished and the width of the reinforcing material-attached profile strip 100 that is to be used.

When this preparation operation is completed, the reinforcing material-attached profile strip 100 is pulled out from the inner circumferential side of the drum D disposed on the ground, and pulled via the departure side manhole M1 into the existing pipe K, the front end portion thereof is inserted through the pinch roller 321 of the first sending roller 32 in the curl-forming apparatus 3, and then placed along the inner circumferential face of the curl guide 31, to form arc-like curls having a radius of curvature corresponding to the radius of curvature of the curl guide 31. Next, the front end portion of the reinforcing material-attached profile strip 100 is inserted through the pinch roller 331 of the second sending roller 33, inserted through the pinch roller 91 of the joining mechanism 9 in the pipe-producing machine 7, and sent out to the outside of the guide rollers 85 of the molding frame 8. In this manner, the reinforcing material-attached profile strip 100 is sequentially sent into the curl-forming apparatus 3, subjected to plastic deformation to form spirals by being continuously provided with arc-like curls having a radius of curvature corresponding to the radius of curvature of the curl guide 31, and sent out via the joining mechanism 9 to the outside of the guide rollers 85 of the molding frame 8.

Next, in a state where the reinforcing material-attached profile strip 100 sent out to the outside of the guide rollers 85 of the molding frame 8 is pinched with the inner circumferential face of the existing pipe K, the pipe-producing apparatus 1 is manually rotated, the reinforcing material-attached profile strip 100 is wound several times (1 to 3 times) about the molding frame 8 of the pipe-producing machine 7, and, thus the starting spiral pipe S' is produced. At that time, the joining mechanism 9 circumferentially moves, and, thus, the joint projection portion 113 of the subsequent spiral part of the reinforcing material-attached profile strip 100 is fitted from the inner circumferential side to the joint recess portion 115 of the proceeding spiral part of the reinforcing material-attached profile strip 100, the side edge portion of the hoard 111 having the joint projection portion 113 of the subsequent spiral part of the reinforcing material-attached profile strip 100 is disposed at the lowered portion 114 of the proceeding spiral part of the reinforcing material-attached profile strip 100, and the reinforcing rib 112 on the side having the joint projection portion 113 of the subsequent spiral part of the reinforcing material-attached profile strip 100 is caught by the inclined rib 116 of the proceeding spiral part of the reinforcing material-attached profile strip 100. Accordingly, the adjacent spiral parts of the reinforcing material-attached profile strip 100 are joined to each other.

After the production of the starting spiral pipe S' is completed, the joining mechanism 9 of the pipe-producing machine 7 forming the pipe-producing apparatus 1 is driven, and the first sending roller 32 and the second sending roller 33 of the curl-forming apparatus 3 are driven. Accordingly, the oil hydraulic motor 95 of the joining mechanism 9 is rotationally driven to rotate the pinch roller 91, the pipe-producing roller 92 and the drive rollers 93 pinch and send out the reinforcing material-attached profile strip 100 and circumferentially move (revolve) relatively in the opposite direction to the sending direction along the reinforcing material-attached profile strip 100. At that time, the reinforcing material-attached profile strip 100 guided by the guide rollers 85 of the molding frame 8 circumferentially moved due to the rotation of the pinch roller 91 and relatively sent so as to be adjacent to the starting spiral pipe S' is subjected to plastic deformation to form spirals by being provided with arc-like curls having a radius of curvature corresponding to the radius of curvature of the curl guide 31, the joint projection portion 113 thereof is fitted from the inner circumferential side to the joint recess portion 115 of the reinforcing material-attached profile strip 100 of the starting spiral pipe S', the side edge portion on the rear end side of the subsequent part of the reinforcing material-attached profile strip 100 is disposed at the lowered portion 114 of the reinforcing material-attached profile strip 100 of the starting spiral pipe S', and the reinforcing rib 112 on the rear end side of the subsequent part of the reinforcing material-attached profile strip 100 is caught by the inclined rib 116 of the reinforcing material-attached profile strip 100 of the starting spiral pipe S'. Accordingly, the adjacent spiral parts of the reinforcing material-attached profile strip 100 are joined to each other, and, thus, the spiral pipe S is produced.

In this manner, the pinch roller 91 of the joining mechanism 9 circumferentially moves while joining the subsequent spiral part of the reinforcing material-attached profile strip 100 to the proceeding spiral part of the reinforcing material-attached profile strip 100 to produce the spiral pipe S. As a result, the pipe-producing apparatus 1 including the pipe-producing machine 7 and the curl-forming apparatus 3 produces the spiral pipe S from the reinforcing material-attached profile strip 100, and, at that time, moves (revolves) in the circumferential direction and moves forward in the axial direction of the pipe toward the arrival side manhole M2.

When the first sending roller 32 and the second sending roller 33 of the curl-forming apparatus 3 circumferentially moved together with the pipe-producing machine 7 are driven along with this sort of pipe-producing operation using the pipe-producing machine 7, the first oil hydraulic motor 325 of the first sending roller 32 is rotationally driven to rotate the first pinch roller 321, and the reinforcing material-attached profile strip 100 is pinched between the first inner roller 322 and the first outer rollers 323 and pulled out from the drum D, and pushed toward the curl guide 31. Accordingly, the reinforcing material-attached profile strip 100 moves along the curl guide 31, and is provided with arc-like curls having a radius of curvature corresponding to the radius of curvature of the curl guide 31. Furthermore, the second oil hydraulic motor 335 of the second sending roller 33 is rotationally driven to rotate the second pinch roller 331, and the reinforcing material-attached profile strip 100 is pinched between the second inner roller 332 and the second outer rollers 333 and taken from the curl guide 31 and sent out toward the joining mechanism 9 of the pipe-producing machine 7. Accordingly, the reinforcing material-attached profile strip 100 is subjected to plastic deformation to form spirals by being continuously provided with curls, and then supplied to the joining mechanism 9 of the pipe-producing machine 7.

The rotational drive of the pinch roller 91 of the joining mechanism 9 in the pipe-producing machine 7, the rotational drive of the first pinch roller 321 of the first sending roller 32 in the curl-forming apparatus 3, and the rotational drive of the second pinch roller 331 of the second sending roller 33 are controlled so as to obtain synchronous drive.

In this manner, the reinforcing material-attached profile strip 100 is sent out from the first pinch roller 321 of the first sending roller 32 in the curl-forming apparatus 3, taken by the second pinch roller 331 of the second sending roller 33 via the curl guide 31, and subjected to plastic deformation to form spirals by being continuously provided with arc-like curls having a radius of curvature corresponding to the radius of curvature of the curl guide 31, and then supplied to the pipe-producing machine 7, the adjacent parts of the reinforcing material-attached profile strip 100 are joined to each other by the pinch roller 91 of the joining mechanism 9, and, thus, the spiral pipe S is produced, the produced spiral pipe S is left behind, the spiral reinforcing material-attached profile strip 100 is newly supplied in front of the produced spiral pipe S, and the spiral pipe S is sequentially and additionally produced toward the arrival side manhole M2.

As a result, the reinforcing material-attached profile strip 100 is transported via the curl-forming apparatus 3 and subjected to plastic deformation to form spirals by being continuously provided with arc-like curls having a radius of curvature substantially similar to a target radius of curvature of the spiral pipe S, and then supplied to the joining mechanism 9, and, thus, the spiral pipe S is produced. Thus, the action of a restoring force that restores the reinforcing material-attached profile strip 100 to its original radius of curvature during production of the pipe can be suppressed as much as possible. Accordingly when the reinforcing material-attached profile strip 100 is spirally supplied and the spiral pipe S is produced, even in the case where the rigidity of the reinforcing material 120 is large, a spiral pipe S having a target pipe diameter and a target length can be reliably produced.

When production of the spiral pipe S ends over the entire length of the application target region (refurbishment region) of the existing pipe K, the reinforcing material-attached profile strip 100 is cut at the pipe end portion of the spiral pipe S, and then the pipe-producing apparatus 1 is disassembled, and the pipe-producing apparatus 1, the oil hydraulic unit P, and the like are removed.

That is to say, since the molding frame 8 includes the plurality of link members 81 coupled to each other, when coupling of a pair of adjacent link members 81 forming coupling portions is canceled, the molding frame 8 can be formed into one line of the link members 81. Furthermore, the curl-forming apparatus 3 is separated from the pipe-producing machine 7 and removed.

Here, in this example, the curl-forming apparatus 3 in which the first sending roller 32 and the second sending roller 33 are respectively arranged on the upstream side and on the downstream side of the curl guide 31 is exemplified, but either one of the first sending roller 32 that pushes the reinforcing material-attached profile strip 100 toward the curl guide 31 and, the second sending roller 33 that takes the reinforcing material-attached profile strip 100 from the curl guide 31 need only be provided.

Furthermore, the curl guide 31 may be formed so as to extend near the joining mechanism 9 of the pipe-producing machine 7, and the second sending roller 33 may be omitted.

Furthermore, the curl guide 31 is exemplified as an arc-like spiral plate, but there is no limitation to a spiral plate. For example, although a detailed description thereof is not given, a curl guide may be formed in which a plurality of rotating rollers that are circumscribed about an arc-like spiral face having a radius of curvature substantially similar to or not greater than the radius of curvature of the spiral pipe S are axially supported in a freely rotatable manner with a spacing interposed therebetween in the spiral direction, and the reinforcing material-attached profile strip 100 may be placed along the plurality of rotating rollers. Arc-like curls having a radius of curvature substantially similar or not greater than that of the spiral pipe S may be formed using this configuration.

Figure 18:
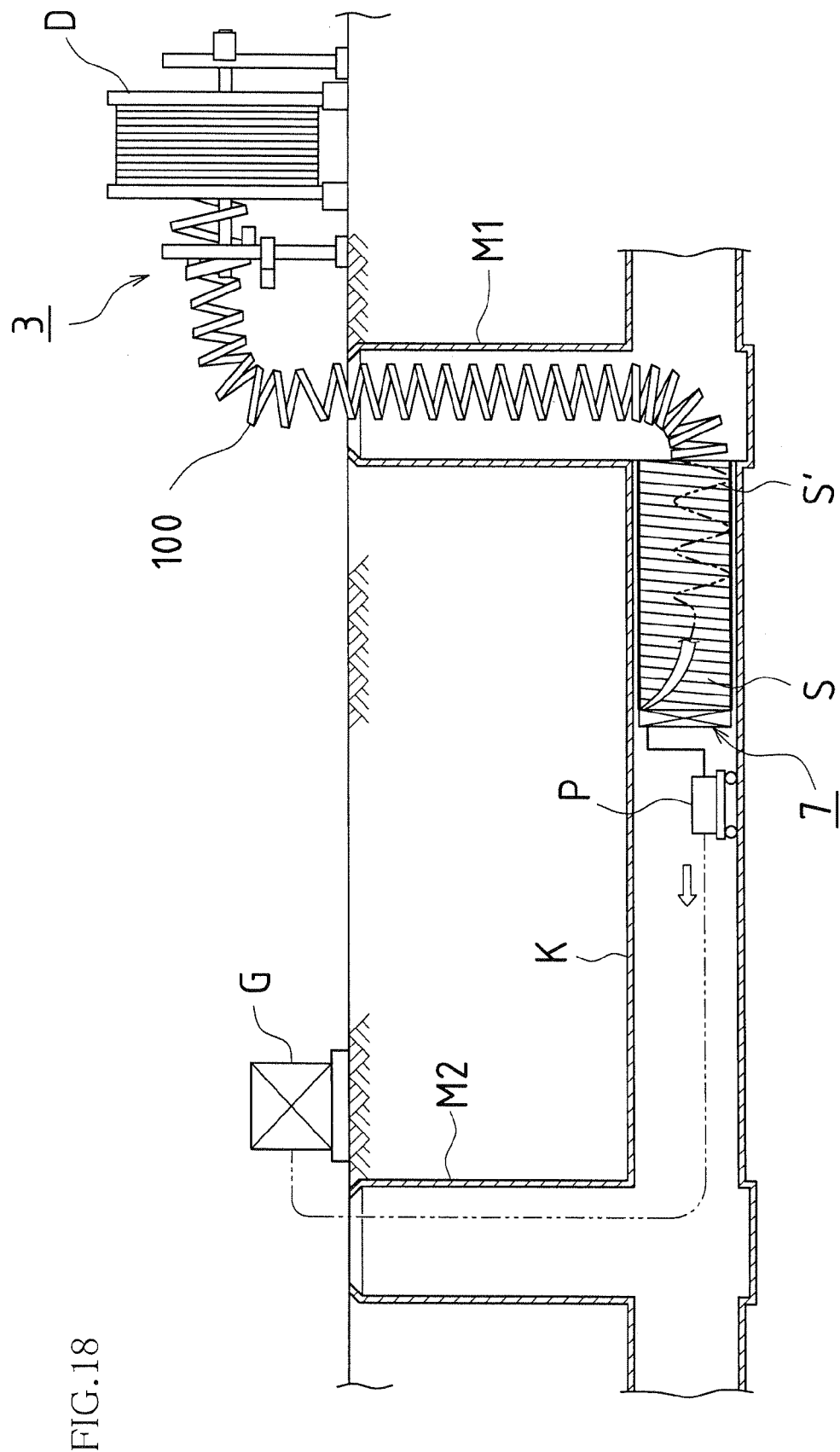
FIG. 18 is an explanatory view showing, with respect to FIG. 17, a pipe-producing method according to a modified example using the pipe-producing apparatus of FIG. 12.

Furthermore, in this example, the pipe-producing apparatus 1 is described in which the curl-forming apparatus 3 and the pipe-producing machine 7 are integrally arranged, but the curl-forming apparatus 3 may be disposed separately from the pipe-producing machine 7, for example, as shown in FIG. 18, on the ground near the departure side manhole M, and form the pipe-producing apparatus 1 together with the pipe-producing machine 7 disposed in the existing pipe K.

Figure 19:
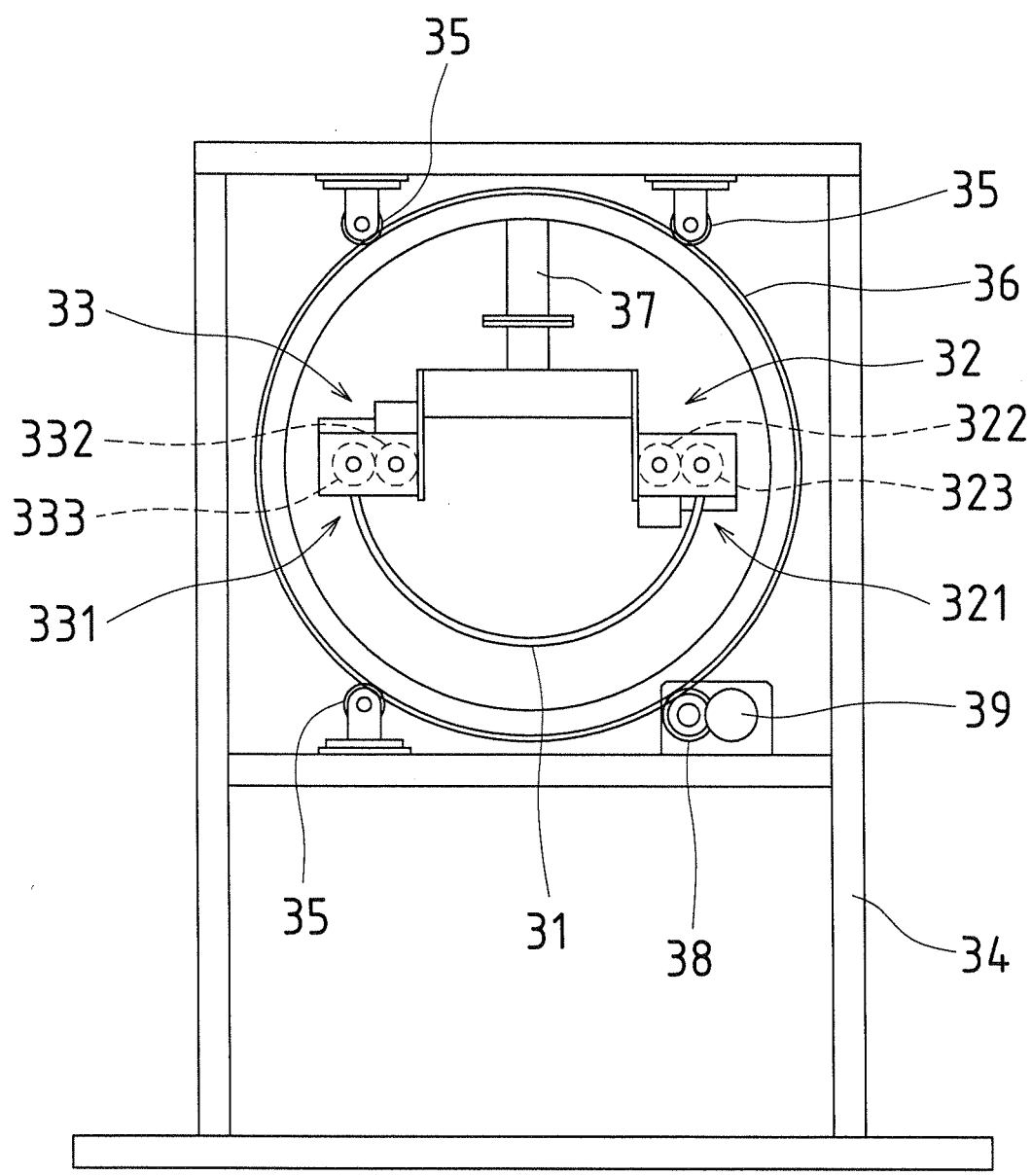
FIG. 19 is a front view showing a curl-forming apparatus forming the pipe-producing apparatus of FIG. 18.
Figure 20:
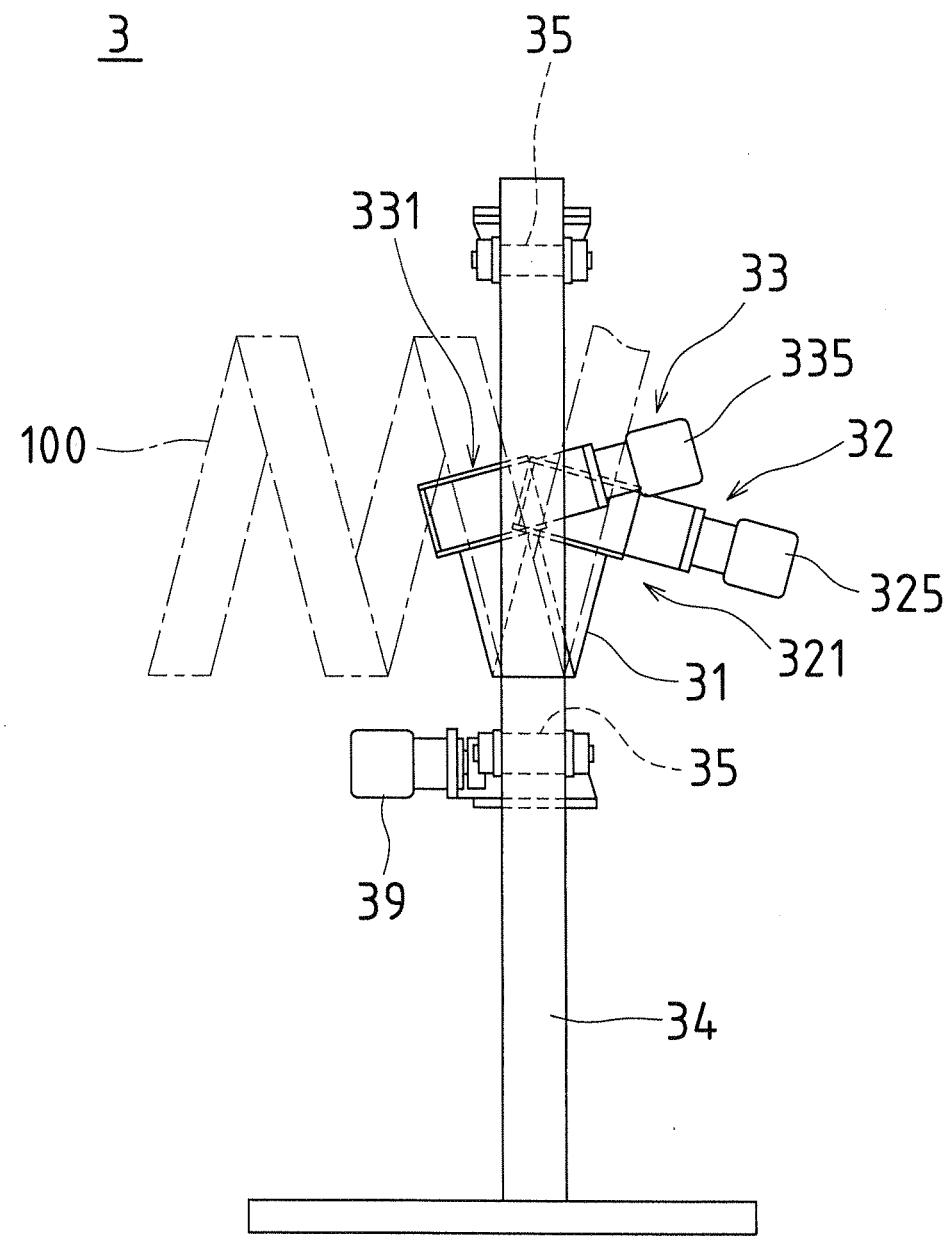
FIG. 20 is a side view of the curl-forming apparatus of FIG. 19.

As shown in FIGS. 19 and 20, this curl-forming apparatus 3 includes a support frame 34, a ring-shaped rotating frame 36 that is supported in a freely rotatable manner via a plurality of support rollers 35 by the support frame 34, a first sending roller 32 and a second sending roller 33 that are arranged via an attachment bracket 37 at the rotating frame 36, a curl guide 31 that extends between the first sending roller 32 and the second sending roller 38, and a drive roller 38 and a drive motor 39 that are fixed to the support frame 34 and rotationally drive the rotating frame 36.

Furthermore, in the curl-forming apparatus 3, when the drive motor 39 is rotationally driven, the drive roller 38 is rotationally driven, and the rotating frame 36 that is supported by the support rollers 35 rotates in the opposite direction to the rotational direction of the drive roller 38. Accordingly, the curl guide 31, the first sending roller 32, and the second sending roller 33 arranged via the attachment bracket 37 at the rotating frame 36 rotate in the same direction. In this case, the rotating frame 36 is rotated in the opposite direction to the supply direction of the reinforcing material-attached profile strip 100 and at the same speed as the supply speed, and, thus, when the reinforcing material-attached profile strip 100 is sent out from the curl-forming apparatus 3, a relative excess or deficiency in the sending out of the spiral reinforcing material-attached profile strip 100 does not occur with respect to the spiral pipe S that is left behind and produced by the revolving pipe-producing machine 7, and the reinforcing material-attached profile strip 100 can be prevented from being twisted.

That is to say, this configuration can prevent the following problems: when the spiral pipe S is produced by the pipe-producing machine 7, if the rotating frame 36 does not rotate or rotates too slowly, the spiral reinforcing material-attached profile strip 100 is excessively sent out with respect to the spiral pipe S that is left behind and produced, the reinforcing material-attached profile strip 100 is twisted, and curls are reversed, or, if the rotating frame 36 rotates too fast, the amount of spiral reinforcing material-attached profile strip sent out is reduced with respect to the spiral pipe that is left behind and produced, the curl diameter of the spiral reinforcing material-attached profile strip 100 is gradually reduced, and the reinforcing material-attached profile strip 100 is deformed.

Here, when the reinforcing material-attached profile strip 100 is pulled out from the inner circumferential side of the drum D, the spiral direction varies depending on the direction in which the reinforcing material-attached profile strip 100 is pulled out, and, thus, the reinforcing material-attached profile strip 100 pulled out from the drum D is guided to one sending roller. Accordingly, a sending roller functioning as an entrance side to which the reinforcing material-attached profile strip 100 is guided is a first sending roller. Furthermore, although not shown, in FIGS. 19 and 20, when the left sending roller receives the guided reinforcing material-attached profile strip 100 and functions as a sending roller on the entrance side, this sending roller is the first sending roller 32.

Conversely, the curl guide 31, the first sending roller 32, and the second sending roller 33 of the curl-forming apparatus 3 are the same as those in the foregoing embodiment, the reinforcing material-attached profile strip 100 can be pushed via the first sending roller 32 into the curl guide 31 or taken via the second sending roller 33 from the curl guide 31, and, thus, the reinforcing material-attached profile strip 100 moving along the curl guide 31 can be subjected to plastic deformation to form spirals by continuously providing arc-like curls having a diameter smaller than the radius of curvature of the curl guide 31, that is, the radius of curvature of the spiral pipe S.

Here, in the curl-forming apparatus 3, as described above, when a sending roller, that is, a pinch roller and an oil hydraulic motor that drives the pinch roller form one roller portion, a pinch roller can form the other roller portion. That is to say, when the first pinch roller 321 is rotationally driven via an oil hydraulic motor and gears, the reinforcing material-attached profile strip 100 is pinched with the first pinch roller 3821 and pushed into the curl guide 31, and, when the second pinch roller 331 is rotationally driven via an oil hydraulic motor and gears, the reinforcing material-attached profile strip 100 is pinched with the second pinch roller 331 and taken from the curl guide 31. Accordingly, the reinforcing material-attached profile strip 100 pushed into the curl guide 31 and then passed via the second pinch roller 331 through the curl-forming apparatus 3, or the reinforcing material-attached profile strip 100 taken from the curl guide 31 via the first pinch roller 321 and via the curl guide 31 has been subjected to plastic deformation to form spirals by being continuously provided with arc-like curls having a diameter smaller than the radius of curvature of the curl guide 31, that is, the radius of curvature of the spiral pipe S, and is supplied to the joining mechanism 9 of the pipe-producing machine 7.

Then, in the joining mechanism 9 of the pipe-producing machine 7, the joint projection portion 113 of the subsequent spiral part of the reinforcing material-attached profile strip 100 is fitted from the inner circumferential side to the joint recess portion 115 of the proceeding spiral part of the reinforcing material-attached profile strip 100, the side edge portion on the rear end side of the subsequent spiral part of the reinforcing material-attached profile strip 100 is disposed at the lowered portion 114 of the proceeding spiral part of the reinforcing material-attached profile strip 100, and the reinforcing rib 112 on the rear end side of the subsequent spiral part of the reinforcing material-attached profile strip 100 is caught by the inclined rib 116 of the proceeding spiral part of the reinforcing material-attached profile strip 100. Accordingly the adjacent spiral parts of the reinforcing material-attached profile strip 100 are joined to each other, and, thus, the spiral pipe S can be continuously and additionally produced.

Accordingly also in this embodiment, the reinforcing material-attached profile strip 100 is transported via the curl-forming apparatus 3 and subjected to plastic deformation to form spirals by being continuously provided with arc-like curls having a radius of curvature substantially similar to a target radius of curvature of the spiral pipe S, and then supplied to the joining mechanism 9, and, thus, a pipe is produced. Thus, a restoring force that restores the reinforcing material-attached profile strip 100 to its original radius of curvature when wound about the drum D does not act during production of the pipe. Accordingly, when the reinforcing material-attached profile strip 100 is spirally supplied and the spiral pipe S is produced, even in the case where the rigidity of the reinforcing material 120 is large, a spiral pipe S having a target pipe diameter and a target length can be reliably produced.

Moreover, the reinforcing material-attached profile strip 100 can be subjected to plastic deformation to form spirals by being provided with curls having a diameter smaller than the radius of curvature when wound about the drum D, on the ground near the manhole M1 away from the pipe-producing machine 7, and, thus, even in the case where the opening diameter of the departure side manhole M1 is small, the reinforcing material-attached profile strip 100 can be easily pulled into the manhole M1 and supplied to the pipe-producing machine 7. Furthermore, this configuration can be used also in the case where the pipe diameter of the existing pipe K is small and the curl-forming apparatus 3 cannot be integrally assembled with the pipe-producing machine 7.

Furthermore, the curl-forming apparatus 3 can be disposed at a position other than the aboveground position near the manhole, and, if necessary, in the manhole M1. In the case where the curl-forming apparatus 3 is disposed in the manhole M1, even when the pipe diameter of the existing pipe K is small, the reinforcing material-attached profile strip 100 can be easily pulled into the existing pipe K or easily pulled into the spiral pipe S produced in the existing pipe K, and supplied to the pipe-producing machine 7.

Furthermore, in this embodiment, the curl guide 31 is exemplified as an arc-like spiral plate, but since the curl-forming apparatus 3 is disposed separately from the pipe-producing machine 7, the reinforcing material-attached profile strip 100 does not have to be immediately supplied to the joining mechanism 9 of the pipe-producing machine 7. Accordingly, an arc-like cylindrical plate also may be used instead of a spiral plate.

Furthermore, the curl guide 31 may have a shape other than an arc-like spiral plate or an arc-like cylindrical plate. Although a detailed description thereof is not given, a curl guide may be used in which a plurality of rotating rollers that are circumscribed about an arc-like spiral face or cylindrical face having a radius of curvature substantially similar to or not greater than the radius of curvature of the spiral pipe are axially supported in a freely rotatable manner with a spacing interposed therebetween in the spiral direction or the circumferential direction.

Furthermore, the joining mechanism 9 in the pipe-producing machine 7 may not include the drive rollers 93, but include the pipe-producing roller 92 and a push roller (not shown) that is disposed at the molding frame 8 and sends out the reinforcing material-attached profile strip 100.

In the above-described example, an oil hydraulic motor is used as the drive source of the first sending roller 32 and the second sending roller 33 in the curl-forming apparatus 3 and the drive source of the joining mechanism 5 in the pipe-producing machines 4 and 7, but an electric motor or a water hydraulic motor also may be used, and there is no limitation.

<Other Examples of Reinforcing Material-Attached Strip-Like Members>

Here, in the above-described example, the case is described in which the spiral pipe S is produced from the reinforcing material-attached profile strip 100 shown in FIG. 1, but the present invention is not limited to this sort of reinforcing material-attached profile strip 100.

For example, reinforcing material-attached profile strips 100A, 100B, 100C, and 100D shown in FIGS. 21 to 26 also can be used.

Hereinafter, modified examples of the reinforcing material-attached profile strip will be described.

Figure 21:
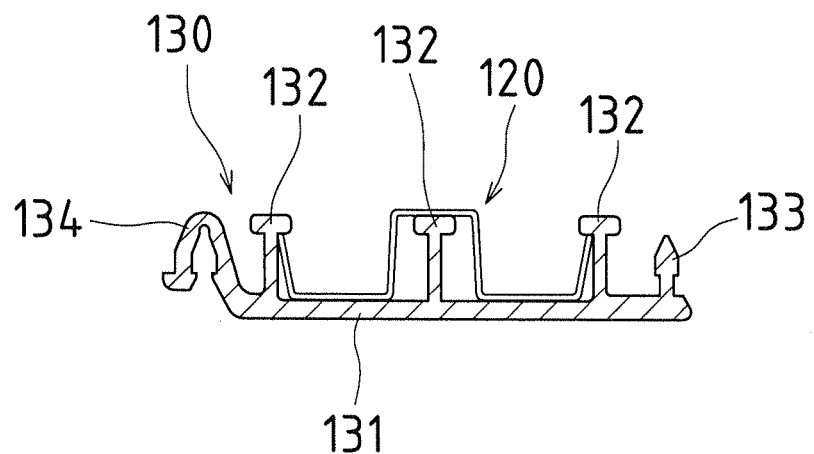
FIG. 21 is a cross-sectional view showing a modified example of the reinforcing material-attached profile strip.

The reinforcing material-attached profile strip 100A shown in FIG. 21 includes a profile strip 130 and a reinforcing material 120 that is attached to the profile strip 130.

The profile strip 130 is formed by subjecting a flexible synthetic resin, such as hard vinyl chloride, polyethylene, polypropylene, or the like to extrusion molding, and a plurality of reinforcing ribs 132 having a T-shaped cross-section are arranged on the back face of a strip plate-like board 131 such that the front ends thereof are parallel to the board 131. A joint projection portion 133 and a joint recess groove 134 are continuously formed respectively on both side edge portions of the board 131 in the longitudinal direction.

The reinforcing material 120 is formed by shaping a strip plate-like steel sheet continuously formed in the longitudinal direction such that a cross-section thereof is substantially in the shape of a WI and is attached over the plurality of reinforcing ribs 132 of the profile strip 130.

Figure 22A:
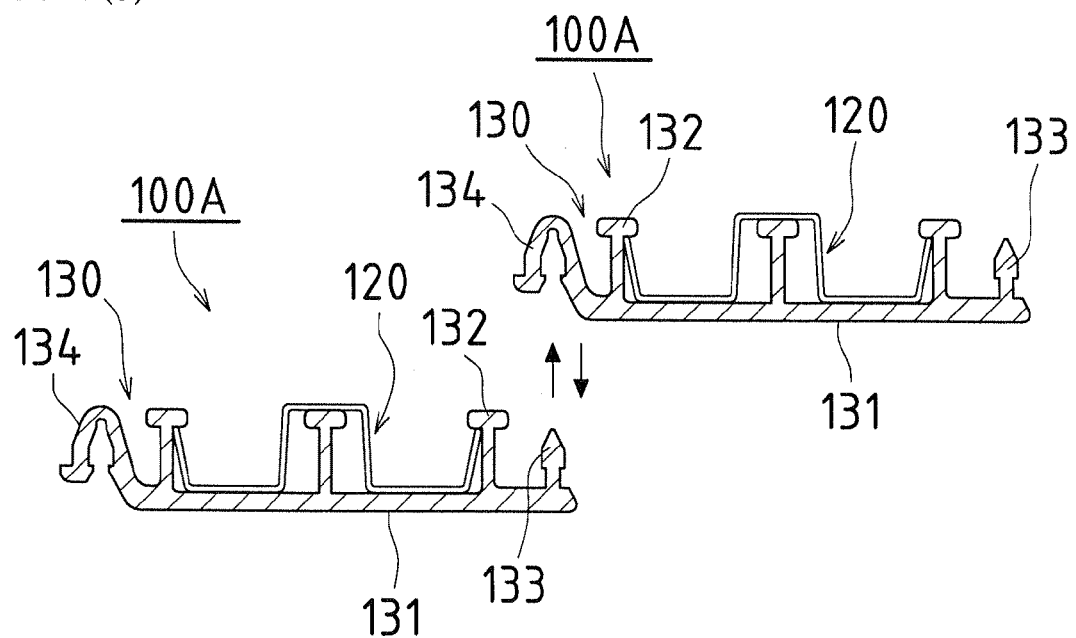
Figure 22B:
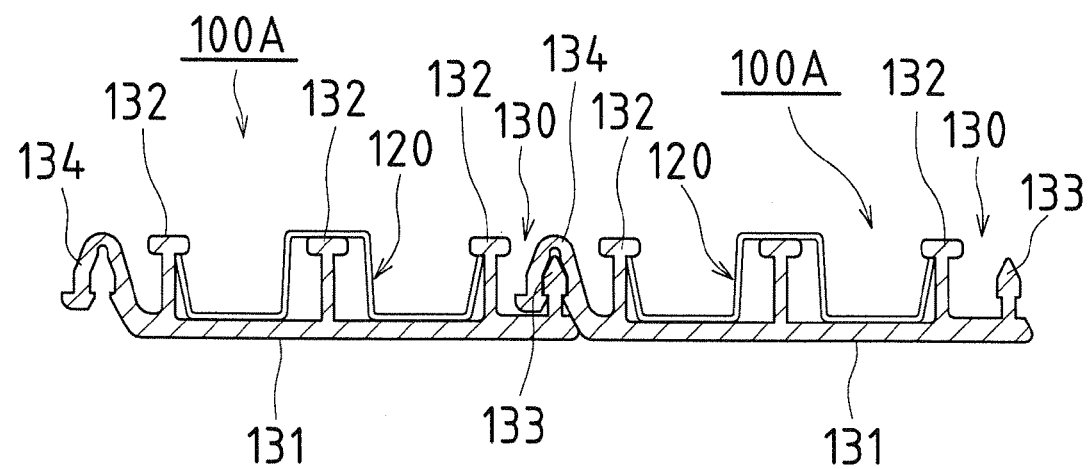

As shown in FIGS. 22(a) and 22(b), in the reinforcing material-attached profile strip 100A, the joint projection portion 133 of one part of the reinforcing material-attached profile strip 100A and the joint recess portion 134 of the other part of the reinforcing material-attached profile strip 100A are fitted from the inside or the outside and joined to each other, and, thus, the mutually adjacent parts of the reinforcing material-attached profile strip 100A can be connected.

Figure 23A:
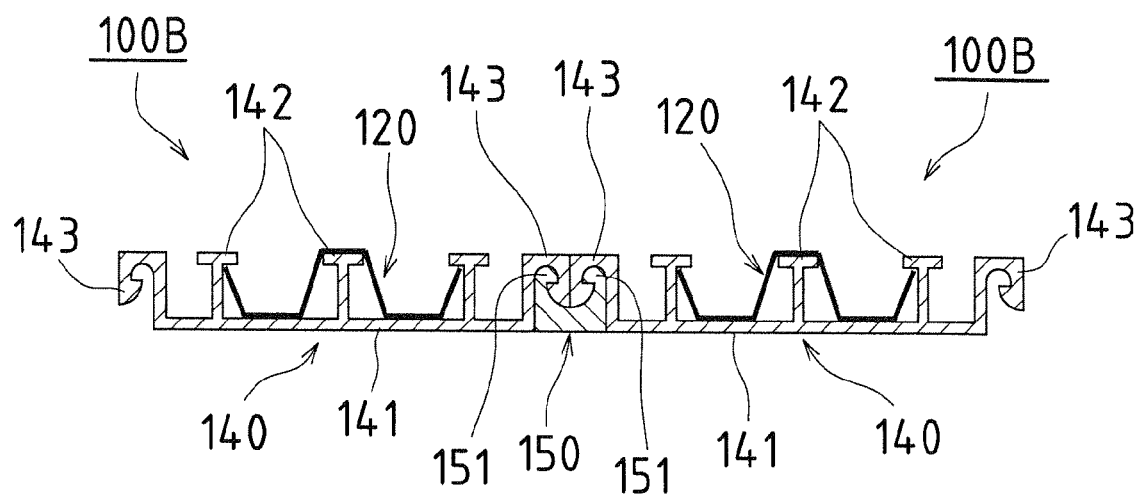
Figure 23B:
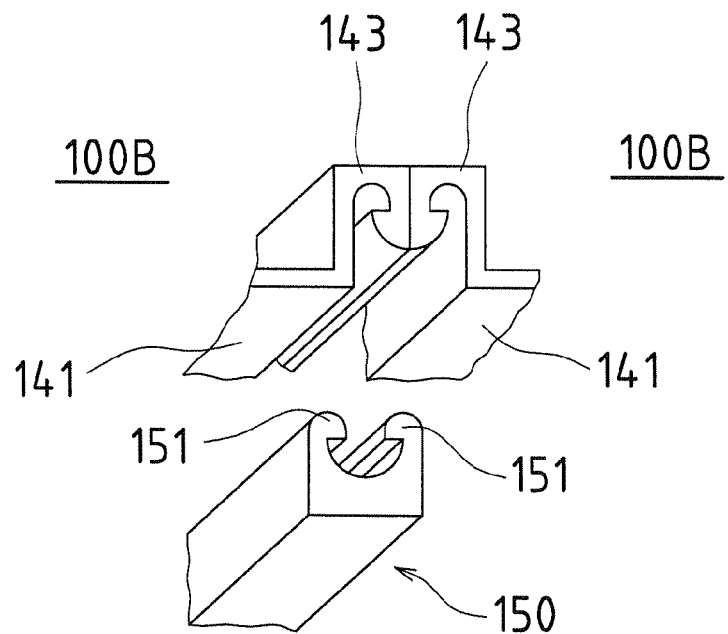

Furthermore, as shown in FIGS. 23(a) and 23(b), the reinforcing material-attached profile strip 100B having mutually adjacent parts includes a profile strip 140 and a reinforcing material 120 that is attached to the profile strip 140. The adjacent parts of the reinforcing material-attached profile strip 100B are joined to each other via a connector 150.

The profile strip 140 is formed by subjecting a flexible synthetic resin, such as hard vinyl chloride, polyethylene, polypropylene, or the like to extrusion molding, and a plurality of reinforcing ribs 142 having a T-shaped cross-section are arranged on the back face of a strip plate-like board 141 such that the front ends thereof are parallel to the board 141. Joint recess grooves 143 are continuously formed respectively on both side edge portions of the board 141 in the longitudinal direction.

Conversely, as the connector 150, a pair of joint projection portions 151 that can be joined to the joint recess portions 143 at both side edge portions at which adjacent profile strips 140 face each other are continuously formed in the longitudinal direction.

Here, the reinforcing material 120 is formed by shaping a strip plate like steel sheet continuously formed in the longitudinal direction such that a cross-section thereof is substantially in the shape of a N, and is attached over the plurality of reinforcing ribs 142 of the profile strip 140.

In the reinforcing material-attached profile strip 100B, in a state where the front end edge portion and the rear end edge portion of the mutually adjacent parts of the reinforcing material-attached profile strip 100B face each other, when the connector 150 is fitted from the inner circumferential side of the reinforcing material-attached profile strip 100B and joined over the joint recess portion 143 on the rear edge side of the proceeding part of the reinforcing material-attached profile strip 100B and the joint recess portion 143 on the front edge side of the subsequent part of the reinforcing material-attached profile strip 100B, the mutually adjacent parts of the reinforcing material-attached profile strip 100B can be connected to each other.

Figure 24:
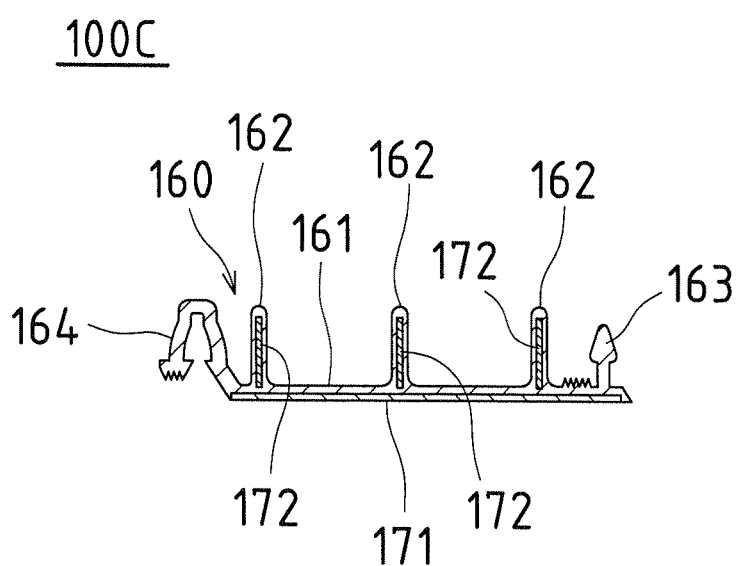
FIG. 24 is a cross-sectional view showing another modified example of the reinforcing material-attached profile strip.

Furthermore, in the reinforcing material-attached profile strip 100C shown in FIG. 24, reinforcing materials 171 and 172 are embedded and integrally molded within a profile strip 160. That is to say, in the profile strip 160, a plurality of reinforcing ribs 162 having an E-shaped cross-section are arranged upright on the back face of a strip plate-like board 161, a joint projection portion 163 is disposed upright on the back face of one side edge portion of the board 161, and a joint recess portion 164 to which the joint projection portion 163 can be fitted is disposed at the other side edge portion of the board 161. Then, the reinforcing material 171 is insert molded to the board 161 of the profile strip 160, the reinforcing materials 172 made of a steel sheet or the like are insert molded to the reinforcing ribs 162, and, thus, the reinforcing material-attached profile strip 100C is formed.

Here, the reinforcing materials 172 are formed such that, when subjected to plastic deformation to form spirals, a difference in the circumferential length between the outer circumferential side and the inner circumferential side can be absorbed.

Figure 25:
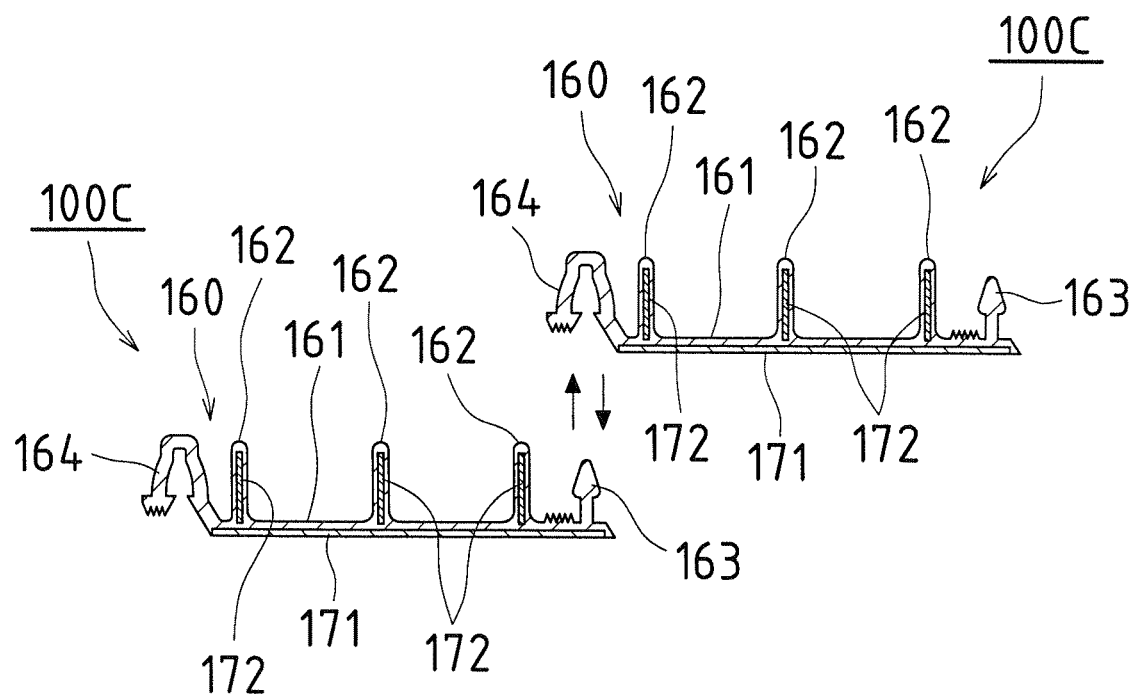
FIG. 25 is a cross-sectional view illustrating a step of joining parts of the reinforcing material-attached profile strip of FIG. 24.

Also in the reinforcing material-attached profile strip 100C, as shown in FIG. 25, when the joint projection portion 163 of one part of the reinforcing material-attached profile strip 100C of mutually adjacent spiral parts of the reinforcing material-attached profile strip 100 C and the joint recess portion 164 of the other part of the reinforcing material-attached profile strip 100C are fitted from the inside or the outside, the mutually adjacent parts of the reinforcing material-attached profile strip 100C can be joined to each other, and, thus, a spiral pipe S having a predetermined pipe diameter can be produced.

Figure 26:
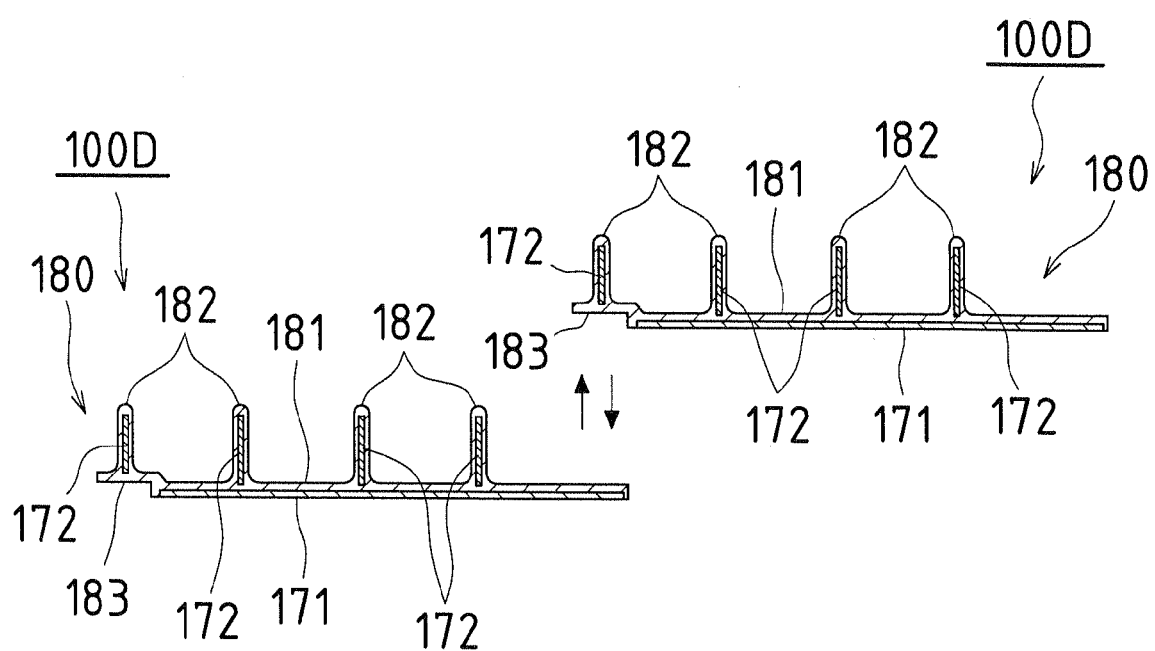
FIG. 26 is a cross-sectional view illustrating a step of joining parts of the reinforcing material-attached profile strip according to another modified example.

Furthermore, FIG. 26 shows the reinforcing material-attached profile strip 100D in which the reinforcing materials 171 and 172 are embedded in and integrally molded with a profile strip 180. In the profile strip 180 of the reinforcing material-attached profile strip 100D, a plurality of reinforcing ribs 182 having an I-shaped cross-section are arranged upright on the back face of a strip plate-like board 181. Furthermore, one side edge portion of the board 181 has a lowered portion 183 that is lowered to the back face side by the thickness of the board 181 such that the other side edge portion of the board 181 is disposed therein. In the reinforcing material-attached profile strip 100D, the reinforcing material 171 is insert molded into the board 181, and the reinforcing materials 172 made of a steel sheet or the like are insert molded into the reinforcing ribs 182.

In the reinforcing material-attached profile strip 100D, the lowered portion 183 of one part of the reinforcing material-attached profile strip 100D of mutually adjacent spiral parts of the reinforcing material-attached profile strip 100D and the end edge portion on the other side of the other part of the reinforcing material-attached profile strip 100D are overlaid and are joined to each other by thermal fusion bonding, and, thus, a spiral pipe S having a predetermined pipe diameter can be produced.

Furthermore, the example is described in which the reinforcing material-attached profile strip is subjected to plastic deformation to form spirals by being continuously provided with arc-like curls, but even a profile strip without a reinforcing material can be subjected to deformation to form spirals by being continuously provided with arc-like curls to form a spiral pipe. More specifically before a spiral pipe is produced from a profile strip, the profile strip need only be subjected to deformation to form spirals by being continuously provided with arc-like curls by heating, and then supplied to the joining mechanism of the pipe-producing machine.

Example 3

Next, Example 3 according to the present invention will be described. Here, in a description of this example, the reinforcing material-attached profile strip is not limited to the reinforcing material-attached profile strip 100 shown in FIG. 1, and various types of the reinforcing material-attached profile strips 100A, 100B, 100C, and 100D exemplified in FIGS. 21 to 26 and the like also may be used. Here, as an example, the case in which the reinforcing material-attached profile strip 100 is used is shown. Furthermore, the curl-forming apparatus 3 of the pipe-producing apparatus 1 may have a configuration similar to that exemplified in FIG. 19 and the like, and the same configurations are denoted by the same reference numerals in the foregoing example and a detailed description thereof is omitted.

Figure 27:
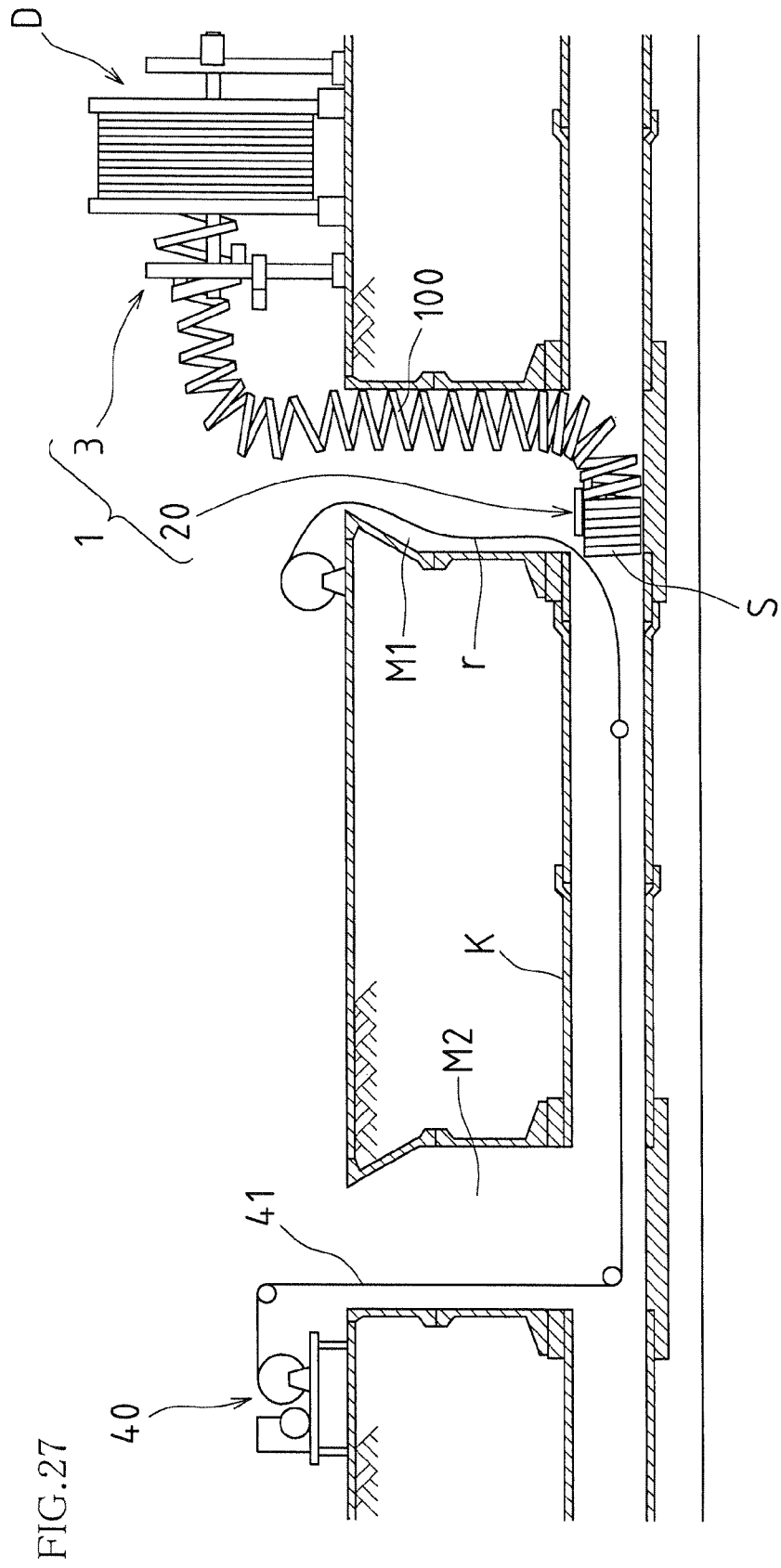
FIG. 27 shows an embodiment of the method for producing a spiral pipe of the present invention, and is an explanatory view of a state in which a pipe-producing machine to which the reinforcing material-attached profile strip is attached is disposed in the manhole.

As shown in FIG. 27, the reinforcing material-attached profile strip 100 is wound about the drum D in the shape of a hollow cylinder and transported to an application site. Then, at the application site, the reinforcing material-attached profile strip 100 is pulled out from the inner circumferential side of the drum D, and supplied to a pipe-producing machine 20 such that the back face side of the board 111, that is, the side on which the reinforcing ribs 112 and the like are arranged is on the outer circumferential side.

The pipe-producing apparatus 1 includes the pipe-producing machine 20 that is disposed in the manhole M1 on one side in communication with the existing pipe K functioning as a refurbishment target, and the curl-forming apparatus 3 that is disposed near the drum D on the ground on the side of the manhole M1 on one side.

Figure 28:
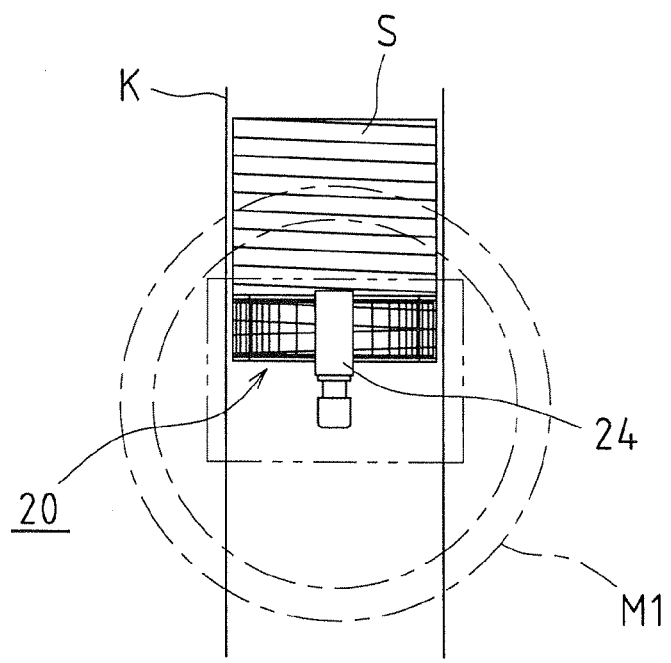
FIG. 28 is a plan view showing an example of a pipe-producing machine forming a pipe-producing apparatus used in the method for producing a spiral pipe of the present invention.
Figure 29:
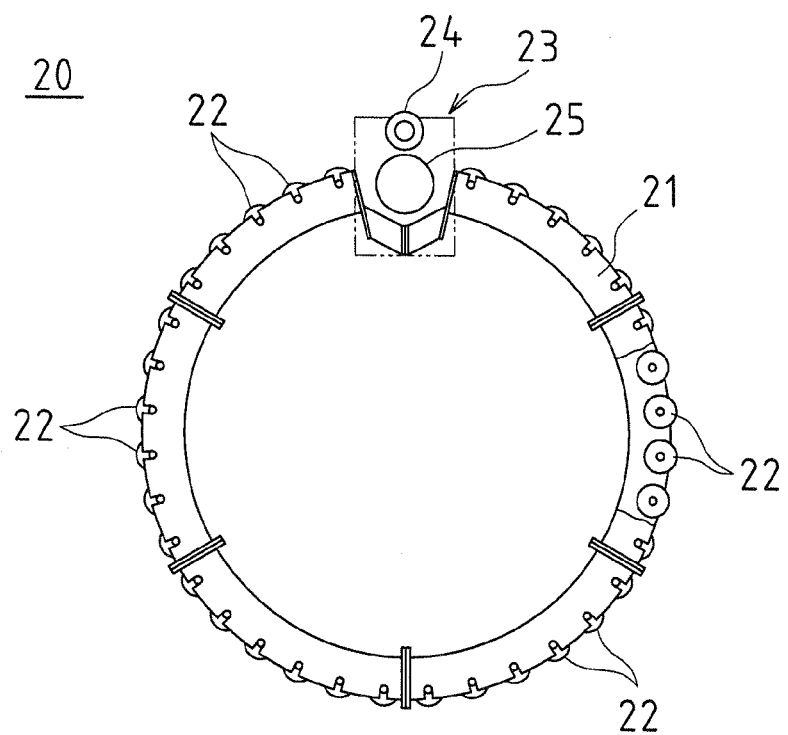
FIG. 29 is a front view of the pipe-producing machine of FIG. 28.

As shown in FIGS. 28 and 29, the pipe-producing machine 20 includes an attachment frame 21 that is substantially in the shape of a ring having a predetermined width and that is rigid, a plurality of guide rollers 22 that are axially supported in a freely rotatable manner at a predetermined pitch on the outer circumference of the attachment frame 21 in the circumferential direction and that are in contact with the inner face of the spiral pipe S, and a joining mechanism 23 having an outer roller 24 and an inner roller 25 that are arranged via the attachment frame 21, that are axially supported in a freely rotatable manner at a joint position between the joint portion of an already formed spiral pipe S and the joint portion of a newly supplied reinforcing material-attached profile strip 100, and that pinch the reinforcing material-attached profile strip 100.

Here, the outer circumferential face of the outer roller 24 rotates in contact with the back face of the reinforcing material-attached profile strip 100, that is, a face on the side that is to be the outer circumferential face of the spiral pipe S, between the adjacent reinforcing ribs 112 of the reinforcing material-attached profile strip 100. At that time, the outer circumferential face of the outer roller 24 is knurled, and can send out the reinforcing material-attached profile strip 100 without slipping. Furthermore, the inner roller 25 is a cylindrical portion made of a comparatively hard material, such as iron or plastic resin, and the outer circumferential face thereof rotates in contact with the flat inner face of the reinforcing material-attached profile strip 100, that is, a face on the side that is to be the inner circumferential face of the spiral pipe S.

The pipe-producing machine 20 is of a so-called mobile type in which the joining mechanism 23 revolves while the pipe-producing machine 20 travels in the existing pipe K, and, thus, the spiral pipe S is produced from the spiral reinforcing material-attached profile strip 100, and the spiral pipe S is left behind in the manhole M1, as conventional example described in Patent Document 2.

Here, the joining mechanism 23 is not limited to the form shown in FIG. 29, and may not include the outer roller 24, but include the inner roller 25 and a push roller (not shown) that is attached to the attachment frame 21 and sends out the reinforcing material-attached profile strip 100.

In the curl-forming apparatus 3, as shown in FIGS. 19 and 20, when the reinforcing material-attached profile strip 100 is provided with curls in advance, the pipe-producing operation using the pipe-producing machine 20 can be extremely smoothly performed. The reinforcing material-attached profile strip 100 is pushed via the first sending roller 32 into the curl guide 31 or taken from the curl guide 31 via the second sending roller 33, and moves along the curl guide 31. In this case, the rotating frame 36 is rotated in the opposite direction to the supply direction of the reinforcing material-attached profile strip 100 and at the same speed as the supply speed, and, thus, when the reinforcing material-attached profile strip 100 is sent out from the curl-forming apparatus 3, a relative excess or deficiency in the sending out of the spiral reinforcing material-attached profile strip does not occur with respect to the spiral pipe that is left behind and produced by the revolving pipe-producing machine, and the reinforcing material-attached profile strip can be prevented from being twisted.

Next, an application procedure for refurbishing the existing pipe K using the pipe-producing apparatus 1 will be described.

The existing pipe K functioning as an application target has a manhole at every predetermined span, and the existing pipe K is refurbished by producing and building the spiral pipe S therein from a manhole on one side (hereinafter, referred to as a "departure side manhole M1") that is in communication with one end of the application target region to a manhole on the other side (hereinafter, referred to as an "arrival side manhole M2") that is in communication with the other end.

As a pre-operation of the refurbishment operation, first, a block attached in the existing pipe K, a projecting portion of an attachment pipe, and the like are removed, and water influx is temporarily stopped. Furthermore, an operation is performed that scrapes the inside of the departure side manhole M1 in order to prevent contact with the joining mechanism 23 when the pipe-producing machine 20 is revolved.

On the ground on the side of the departure side manhole M1, the drum D (with a rotatable base) about which the reinforcing material-attached profile strip 100 is wound in the shape of a hollow cylinder is disposed, the curl-forming apparatus 3 is disposed near the drum D, and a motive power unit including an electric generator and an oil hydraulic unit (not shown) is disposed. Furthermore, after the pipe-producing machine 20 is delivered into the departure side manhole M1 using a crane or the like, oil hydraulic pipelines from the motive power unit are respectively connected to the oil hydraulic motors 325, 335, and 39 of the curl-forming apparatus 3 and an oil hydraulic motor that drives the joining mechanism 23 in the pipe-producing machine 20.

Conversely, on the ground on the side of the arrival side manhole M2, as described later, a winch 40 that draws the spiral pipe S into the existing pipe K is disposed, a cord-like member 41, such as a wire or a rope, taken up by a winch drum is pulled into the side of the departure side manhole M1 using a wiring material r (see FIG. 27) that is inserted from the departure side manhole M1 to the arrival side manhole M2.

When the preparation operation ends, the reinforcing material-attached profile strip 100 is pulled out from the inner circumferential side while the drum D is axially rotated, and then provided with curls through curls through the first sending roller 32, the curl guide 31, and the second sending roller 33 of the curl-forming apparatus 3, and the reinforcing material-attached profile strip 100 subjected to plastic deformation is pulled into the departure side manhole M1. Next, under the departure side manhole M1, the front end of the reinforcing material-attached profile strip 100 is introduced to the joining mechanism 23 of the pipe-producing machine 20.

Then, in the departure side manhole M1, in a state where the pipe-producing machine 20 is suspended using a crane or the like, the joining mechanism 23 is rotated forward to send out the reinforcing material-attached profile strip 100, and, after being wound approximately twice, the reinforcing material-attached profile strip 100 is narrowed and firmly attached to the guide rollers 22 in order to adjust the pipe diameter of the produced spiral pipe S. More specifically, although a detailed description thereof is not given, a nail is driven into the front end of the reinforcing material-attached profile strip 100 and used as a stopper, the joining mechanism 23 is rotated in reverse in a state where the nail is brought into contact with the joining mechanism 23, and, thus, the reinforcing material-attached profile strip 100 wound about the pipe-producing machine 20 is drawn and narrowed so as to have a diameter slightly smaller than the inner diameter corresponding to the outer circumference of the attachment frame 21 of the pipe-producing machine 20, that is, the inner diameter of the existing pipe K. Next, the reinforcing material-attached profile strip 100 is wound about the attachment frame 21 of the pipe-producing machine 20 approximately four to seven times, and a short spiral pipe S having a diameter slightly smaller than the inner diameter of the existing pipe K is produced.

Furthermore, the front end of the cord-like member 41 pulled into the departure side manhole M1 is fixed to the head portion of the spiral pipe S or the inner circumferential face of the head portion. For example, two or more slinging members are fixed to the inner circumferential face of the spiral pipe S with a spacing interposed therebetween, and the plurality of slinging members may be altogether connected to a shackle or the like attached to the front end of the cord-like member 41. At that time, the front end of the spiral pipe S is preferably provided with a front end cap (not shown) in which the outer face on the front end side has a curved face, such as a spherical face, a conical face, or a truncated conical face. When this sort of front end cap is provided, even in the case where the existing pipe K is uneven when the spiral pipe S is drawn by the winch 40 (described later), the outer face on the front end side of the front end cap can surmount the uneven portion or the like of the existing pipe K, and the spiral pipe S can be smoothly drawn.

Here, these operations do not necessarily have to be performed in the departure side manhole M1, and also may be performed on the ground depending on the opening diameter of the departure side manhole M1.

Next, when the cord-like member 41 is coupled to the front end portion of the reinforcing material-attached profile strip 100 wound about the pipe-producing machine 20 (the short spiral pipe S), the front end portion of the short spiral pipe S is suspended down to the existing pipe opening in the departure side manhole M1 (see FIG. 27), and the joining mechanism 23 of the pipe-producing machine 20 is rotated forward in the departure side manhole M1. Accordingly, the joining mechanism 23 of the pipe-producing machine 20 rotates (revolves) about the axis of the existing pipe K in the opposite direction to a relative sending direction of the reinforcing material-attached profile strip 100 with respect to the short spiral pipe S supported in the existing pipe K, and the spiral pipe S is produced. In this case, the direction in which the pipe-producing machine 20 produces (intends to travel along) the spiral pipe S is the opposite direction to that of the existing pipe K functioning as a refurbishment target.

Figure 30:
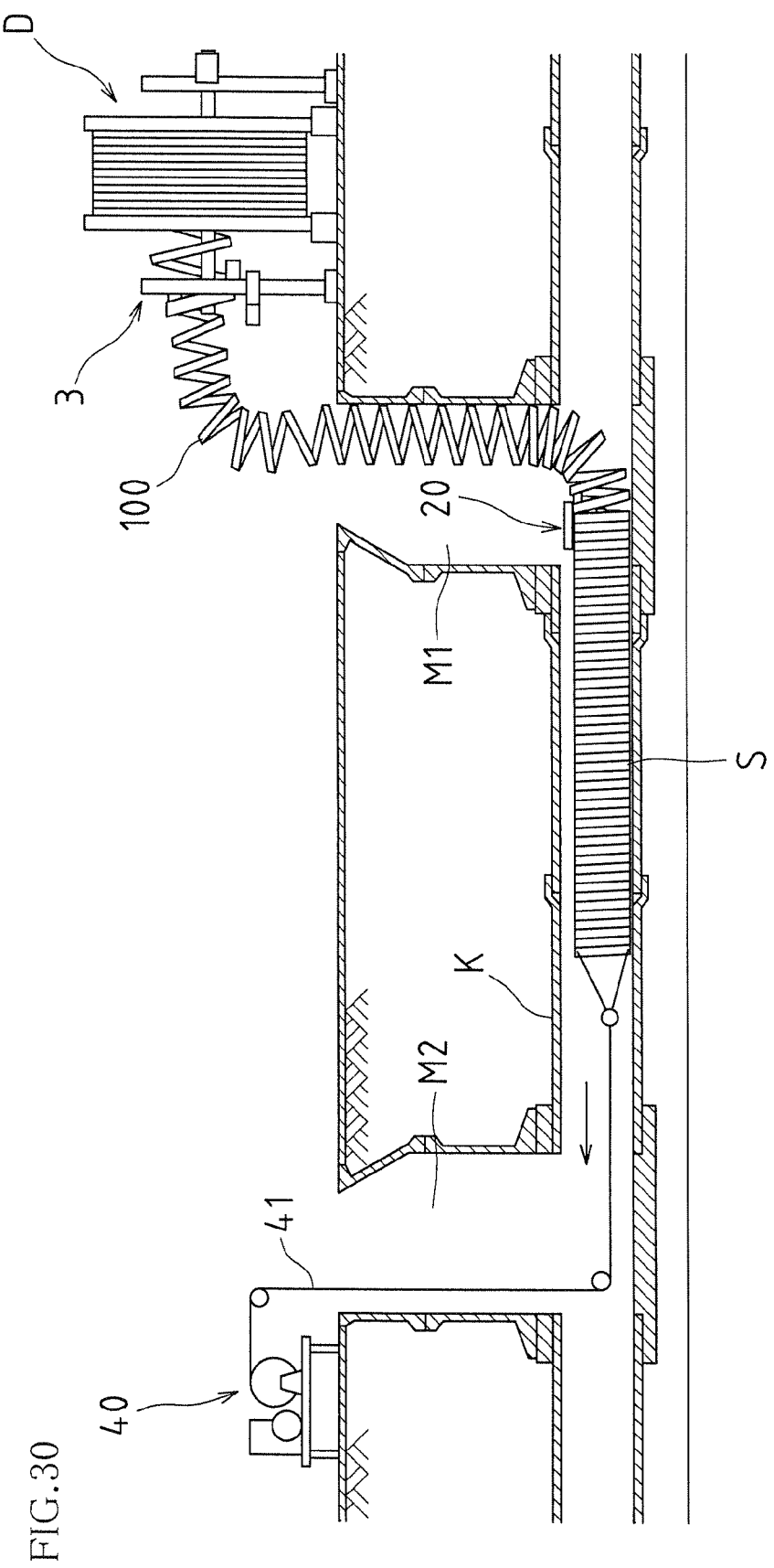
FIG. 30 shows an embodiment of the method for producing a spiral pipe of the present invention, and is an explanatory view of a state in which the produced spiral pipe is inserted into an existing pipe.

As shown in FIG. 30, the winch 40 is driven along with this sort of pipe-producing operation, and the spiral pipe S is drawn into the existing pipe K by the cord-like member 41 at a speed similar to the formation speed of the spiral pipe S in the axial direction. Accordingly, in a state where the pipe-producing machine 20 is not removed from the spiral pipe S and does not move from a fixed position in the departure side manhole M1, the produced spiral pipe S is inserted into the existing pipe K without being wound. As described above, when the spiral pipe S is inserted into the existing pipe K while being rotated, due to contact with the inner face of the existing pipe K, the joint portions are displaced from each other, and the diameter increases. Thus, refurbishment is difficult when the existing pipe K has, for example, a curved portion or an uneven portion or when the existing pipe K is long. However, when the spiral pipe S is inserted into the existing pipe K without being wound, this problem is solved. For example, the spiral pipe S can be produced and inserted even into an existing pipe K having a length of 50 m or more.

Furthermore, the pipe producing machine 20 can insert the spiral pipe S into the existing pipe K without proceeding into the existing pipe K, and, thus, even in the case where the outer roller 24 of the joining mechanism 23 is projected from the inner diameter of the existing pipe K, a spiral pipe S that substantially does not have a gap with respect to the existing pipe K can be produced and inserted.

Moreover, even in the case where the reinforcing material-attached profile strip 100 in which the reinforcing material 120 continuously formed in the longitudinal direction is attached to the profile strip 110 is used, since the reinforcing material 120 can be pulled into the manhole M11 while being provided with arc-like curls, the reinforcing material-attached profile strip 100 can be easily pulled into even a manhole M1 having a small opening diameter, and matched to the orbit of the joining mechanism 23 of the revolving pipe-producing machine 20, and, thus, the pipe-producing operation can be smoothly performed. Furthermore, a rigid spiral pipe S can be produced due to the reinforcing material 120.

Here, "in the departure side manhole M1", which is a position where the pipe-producing machine 20 produces the spiral pipe S, refers to a position in which the entire pipe-producing machine 20 is disposed in the manhole M1, and a position in which the pipe-producing machine 20 is disposed over both of the existing pipe K and the manhole M1.

In the case where the joining mechanism 23 of the pipe-producing machine 20 does not include the outer roller 24, since there is no portion projecting in the outer radial direction, the pipe-producing machine 20 can proceed into the existing pipe K even if there is almost no gap between the spiral pipe S that is to be produced and the existing pipe K.

Figure 31:
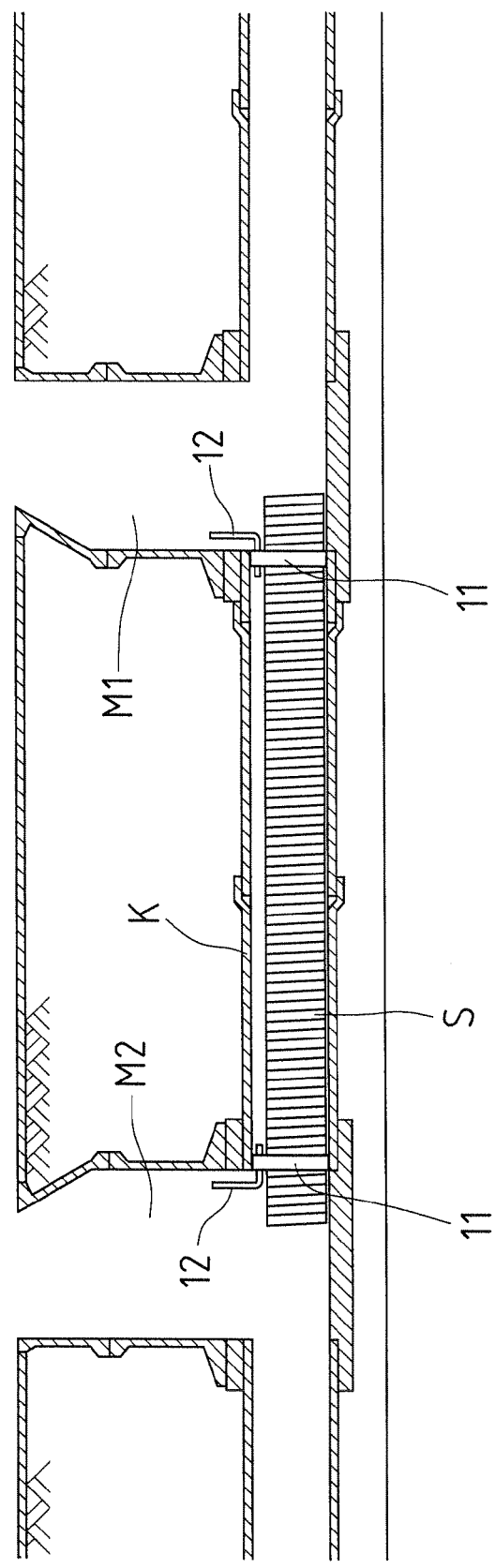
FIG. 31 is an explanatory view of a state in which the spiral pipe is inserted into the existing pipe.

Then, when the spiral pipe S is produced and inserted into the existing pipe K further from the state in FIG. 30 and arrives at the arrival side manhole M2, the reinforcing material-attached profile strip 100 is cut in front of the pipe-producing machine 20, the end portion thereof is treated, the pipe-producing machine 20 is removed from the spiral pipe S, and the cord-like member 41 is removed from the spiral pipe S. Then, as shown in FIG. 31, sealing members 11 are wound in a gap at both end portions between the existing pipe K and the spiral pipe S for sealing such that sewage water or the like does not enter the gap, and pipes 12 are attached respectively to the sealing members 11 such that the existing pipe K and the manholes M1 and M2 are in communication with each other. One of the pipes 12 is connected to a supply pipeline from a plant vehicle that injects a back-filling material (self-setting mortar) and used to cause the back-filling material to flow into the gap, and the other pipe 12 is used to cause the supplied back-filling material to flow over the pipe while removing air from the gap.

Figure 32:
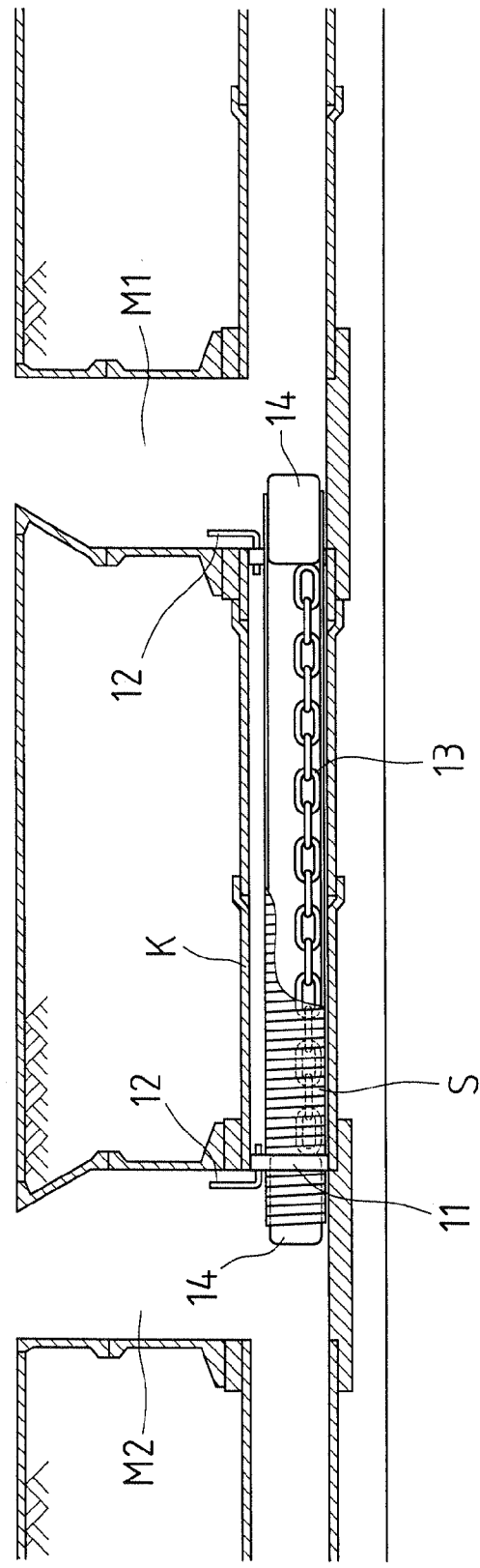
FIG. 32 an explanatory view of a state in which a water stop valve and a weight are attached to the spiral pipe.

Next, as shown in FIG. 32, a weight 13 is inserted into the spiral pipe S such that the spiral pipe S is prevented from floating up due to the buoyancy in the back-filling material. For example, a chain is inserted and disposed in the spiral pipe S as the weight 13. Furthermore, a water stop valve 14 is preferably disposed at the downstream end of the spiral pipe S in order to resist the buoyancy by filling the spiral pipe S with water. In this case, in a site where a water flow such as sewage water cannot be obtained, the water stop valves 14 may be arranged at both end portions of the spiral pipe S as shown in FIG. 32, and the internal portion of the spiral pipe S may be filled with water.

Conventionally, for example, a hole is formed at the middle portion of the spiral pipe S, a support bar that passes through the spiral pipe S is inserted into the hole, and, thus, the existing pipe K is supported and prevented from floating up. However, in the case of a spiral pipe S having a small opening diameter, an operator cannot enter the inside. On the other hand, the weight 13 can be inserted from an end portion of the spiral pipe S and can be easily removed, and a hole-forming operation and the like are not necessary, and, thus, work efficiency is good.

Figure 33:
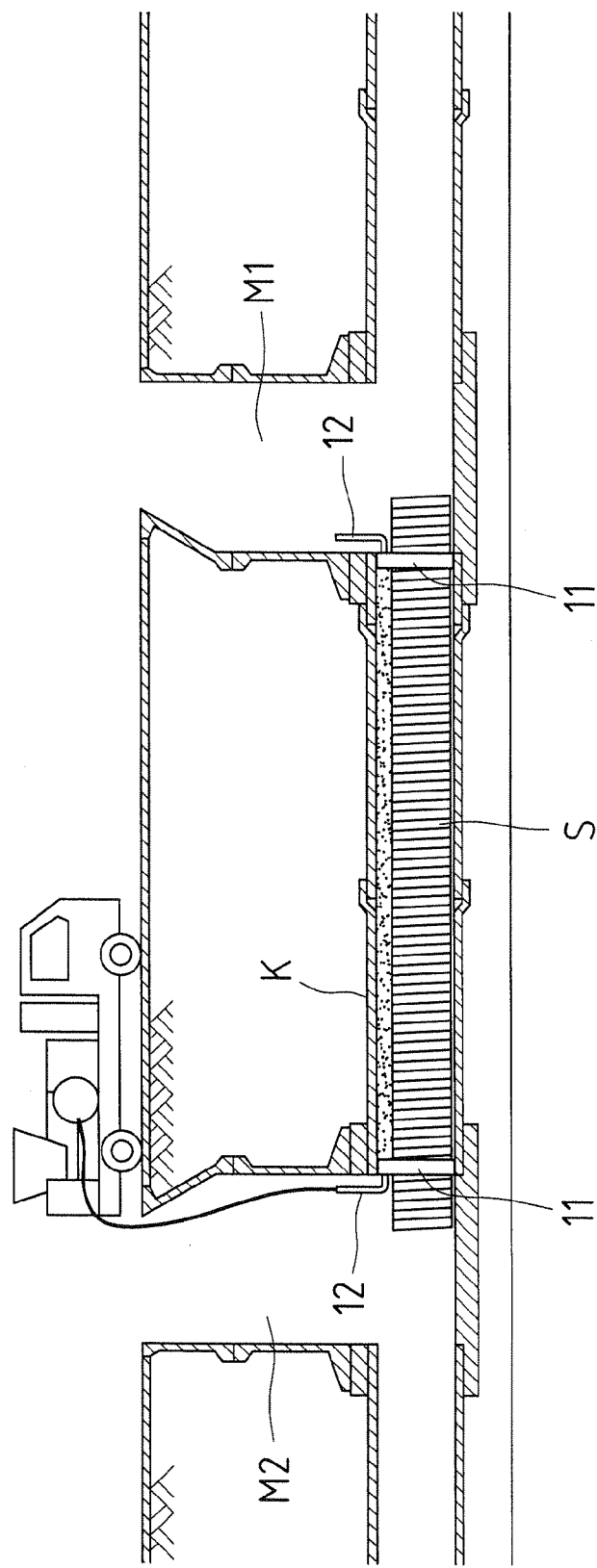
FIG. 33 is an explanatory view of a state in which a back-filling material is injected into a gap between the existing pipe and the spiral pipe.
Figure 34:
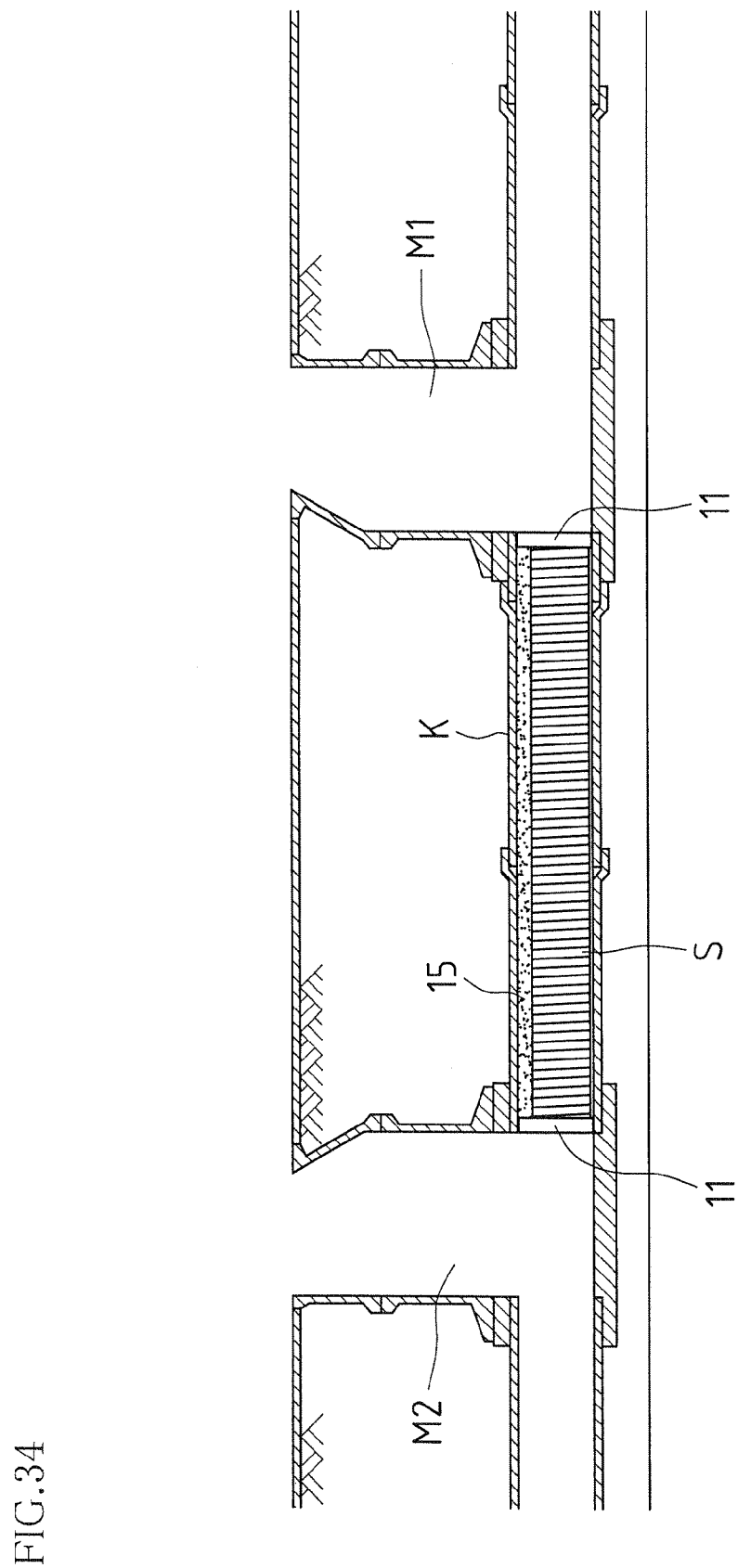
FIG. 34 is a cross-sectional view of an underground pipe when the refurbishment operation is completed.

Next, as shown in FIG. 33, the back-filling material is injected from the plant vehicle via the injection pipeline and the pipes 12 for injection into the gap between the existing pipe K and the spiral pipe S, and, after the gap is filled with the hack-filling material, the pipes 12 are removed. Then, after a filled member 15 formed when the back-filling material is cured fixes the spiral pipe S in the existing pipe K, a portion of the spiral pipe S projecting into the manholes M1 and M2 is cut, and the operation is completed (see FIG. 34).

In this example, the case is exemplified in which the spiral pipe S is drawn by the cord-like member 41 and inserted into the existing pipe K using the winch 40, but the design can be changed as appropriate.

For example, an apparatus that presses the pipe-producing machine 20 that is producing a pipe toward the existing pipe K functioning as a refurbishment target is disposed in the departure side manhole M. Then, when the pipe-producing machine 20 is pressed into the existing pipe K while the pipe-producing machine 20 is forming the spiral pipe S while being revolved, only the formed spiral pipe S can be inserted into the existing pipe K without moving the pipe-producing machine 20 from a fixed position in the manhole M1. Alternatively, in the manhole M1, the spiral pipe S formed by the pipe-producing machine 20 may be pressed and inserted into the existing pipe K.

Figure 35:
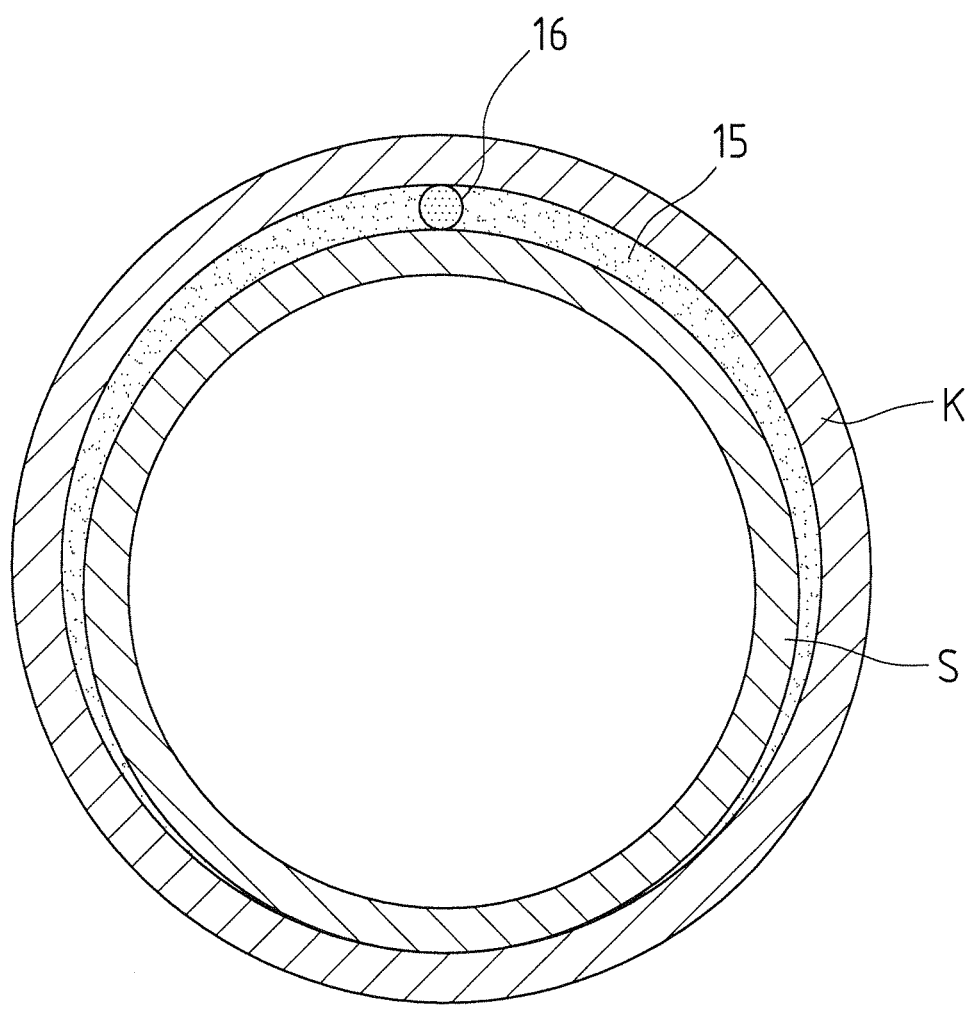
FIG. 35 is a vertical cross-sectional view showing another example of a method for preventing the spiral pipe from floating up.

Furthermore, the method for preventing the spiral pipe S from floating up described with reference to FIG. 32 is not limited to that using the weight 13. For example, as shown in FIG. 35, a cylindrical member 16 is disposed at the pipe top portion of the existing pipe K over the application area before the spiral pipe S is inserted, the spiral pipe S is produced and inserted, a cement-based material is injected to the cylindrical member 16 and cured, the spiral pipe S is supported so as to be in contact with the pipe base portion of the existing pipe K by the cylindrical member 16 having an increased diameter in which the cement-based material is cured, and then the gap between the existing pipe K and the spiral pipe S is filled with the back-filling material. At that time, the spiral pipe S is supported in the existing pipe K via the cylindrical member 16 having an increased diameter in which the cement-based material is cured, thereby preventing the spiral pipe S from floating up due to the back-filling material filled. This method is effective when a chain as the weight 13 cannot prevent floating up because self-setting mortar as the back-filling material has a large specific gravity.

Furthermore, the pipe-producing machine 20 is not limited to that in these examples that produces a pipe in a state in the air in the manhole (a state not disposed in the manhole M1) by causing the spiral pipe S to be supported in the existing pipe K, and also may produce a pipe in a state where the joining mechanism is axially supported in a rotatable manner by a fixing base, and the fixing base is disposed in the manhole ML.

It is also possible to perform a pipe-producing operation by directly sending the reinforcing material-attached profile strip 100 pulled out from the drum D to the pipe-producing machine 20 without using the curl-forming apparatus 3. However, since the reinforcing material 120 is attached to the reinforcing material-attached profile strip 100, and, thus, the rigidity is high, and spiral pipe production using only the pipe-producing machine 20 in the manhole M1 is difficult. Thus, as described above, when the reinforcing material-attached profile strip 100 pulled out from the drum D is provided in advance with curls having a radius of curvature corresponding to the spiral pipe S having a target pipe diameter, the pipe-producing operation using the pipe-producing machine 20 can be smoothly performed in the manhole M1.

Figure 36:
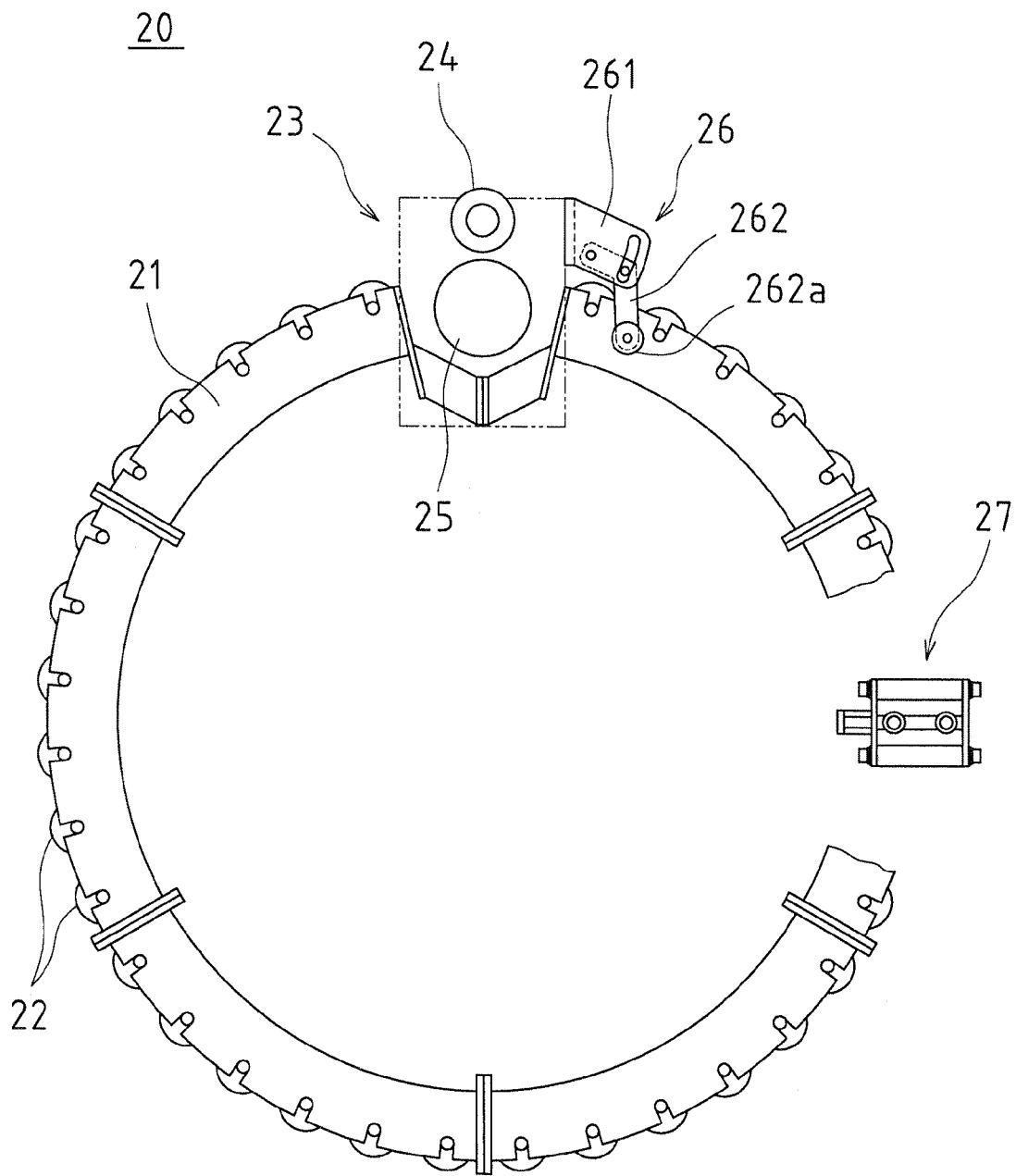
FIG. 36 shows another pipe-producing apparatus used in the method for producing a spiral pipe of the present invention, and is a front view of a pipe-producing machine having an entrance guide and a guide roller.

Here, as shown in FIG. 36, an entrance guide 26 that guides the reinforcing material-attached profile strip 100 to the joining mechanism 23 at a constant angle, and a guide roller 27 that guides the reinforcing material-attached profile strip 100 to the entrance guide 26 are arranged on the front side of the joining mechanism 23 of the pipe-producing machine 20 (on the upstream side in the sending direction of the reinforcing material-attached profile strip 100 due to the joining mechanism 23 rotating forward).

Figure 37:
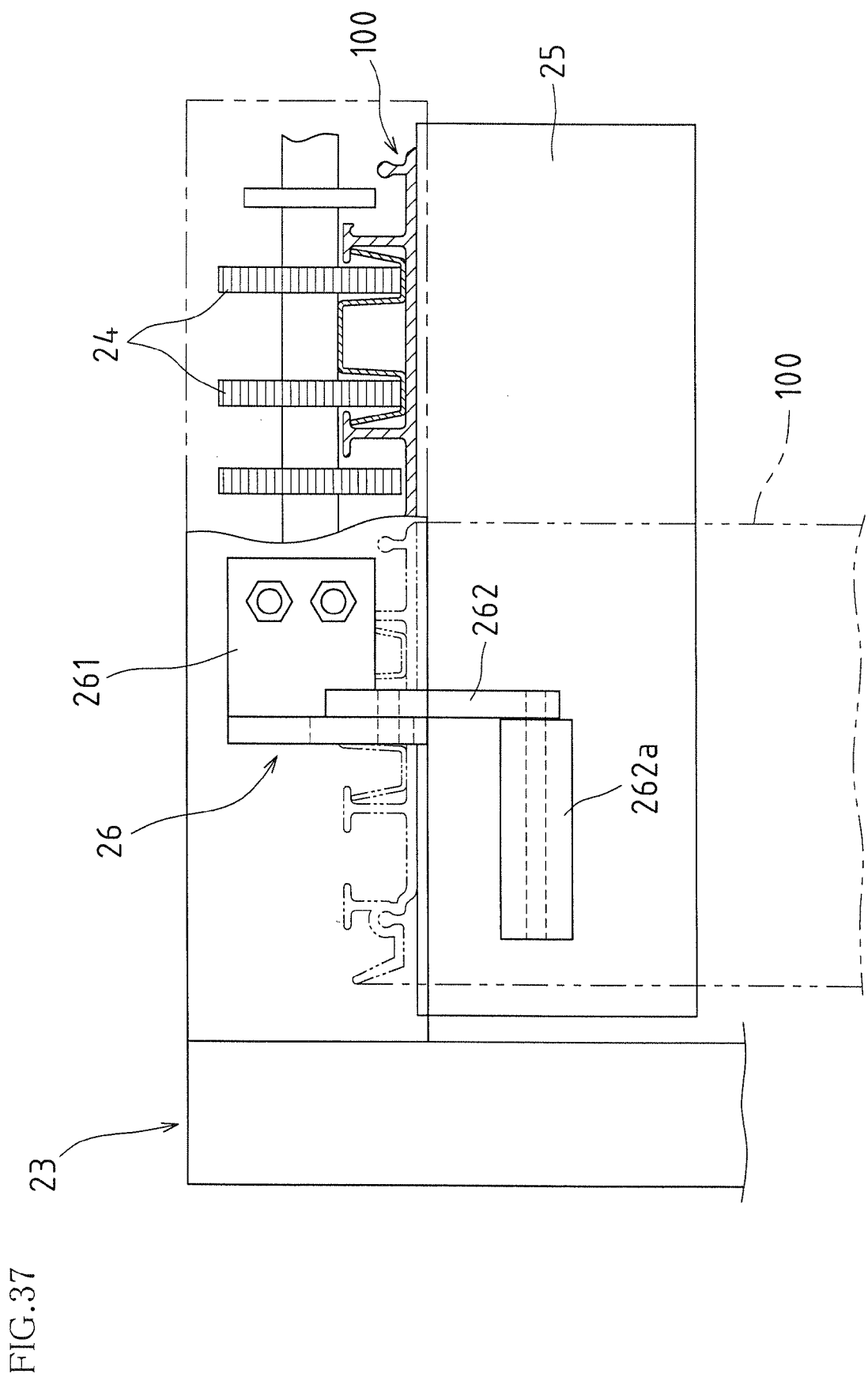
FIG. 37 is a side view showing the entrance guide of FIG. 36 together with a partially omitted joining mechanism.

In the entrance guide 26, an arm 262 that axially supports a roller 262a in a freely rotatable manner is coupled in a freely rotatable manner to an attachment material 261 fixed to the joining mechanism 23 of the pipe-producing machine 20 (see FIG. 37), and, when the back face side of the reinforcing material-attached profile strip 100 immediately before being guided to the joining mechanism 23 is pressed, the reinforcing material-attached profile strip 100 can be guided to the joining mechanism 23 at a constant radius of curvature.

Figure 38A:
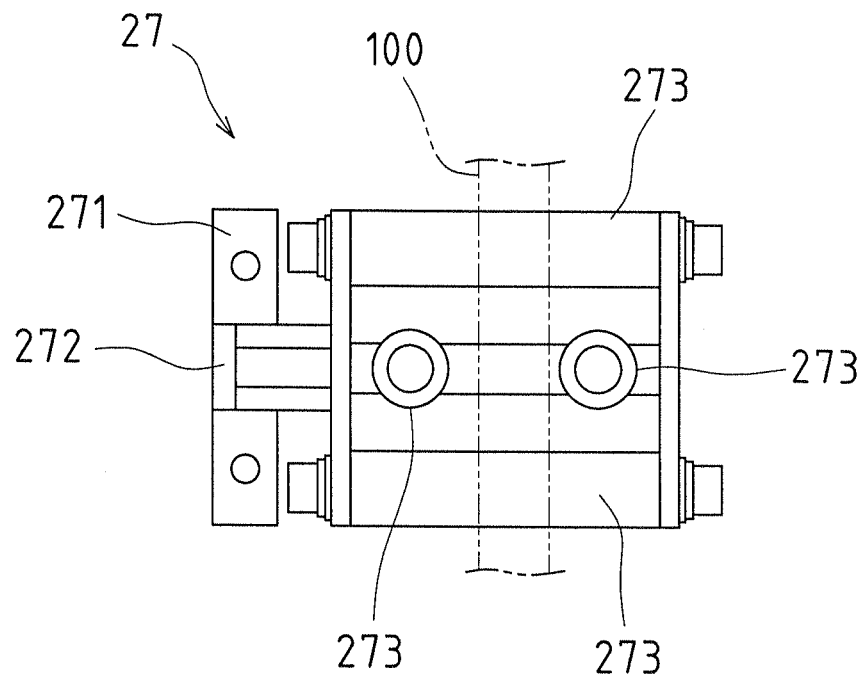
Figure 38B:
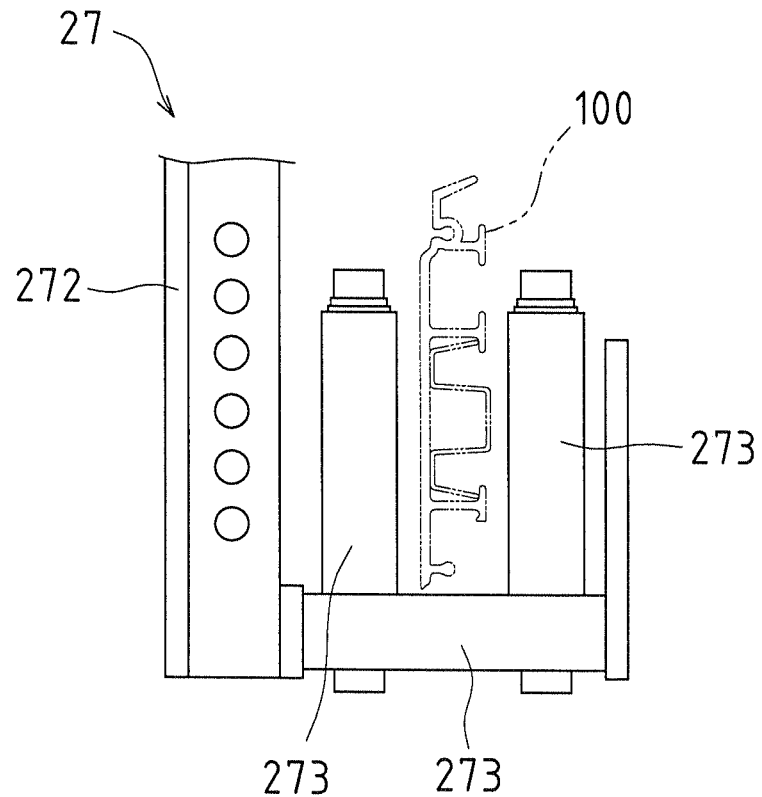

Furthermore, as shown in FIGS. 38(a) and 38(b), in the guide roller 27, rotating rollers 273 are axially supported in a freely rotatable manner respectively at above and below and on the left side end (on the left side viewed from the upstream side of the sending direction of the reinforcing material-attached profile strip 100) of an attachment material 272 fixed via an attachment stay 271 to the attachment frame 21 of the pipe-producing machine 20 with a certain spacing (a spacing of 90 degrees, in this example) interposed in the circumferential direction on the front side of the joining mechanism 23. When the outside end edge, the front side, and the back face of the spiral reinforcing material-attached profile strip 100 guided via the curl-forming apparatus 3 are restricted by the respective rotating rollers 273, the reinforcing material-attached profile strip 100 can be guided at a stable posture to the entrance guide 26 disposed on the upstream side of the joining mechanism 23.

Figure 39A:
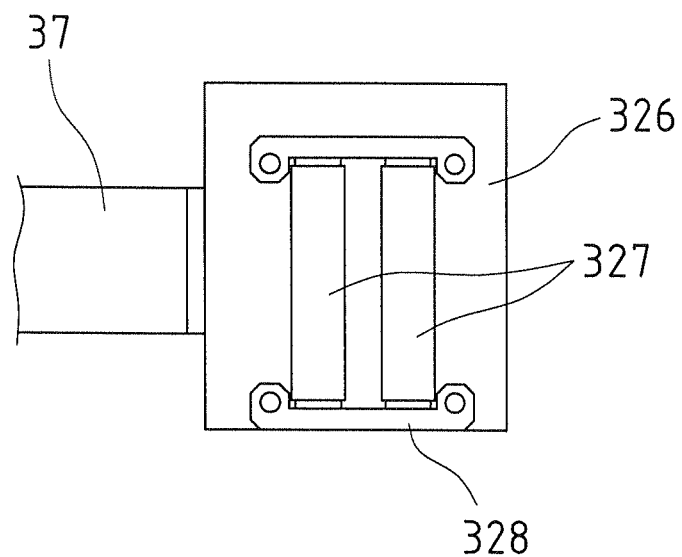
Figure 39B:
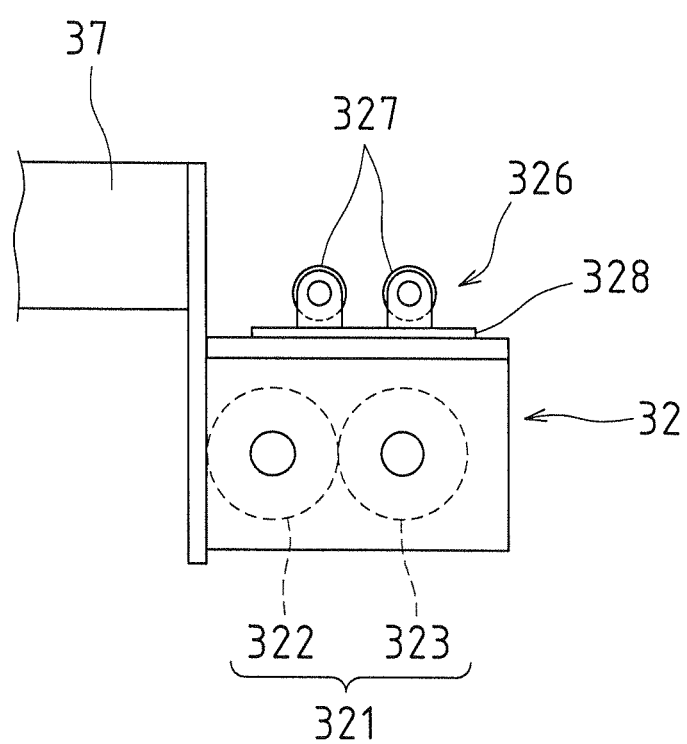

Conversely, also in the curl-forming apparatus 3, an entrance guide 326 is disposed at the first sending roller 32 in order to smoothly guide the reinforcing material-attached profile strip 100 to the first sending roller 32, and a curl-adjusting mechanism 336 is disposed at the second sending roller 33 in order to adjust the curl diameter of the reinforcing material-attached profile strip 100 taken by the second sending roller 33. More specifically, as shown in FIGS. 39(a) and 39(b), in the entrance guide 326, a pair of rollers 327 that pinch the reinforcing material-attached profile strip 100 and guide it to the pinch roller 321 on the entrance side of the first sending roller 32 are axially supported in a freely rotatable manner at an attachment plate 328, and the reinforcing material-attached profile strip 100 is guided via the pair of rollers 327 to the first pinch roller 321. Accordingly, the reinforcing material-attached profile strip 100 pulled out from the drum D is guided via the pair of rollers 327 of the entrance guide 326 to the pinch roller 321, and, thus, guiding can be smoothly performed while preventing the first pinch roller 321 from being damaged.

Figure 40A:
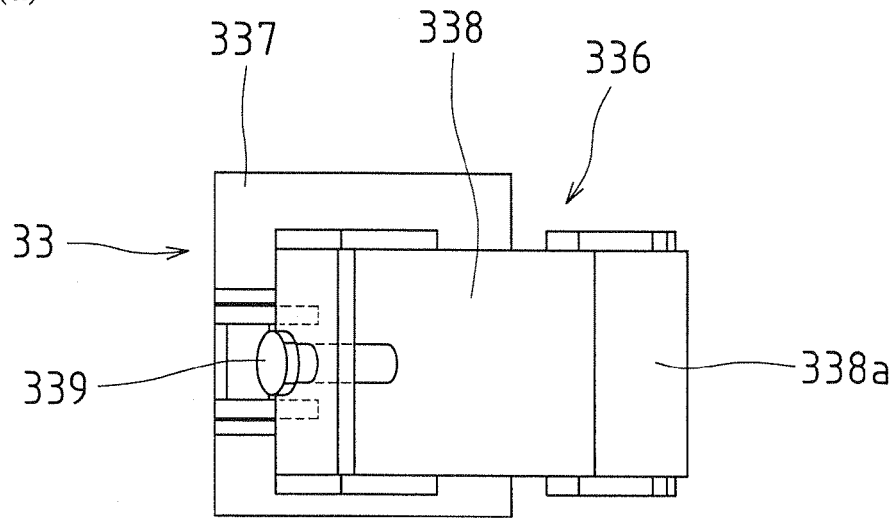
Figure 40B:
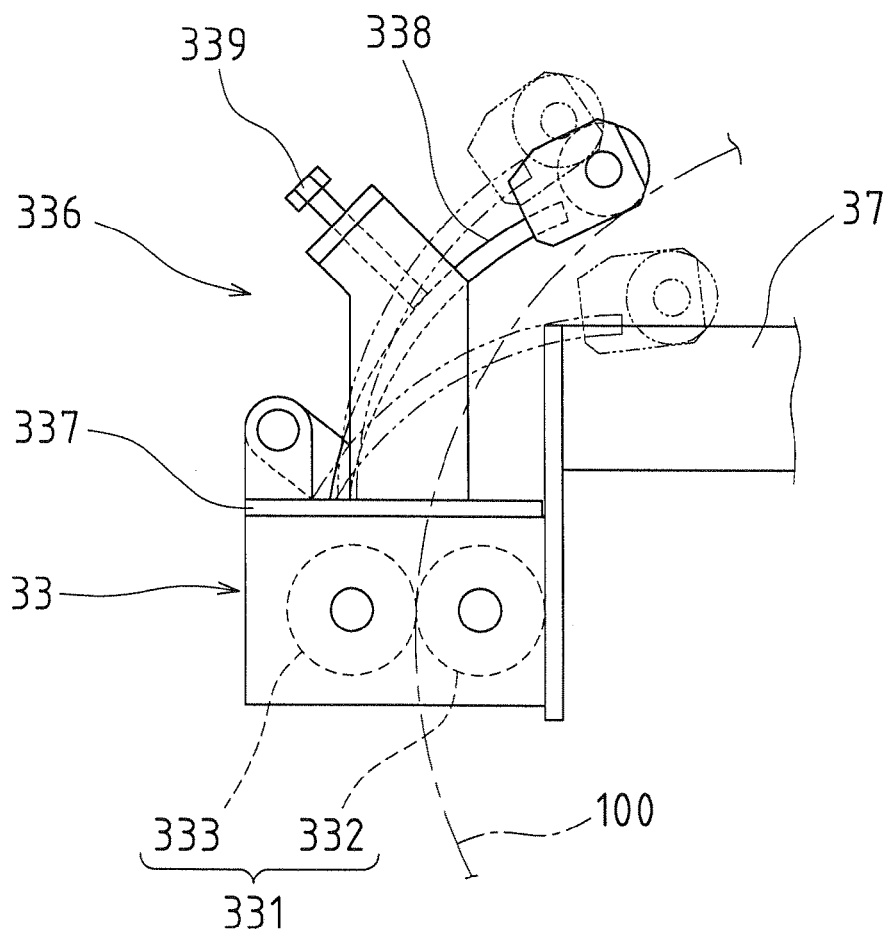

Furthermore, as shown in FIGS. 40(a) and 40(b), the curl-adjusting mechanism 336 includes a rotation plate 338 that is coupled to an attachment material 337 on the exit side of the second sending roller 32 and that has a front end axially supporting a pressure roller 338a in a freely rotatable manner, and an adjustment bolt 339 that is disposed on the attachment material 337 and that presses and warps the rotation plate 338. When the adjustment bolt 339 is tightened or loosened, the rotation plate 338 is pressed against the attachment material 337 resisting an elastic force, and, thus, the position of the pressure roller 338a can be adjusted. For example, when the adjustment bolt 339 is tightened, the rotation plate 338 can be warped with respect to the attachment material 337 resisting an elastic force, and, thus, the reinforcing material-attached profile strip 100 taken by the second sending roller 33 and provided with curls is pressed to correct spring back, and the radius of curvature of curls of the reinforcing material-attached profile strip 100 can, be adjusted so as to be close to a target radius of curvature. In a similar manner, when the adjustment bolt 339 is loosened, the rotation plate 338 can be straightened up with respect to the attachment material 337 so as to be restored due to the elastic force, a force that presses the reinforcing material-attached profile strip 100 taken by the second sending roller 33 and provided with curls is reduced to correct spring back, and the radius of curvature of curls of the reinforcing material-attached profile strip 100 can be adjusted so as to be close to a target radius of curvature.

It should be noted that without departure from the gist or principal characteristics thereof, the present invention could have many other embodiments. Accordingly, the above-described embodiments are no more than mere examples and should not be interpreted in a limited manner. The scope of the present invention is set forth by the scope of the claims, and the disclosure is in no way binding. Furthermore, all modifications and changes within a scope equivalent to that of the claims are within the scope of the present invention.

Furthermore, this application claims priority based on Japanese Patent Application No. 2007-183576 filed in Japan on Jul. 12, 2007, and Japanese Patent Application No. 2007-307385 filed in Japan on Nov. 28, 2007, the entire contents of which are herein incorporated by reference.

The invention claimed is:

1. A method for producing a spiral pipe, comprising:
   disposing the pipe-producing machine in a manhole;
   separately disposing a curl-forming apparatus on an upstream side of the pipe-producing machine, the curl-forming apparatus including: an arc-like plate so as to configure a part of a spiral; and a support base;
   placing the support base on a ground near the manhole or on a bottom portion inside the manhole;
   placing a reinforcing material-attached profile strip in which joint portions are formed at both side edge portions and to which a reinforcing material continuously formed in a longitudinal direction is attached, along a concave surface of the arc-like plate;
   pushing or taking the reinforcing material-attached profile strip, providing arc-like curls having a radius of curvature substantially similar to or not greater than a radius of curvature of a spiral pipe, and subjecting the reinforcing material-attached profile strip to plastic deformation to form a spiral;
   joining the joint portions of adjacent parts of the reinforcing material-attached profile strip, using the pipe-producing machine having a joining mechanism, thereby producing a spiral pipe; and
   revolving the pipe-producing machine about an axis of the spiral pipe in the manhole, and drawing or pressing the spiral pipe in a state where the spiral pipe is not removed from the pipe-producing machine, and thereby inserting the spiral pipe into an existing pipe without being wound,
   wherein the pipe-producing machine never proceeds into the existing pipe.

2. The method for producing a spiral pipe according to claim 1, wherein a head portion of the spiral pipe is coupled to a cord-like member and drawn into the existing pipe.

3. The method for producing a spiral pipe according to claim 1, wherein the reinforcing material-attached profile strip is supplied to the manhole while being provided with arc-like curls by subjecting a metal reinforcing material attached thereto to plastic deformation.

4. The method for producing a spiral pipe according to claim 1, wherein the reinforcing material-attached profile strip is supplied to the manhole while being provided with arc-like curls by thermal deformation.

5. The method for producing a spiral pipe according to claim 1, wherein the curl-forming apparatus is disposed on a ground near a departure side manhole.

6. The method for producing a spiral pipe according to claim 1,
   wherein the arc-like plate has a radius of curvature substantially similar to or not greater than a radius of curvature of the spiral pipe,
   the curl-forming apparatus comprising:
   a curl guide including the arc-like plate; and
   at least either one sending roller of a sending roller that is disposed on an upstream side of the curl guide and that pushes the reinforcing material-attached profile strip into the curl guide, and a sending roller that is disposed on a downstream side of the curl guide and that takes the reinforcing material-attached profile strip from the curl guide.

7. The method for producing a spiral pipe according to claim 1,
   wherein the arc-like plate has a radius of curvature substantially similar to or not greater than a radius of curvature of the spiral pipe,
   the curl-forming apparatus comprising:
   a curl guide including the arc-like plate;
   a first pinch roller that is disposed on an upstream side of the curl guide;
   a second pinch roller that is disposed on a downstream side of the curl guide; and
   a motor that rotationally drives at least one of the first pinch roller and the second pinch roller.

* * * * *